United States Patent
Zahnert et al.

(10) Patent No.: US 12,013,979 B2
(45) Date of Patent: Jun. 18, 2024

(54) LIGHTWEIGHT AND LOW POWER CROSS REALITY DEVICE WITH HIGH TEMPORAL RESOLUTION

(71) Applicant: Magic Leap, Inc., Plantation, FL (US)

(72) Inventors: Martin Georg Zahnert, Zurich (CH); Alexander Ilic, Zurich (CH)

(73) Assignee: Magic Leap, Inc., Plantation, FL (US)

( * ) Notice: Subject to any disclaimer, the term of this patent is extended or adjusted under 35 U.S.C. 154(b) by 183 days.

(21) Appl. No.: 17/428,958

(22) PCT Filed: Feb. 7, 2020

(86) PCT No.: PCT/US2020/017121
§ 371 (c)(1),
(2) Date: Aug. 5, 2021

(87) PCT Pub. No.: WO2020/163663
PCT Pub. Date: Aug. 13, 2020

(65) Prior Publication Data
US 2022/0129066 A1    Apr. 28, 2022

Related U.S. Application Data

(60) Provisional application No. 62/802,577, filed on Feb. 7, 2019.

(51) Int. Cl.
*G06F 3/01* (2006.01)
*G02B 27/00* (2006.01)
(Continued)

(52) U.S. Cl.
CPC ......... *G06F 3/012* (2013.01); *G02B 27/0093* (2013.01); *G02B 27/0101* (2013.01);
(Continued)

(58) Field of Classification Search
CPC ............ G02B 27/0093; G02B 27/0101; G02B 27/017; G02B 27/0179; G02B 27/281;
(Continued)

(56) References Cited

U.S. PATENT DOCUMENTS 6,271,785 B1    8/2001  Martin et al.
9,529,192 B2    12/2016 Border
(Continued)

FOREIGN PATENT DOCUMENTS

CN    108136258 A    6/2018
EP    2779091 A1     9/2014
(Continued)

OTHER PUBLICATIONS

International Search Report and Written Opinion for Application No. PCT/US2019/058807 dated Feb. 21, 2020.
(Continued)

*Primary Examiner* — Nelson M Rosario
(74) *Attorney, Agent, or Firm* — Wolf, Greenfield & Sacks, P.C.

(57) ABSTRACT

A wearable display system for cross reality (XR) systems may have a dynamic vision sensor (DVS) camera and a color camera. At least one of the cameras may be a plenoptic camera. The wearable display system may dynamically restrict processing of image data from either or both cameras based on detected conditions and XR functions being performed. For object tracking, image information may be processed for patches of a field of view of either or both cameras corresponding to the object. Objects may be tracked based on asynchronously acquired events indicating changes within patches. Stereoscopic or other types of image information may be used when event-based object tacking yields an inadequate quality metric. Tracked objects may include a user's hand or a stationary object in the physical world,
(Continued)

enabling calculation of the pose of the wearable display system and the wearer's head.

24 Claims, 29 Drawing Sheets

(51) Int. Cl.
  *G02B 27/01* (2006.01)
  *G02B 27/28* (2006.01)
  *G06T 7/292* (2017.01)
  *G06T 19/00* (2011.01)
(52) U.S. Cl.
  CPC ....... *G02B 27/017* (2013.01); *G02B 27/0179* (2013.01); *G02B 27/281* (2013.01); *G06T 7/292* (2017.01); *G06T 19/006* (2013.01); *G02B 2027/0138* (2013.01); *G02B 2027/0187* (2013.01); *G06T 2207/10012* (2013.01); *G06T 2207/10028* (2013.01); *G06T 2207/30201* (2013.01)
(58) Field of Classification Search
  CPC .... G02B 2027/0138; G02B 2027/0187; G06F 3/011; G06F 3/012; G06Q 30/0601; G06T 19/006; G06T 7/246; G06T 7/292; G06T 7/75; G06T 7/85; G06T 2207/10012; G06T 2207/10016; G06T 2207/10021; G06T 2207/10024; G06T 2207/10028; G06T 2207/30201; G06T 2207/30241; H04N 13/239; H04N 13/271; H04N 2013/0081
  See application file for complete search history.

(56) References Cited

U.S. PATENT DOCUMENTS

| | | |
|---|---|---|
| 9,826,176 B1 | 11/2017 | Vogelsang |
| 9,990,761 B1 | 6/2018 | Anderson et al. |
| 10,152,775 B1 | 12/2018 | Bellows et al. |
| 10,298,910 B1 | 5/2019 | Kroeger |
| 11,269,402 B1 | 3/2022 | Canberk et al. |
| 2001/0025914 A1 | 10/2001 | Pyyhtia et al. |
| 2002/0005485 A1 | 1/2002 | Hashimoto et al. |
| 2003/0174146 A1 | 9/2003 | Kenoyer |
| 2008/0252723 A1 | 10/2008 | Park |
| 2009/0109313 A1 | 4/2009 | Liu et al. |
| 2012/0091372 A1 | 4/2012 | Molnar et al. |
| 2012/0236124 A1 | 9/2012 | Aoki |
| 2013/0063400 A1 | 3/2013 | Ahn et al. |
| 2013/0076953 A1 | 3/2013 | Sekine et al. |
| 2013/0126703 A1 | 5/2013 | Caulfield |
| 2014/0326854 A1 | 11/2014 | Delbruck et al. |
| 2014/0375790 A1* | 12/2014 | Robbins ............... G02B 27/017 348/78 |
| 2015/0016777 A1 | 1/2015 | Abovitz et al. |
| 2015/0062003 A1 | 3/2015 | Rafii et al. |
| 2015/0228114 A1 | 8/2015 | Shapira et al. |
| 2015/0235447 A1 | 8/2015 | Abovitz et al. |
| 2015/0243105 A1 | 8/2015 | Abovitz et al. |
| 2015/0248551 A1 | 9/2015 | Bae et al. |
| 2015/0260474 A1 | 9/2015 | Rublowsky et al. |
| 2015/0302658 A1 | 10/2015 | O'Connor et al. |
| 2015/0365617 A1 | 12/2015 | Chen |
| 2015/0381889 A1 | 12/2015 | Toguchi |
| 2015/0381964 A1 | 12/2015 | Drouot |
| 2016/0026253 A1 | 1/2016 | Bradski et al. |
| 2016/0048727 A1 | 2/2016 | Zhang et al. |
| 2016/0148433 A1 | 5/2016 | Petrovskaya et al. |
| 2016/0187969 A1 | 6/2016 | Larsen et al. |
| 2016/0191887 A1 | 6/2016 | Casas |
| 2016/0262608 A1 | 9/2016 | Krueger |
| 2016/0309134 A1 | 10/2016 | Venkataraman et al. |
| 2016/0335487 A1 | 11/2016 | Ming et al. |
| 2016/0360970 A1 | 12/2016 | Tzvieli et al. |
| 2017/0094243 A1 | 3/2017 | Venkataraman et al. |
| 2017/0111619 A1 | 4/2017 | Benosman et al. |
| 2017/0167920 A1 | 6/2017 | Leet et al. |
| 2017/0168586 A1 | 6/2017 | Sinha et al. |
| 2017/0176575 A1 | 6/2017 | Smits |
| 2017/0227841 A1 | 8/2017 | Niemela et al. |
| 2017/0285343 A1 | 10/2017 | Belenkii et al. |
| 2017/0302859 A1 | 10/2017 | Nakanishi et al. |
| 2017/0345218 A1 | 11/2017 | Bedikian et al. |
| 2017/0345398 A1 | 11/2017 | Fuchs et al. |
| 2017/0374360 A1 | 12/2017 | Kranski et al. |
| 2018/0115763 A1 | 4/2018 | Hung et al. |
| 2018/0182173 A1 | 6/2018 | Robaina et al. |
| 2018/0188538 A1 | 7/2018 | Bell |
| 2018/0239144 A1 | 8/2018 | Woods et al. |
| 2018/0249151 A1 | 8/2018 | Freeman et al. |
| 2018/0275242 A1* | 9/2018 | Peri ........................ G06F 3/011 |
| 2018/0278843 A1 | 9/2018 | Smith et al. |
| 2018/0300897 A1 | 10/2018 | Woods et al. |
| 2019/0056792 A1 | 2/2019 | Wan et al. |
| 2019/0139307 A1 | 5/2019 | Min |
| 2019/0197765 A1 | 6/2019 | Molyneaux et al. |
| 2019/0317597 A1 | 10/2019 | Aleem et al. |
| 2019/0355169 A1 | 11/2019 | Sapienza et al. |
| 2020/0005489 A1 | 1/2020 | Kroeger |
| 2020/0145588 A1 | 5/2020 | Kasuya et al. |
| 2021/0165229 A1 | 6/2021 | Stahl et al. |
| 2021/0409626 A1 | 12/2021 | Zahnert et al. |
| 2021/0409629 A1 | 12/2021 | Zahnert et al. |
| 2021/0409632 A1 | 12/2021 | Zahnert et al. |
| 2022/0014689 A1 | 1/2022 | Zahnert et al. |
| 2022/0023787 A1 | 1/2022 | Huang |
| 2022/0051441 A1 | 2/2022 | Zahnert et al. |
| 2022/0121280 A1* | 4/2022 | Jones ...................... A61B 3/113 |
| 2022/0132056 A1 | 4/2022 | Zahnert et al. |

FOREIGN PATENT DOCUMENTS

| | | |
|---|---|---|
| JP | 2015-069480 A | 4/2015 |
| WO | WO 2007/069892 A1 | 6/2007 |
| WO | WO 2012/022927 A1 | 2/2012 |
| WO | WO 2016/181391 A1 | 11/2016 |
| WO | WO 2018/039586 A1 | 3/2018 |
| WO | WO 2018/122798 A1 | 7/2018 |

OTHER PUBLICATIONS

Invitation to Pay Additional Fees for Application No. PCT/US2019/058807 dated Dec. 13, 2019.
International Preliminary Report on Patentability for Application No. PCT/US2019/058807 dated May 20, 2021.
International Search Report and Written Opinion for Application No. PCT/US2019/058810 dated Feb. 24, 2020.
Invitation to Pay Additional Fees for Application No. PCT/US2019/058810 dated Dec. 13, 2019.
International Preliminary Report on Patentability for Application No. PCT/US2019/058810 dated May 20, 2021.
International Search Report and Written Opinion for Application No. PCT/US2019/058838 dated Feb. 27, 2020.
Invitation to Pay Additional Fees for Application No. PCT/US2019/058838 dated Dec. 17, 2019.
International Preliminary Report on Patentability for Application No. PCT/US2019/058838 dated May 20, 2021.
International Search Report and Written Opinion for Application No. PCT/US2019/060791 dated Mar. 10, 2020.
Invitation to Pay Additional Fees for Application No. PCT/US2019/060791 dated Jan. 13, 2020.
International Preliminary Report on Patentability for Application No. PCT/US2019/060791 dated May 27, 2021.
Invitation to Pay Additional Fees for Application No. PCT/US2019/067476 dated Feb. 27, 2020.
International Search Report and Written Opinion for Application No. PCT/US2019/067476 dated Apr. 29, 2020.

(56) References Cited

OTHER PUBLICATIONS

International Preliminary Report on Patentability for Application No. PCT/US2019/067476 dated Jul. 1, 2021.
Invitation to Pay Additional Fees for Application No. PCT/US2020/017119 dated Apr. 23, 2020.
International Search Report and Written Opinion for Application No. PCT/US2020/017119 dated Jun. 23, 2020.
International Preliminary Report on Patentability for Application No. PCT/US2020/017119 dated Aug. 19, 2021.
International Search Report and Written Opinion for Application No. PCT/US2020/017121 dated May 7, 2020.
International Preliminary Report on Patentability for Application No. PCT/US2020/017121 dated Aug. 19, 2021.
Detone et al., Deep image homography estimation. arXiv preprint. arXiv:1606.03798. Jun. 13, 2016. 6 pages.
Zahnert et al., Multi-Camera Cross Reality Device, U.S. Appl. No. 17/415,699, filed Jun. 17, 2021.
Zahnert et al., Lightweight Cross Reality Device With Passive Depth Extraction, U.S. Appl. No. 17/428,948, filed Aug. 5, 2021.
Extended European Search Report dated Aug. 19, 2022 in connection with European Application No. 19900657.8.
Extended European Search Report dated Sep. 22, 2022 in connection with European Application No. 20752974.4.
Foxlin et al., Weartrack: A self-referenced head and hand tracker for wearable computers and portable VR. Digest of Papers. Fourth International Symposium on Wearable Computers. Oct. 2000, pp. 155-162.
Walter et al., Interactive rendering using the render cache. Proceedings of the 10th Eurographics Workshop on Rendering. Jun. 1999, pp. 235-246.
Chinese Office Action dated Feb. 27, 2024 in connection with Chinese Application No. 202080026109.6.
Japanese Office Action dated Mar. 13, 2024 in connection with Japanese Application No. 2021-545848.
CN 202080026109.6, dated Feb. 27, 2024, Chinese Office Action.
JP 2021-545848, dated Mar. 13, 2024, Japanese Office Action.

* cited by examiner

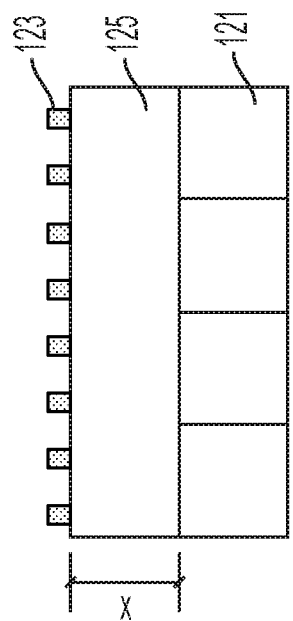
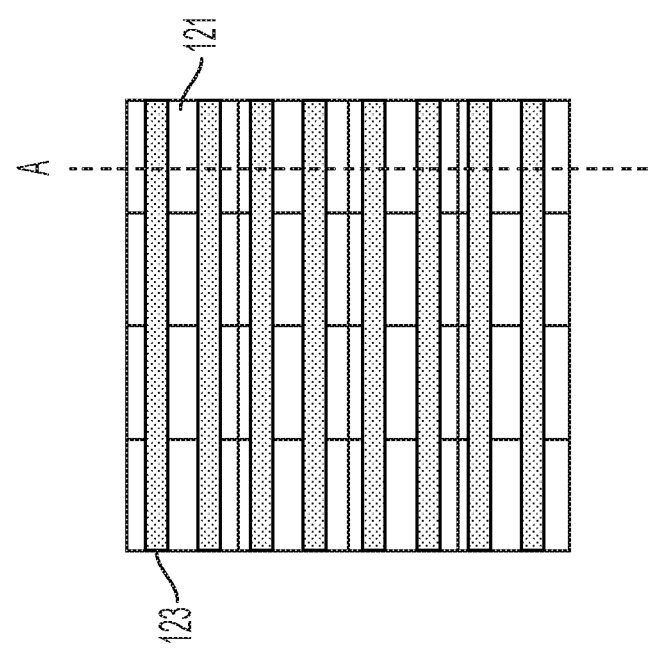
FIG. 19B
FIG. 19A

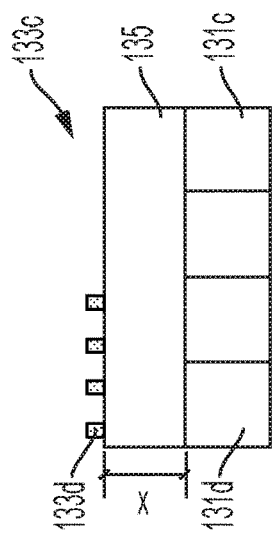
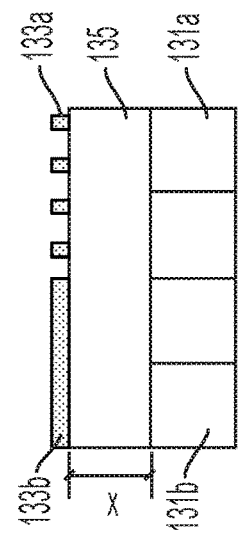
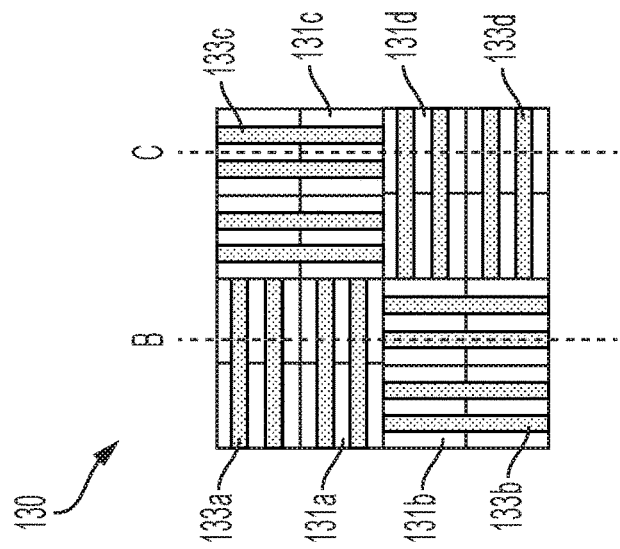
FIG. 20C
FIG. 20B
FIG. 20A

LIGHTWEIGHT AND LOW POWER CROSS REALITY DEVICE WITH HIGH TEMPORAL RESOLUTION

RELATED APPLICATIONS

This Application is a national stage filing under 35 U.S.C. § 371 of International Patent Application Serial No. PCT/US2020/017121, filed Feb. 7, 2020, entitled "LIGHTWEIGHT AND LOW POWER CROSS REALITY DEVICE WITH HIGH TEMPORAL RESOLUTION," which claims priority under 35 U.S.C. § 119(e) to U.S. Provisional Application Ser. No. 62/802,577, filed Feb. 7, 2019, entitled "MULTI-CAMERA CROSS REALITY DEVICE WITH EVENT-BASED DATA ACQUISITION." The entire contents of these applications are incorporated herein by reference in their entirety.

TECHNICAL FIELD

This application relates generally to a wearable cross reality display system (XR system) including a dynamic vision sensor (DVS) camera.

BACKGROUND

Computers may control human user interfaces to create an X Reality (XR or cross reality) environment in which some or all of the XR environment, as perceived by the user, is generated by the computer. These XR environments may be virtual reality (VR), augmented reality (AR), or mixed reality (MR) environments, in which some or all of an XR environment may be generated by computers using, in part, data that describes the environment. This data may describe, for example, virtual objects that may be rendered in a way that users sense or perceive as a part of a physical world such that users can interact with the virtual objects. The user may experience these virtual objects as a result of the data being rendered and presented through a user interface device, such as, for example, a head-mounted display device. The data may be displayed to the user to see, or may control audio that is played for the user to hear, or may control a tactile (or haptic) interface, enabling the user to experience touch sensations that the user senses or perceives as feeling the virtual object.

XR systems may be useful for many applications, spanning the fields of scientific visualization, medical training, engineering design and prototyping, tele-manipulation and tele-presence, and personal entertainment. AR and MR, in contrast to VR, include one or more virtual objects in relation to real objects of the physical world. The experience of virtual objects interacting with real objects greatly enhances the user's enjoyment in using the XR system, and also opens the door for a variety of applications that present realistic and readily understandable information about how the physical world might be altered.

BRIEF SUMMARY

Aspects of the present application relate to a wearable cross reality display system configured with a DVS camera. Techniques as described herein may be used together, separately, or in any suitable combination.

According to some embodiments, a wearable display system may be provided, the wearable display system comprising: a headset including one first camera configurable to output an image frame or image data satisfying an intensity change criterion, and one second camera, wherein the first camera and the second camera are positioned so as to provide overlapping views of a central view field; and a processor operatively coupled to the first camera and the second camera and configured to: create a world model using depth information stereoscopically determined from images output by the first camera and the second camera; and track head pose using the world model and the image data output by the first camera.

In some embodiments, the intensity change criterion may comprise an absolute or relative intensity change criterion.

In some embodiments, the first camera may be configured to output the image data asynchronously.

In some embodiments, the processor may be further configured to track head pose asynchronously.

In some embodiments, the processor may be further configured to perform a tracking routine to restrict image data acquisition to points of interest within the world model.

In some embodiments, the first camera may be configurable to restrict image acquisition to one or more portions of a field of view of the first camera, and the tracking routine may include identifying a point of interest within the world model, determining one or more first portions of a field of view of the first camera corresponding to the point of interest, and providing instructions to the first camera to restrict image acquisition to the one or more first portions of the field of view.

In some embodiments, the tracking routine may further include estimating one or more second portions of a field of view of the first camera corresponding to the point of interest based on a movement of the point of interest relative to the world model or a movement of the headset relative to the point of interest and providing instructions to the first camera to restrict image acquisition to the one or more second portions of the field of view.

In some embodiments, the headset may further include an inertial measurement unit, and performing the tracking routine may include estimating an updated relative position of the object based at least partly upon an output of the inertial measurement unit.

In some embodiments, the tracking routine may include repeatedly calculating a position of the point of interest within the world model and repeated calculations may be performed at a temporal resolution of more than 60 Hz.

In some embodiments, intervals between the repeated calculations may be between 1 ms and 15 ms in duration.

In some embodiments, the processor may be further configured to determine whether the head pose tracking satisfies a quality criterion and enable the second camera or modulate a frame rate of the second camera when the head pose tracking does not satisfy the quality criterion.

In some embodiments, the processor may be mechanically coupled to the headset.

In some embodiments, the headset may comprise a display device mechanically coupled to the processor.

In some embodiments, a local data processing module may comprise the processor, the local data processing module operatively coupled to a display device through a communication link, and wherein the headset may comprise the display device.

In some embodiments, the headset may further include an IR emitter.

In some embodiments, the processor may be configured to selectively enable the IR emitter so as to enable head pose tracking in a low light condition.

According to some embodiments, a method of tracking head pose using a wearable display system may be provided, the wearable display system comprising: a headset including one first camera configurable to output an image frame or image data satisfying an intensity change criterion, and one second camera, wherein the first camera and the second camera are positioned so as to provide overlapping views of a central view field; and a processor operatively coupled to the first camera and the second camera; wherein the method comprises using the processor to create a world model using depth information stereoscopically determined from images output by the first camera and the second camera and track the head pose using the world model and the image data output by the first camera.

According to some embodiments, a wearable display system may be provided, the wearable display system comprising: a frame; a first camera mechanically coupled to the frame, wherein the first camera is configurable to output image data satisfying an intensity change criterion in a first field of view for the first camera; and a processor operatively coupled to the first camera and configured to: determine whether an object is within the first field of view; and track motion of the object using image data received from the first camera for the one or more portions of the first field of view.

According to some embodiments, a method of tracking motion of an object using a wearable display system is provided, the wearable display system comprising: a frame; a first camera mechanically coupled to the frame, wherein the first camera configurable to output image data satisfying an intensity change criterion in a first field of view for the first camera; and a processor operatively coupled to the first camera; wherein the method comprises using the processor to determine whether the object is within the first field of view and track motion of the object using image data received from the first camera for the one or more portions of the first field of view.

According to some embodiments, a wearable display system, the wearable display system comprising: a frame; two cameras mechanically coupled to the frame, wherein the two cameras comprise one first camera configurable to output image data satisfying an intensity change criterion and one second camera, wherein the first camera and the second camera are positioned so as to provide overlapping views of a central view field; and a processor operatively coupled to the first camera and the second camera.

The foregoing summary is provided by way of illustration and is not intended to be limiting.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 19A is a top view of a photodetector array with a single TDM, according to some embodiments.

FIG. 19B is a side view of a photodetector array with a single TDM, according to some embodiments.

FIG. 20A is a top view of a photodetector array with multiple angle-of-arrival to-intensity converters in the form of TDMs, according to some embodiments.

FIG. 20B is a side view of a photodetector array with multiple TDMs, according to some embodiments.

FIG. 20C is a side view of a photodetector array with multiple TDMs, according to some embodiments.

DETAILED DESCRIPTION

Figure 1:
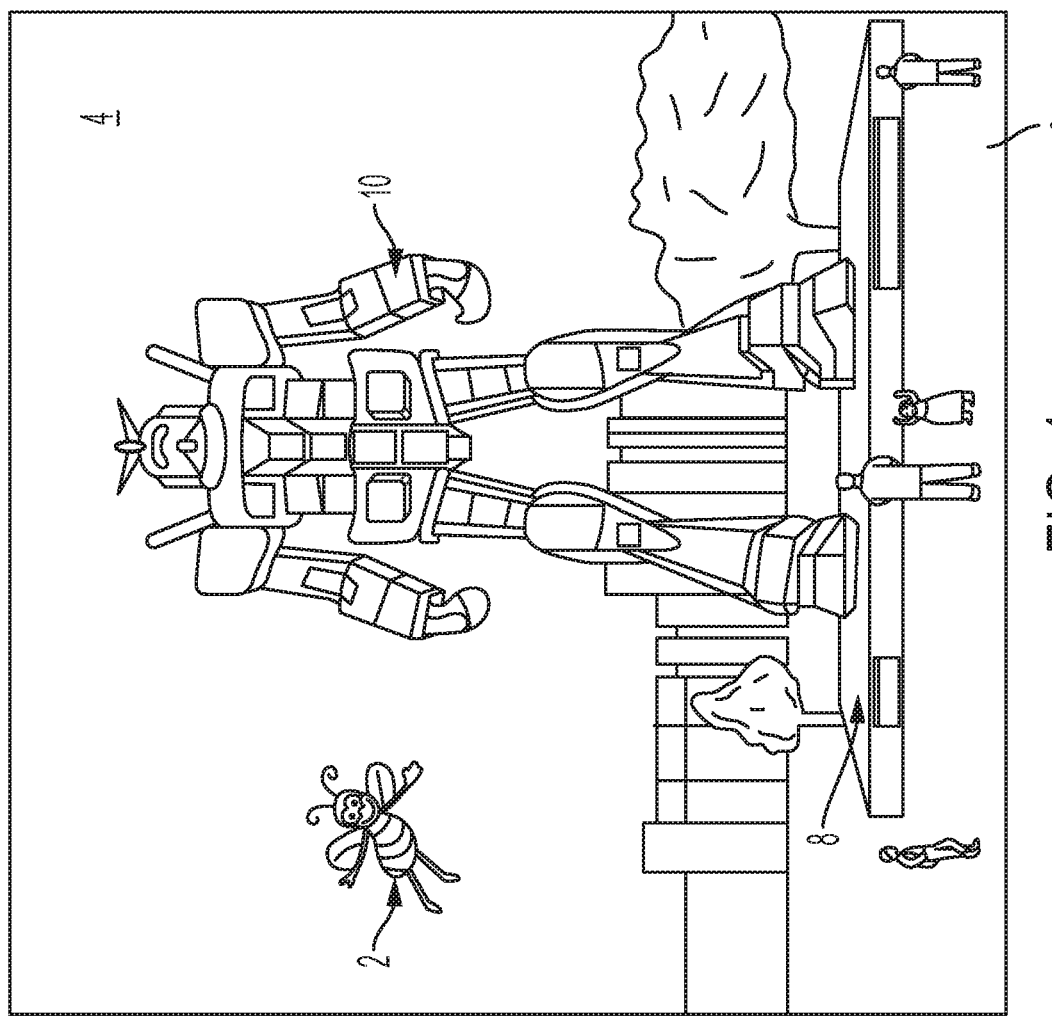
FIG. 1 is a sketch illustrating an example of a simplified augmented reality (AR) scene, according to some embodiments.

The inventors have recognized and appreciated designs and operating techniques for wearable XR display systems that enhance the enjoyability and utility of such systems. These designs and/or operating techniques may enable obtaining information to perform multiple functions, including hand tracking, head pose tacking, and world reconstruction using a limited number of cameras, which may be used to realistically render virtual objects such that they appear to realistically interact with physical objects. The wearable cross reality display system may be lightweight and may consume low power in operation. This system may use a particular configuration of sensors to acquire image information about physical objects in the physical world with low latency. This system may perform various routines to improve the accuracy and/or realism of the displayed XR environment. Such routines may include a calibration routine to improve accuracy of stereoscopic depth measurements, even if a lightweight frame distorts during use, and routines to detect and address incomplete depth information in a model of the physical world around the user.

The weight of known XR system headsets can limit user enjoyment. Such XR headsets can weigh more than 340 grams (sometimes even more than 700 grams). Eyeglasses, by comparison, may weigh less than 50 grams. Wearing such relatively heavy headsets for an extended period of time can fatigue users or distract them, detracting from the desired immersive XR experience. The inventors have recognized and appreciated, however, that some designs that reduce headset weight also increase headset flexibility, making lightweight headsets vulnerable to changes in sensor position or orientation during use or over time. For example, as a user wears a lightweight headset including camera sensors, the relative orientation of these camera sensors may shift. Variations in the spacing of cameras used for stereoscopic imaging may impact the ability of those headsets to acquire accurate stereoscopic information, which depends on the cameras having a known positional relationship with respect to each other. Accordingly, a calibration routine that may be repeated as the headset is worn may enable a lightweight headset that can accurately acquire information about world around the wearer of the headset using stereoscopic imaging techniques.

The need to equip an XR system with components to acquire information about objects in the physical world can also limit the utility and user-enjoyment of these systems. While the acquired information is used to realistically present computer-generated virtual objects in the appropriate positions and with the appropriate appearance relative to physical objects, the need to acquire the information imposes limitations on the size, power consumption and realism of XR systems.

XR systems, for example, may use sensors worn by a user to obtain information about objects in the physical world around the user, including information about the position of the physical world objects in the field of view of the user. Challenges arise because the objects may move relative to the field of view of the user, either as a result of the objects moving in the physical world or the user changing their pose relative to the physical world such that physical objects come into or leave the field of view of the user or the position of physical objects within the field of view of the user changes. To present realistic XR displays, a model of the physical objects in the physical world must be updated frequently enough to capture these changes, processed with sufficiently low latency, and accurately predicted into the future to cover the full latency path including rendering such that virtual objects displayed based on that information will have the appropriate position and appearance relative to the physical objects as the virtual objects are displayed. Otherwise, virtual objects will appear out of alignment with physical objects, and the combined scene including physical and virtual objects will not appear realistic. For example, virtual objects might look as if they are floating in space, rather than resting on a physical object or may appear to bounce around relative to physical objects. Errors of the visual tracking are especially amplified when the user is moving at a high speed and if there is significant movement in the scene.

Such problems might be avoided by sensors that acquire new data at a high rate. However, the power consumed by such sensors can lead to a need for larger batteries, increasing the weight of the system, or limit the length of use of such systems. Similarly, processors needed to process data generated at a high rate can drain batteries and add additional weight to a wearable system, further limiting the utility or enjoyability of such systems. A known approach, for example, is to operate higher resolution to capture enough visual detail and higher framerate sensors for increased temporal resolution. Alternative solutions might complement the solution with a IR time-of-flight sensor, which might directly indicate position of physical objects relative to the sensor, simple processing, yielding low latency might be performed in using this information to display virtual objects. However, the such sensors consume substantial amounts of power, particularly if they operate in sunlight.

The inventors have recognized and appreciated that XR systems may address changes in sensor position or orientation during use or over time by repeatedly performing a calibration routine. This calibration routine may determine a present relative separation and orientation of sensors included in the headset. The wearable XR system may then account for the present relative separation and orientation of the headset sensors when computing stereoscopic depth information. With such a calibration capability, the XR system may accurately acquire depth information to indicate the distance to objects in the physical world without active depth sensors or with only occasional use of active depth sensing. As active depth sensing may consume substantial power, reducing or eliminating active depth sensing enables a device that draws less power, which can increase the operating time of the device without recharging batteries, or reduce the size of the device as a result of reducing the size of the batteries.

The inventors have also recognized and appreciated that, by appropriate combinations of image sensors, and appropriate techniques to process image information from those sensors, XR systems may acquire information about physical objects with low latency, even with reduced power consumption, by: reducing the number of sensors used; eliminating, disabling, or selectively activating resource-intensive sensors; and/or reducing the overall usage of sensors. As a specific example, an XR system may include a headset with two world-facing cameras. A first one of the cameras may produce greyscale images and may have a global shutter. These greyscale images may be a smaller size than color images of similar resolution, represented in some instances with less than a third of the number of bits. This greyscale camera may require less power than color cameras of similar resolution. The greyscale camera may be configured to employ event-based data acquisition and/or patch tracking to limit the amount of data output. A second one of the cameras may be an RGB camera. The wearable cross reality display system may be configured to use this camera selectively, reducing power consumption and extending battery life without compromising the user's XR experience. The RGB camera, for example, may be used with the grayscale to construct a world model of the environment around a user, but then the grayscale camera may be used to track head pose of the user based on this world model. Alternatively or additionally, the grayscale camera may be used primarily for tracking objects, including a user's hand. Based on detected conditions indicating poor quality of the tracking, image information from one or more other sensors may be employed. The RGB camera, for example, may be enabled to acquire color information that aids in distinguishing an object from a background or the output from lightfield sensors, which provide depth information passively, may be used.

Figure 2:
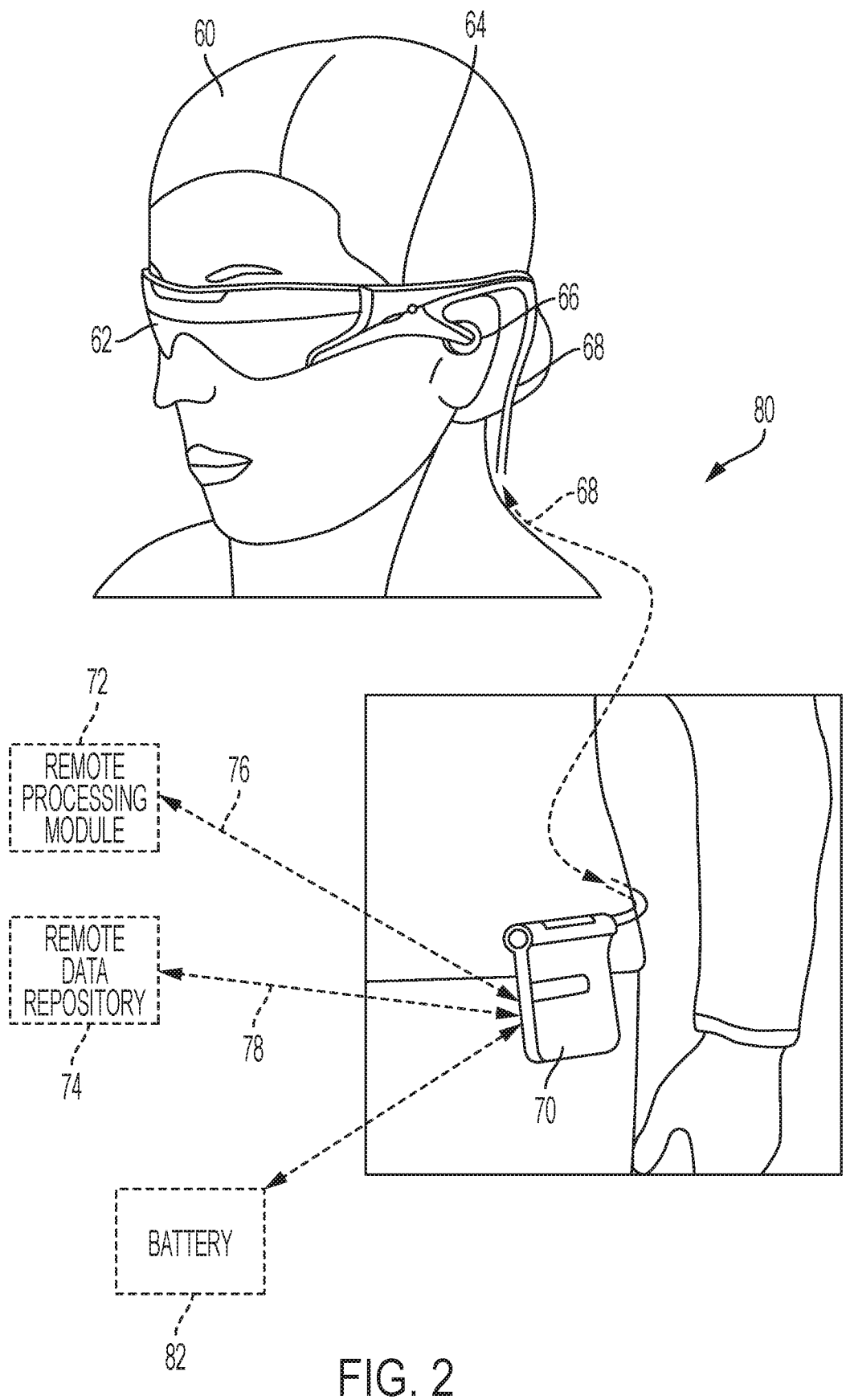
FIG. 2 is a schematic diagram illustrating an example of an AR display system, according to some embodiments.
Figure 3A:
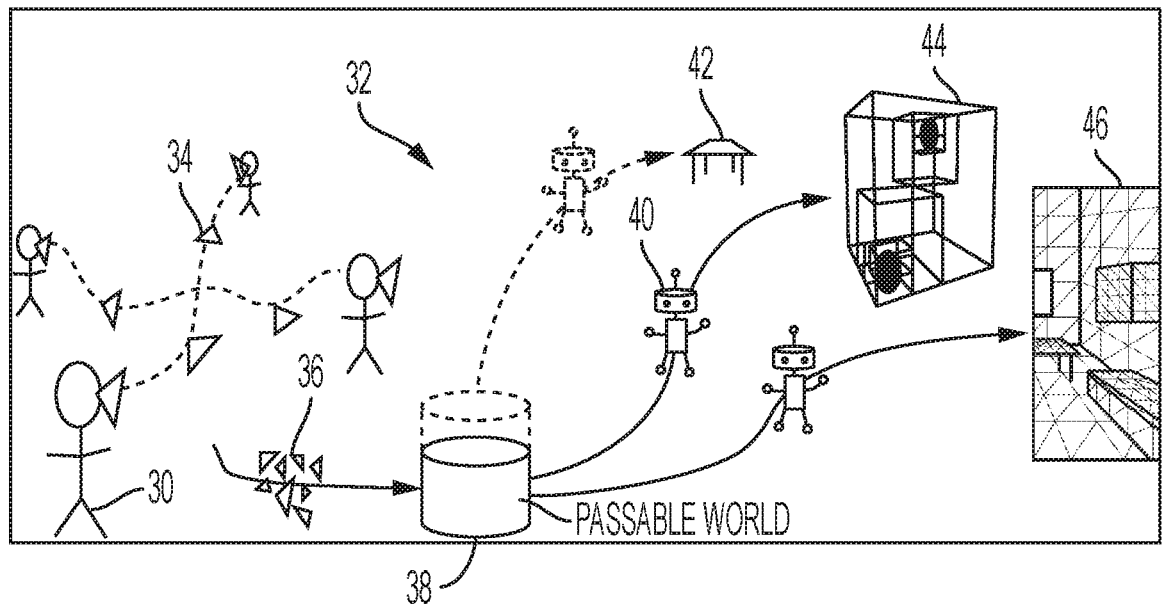
FIG. 3A is a schematic diagram illustrating a user wearing an AR display system rendering AR content as the user moves through a physical world environment, according to some embodiments.
Figure 3B:
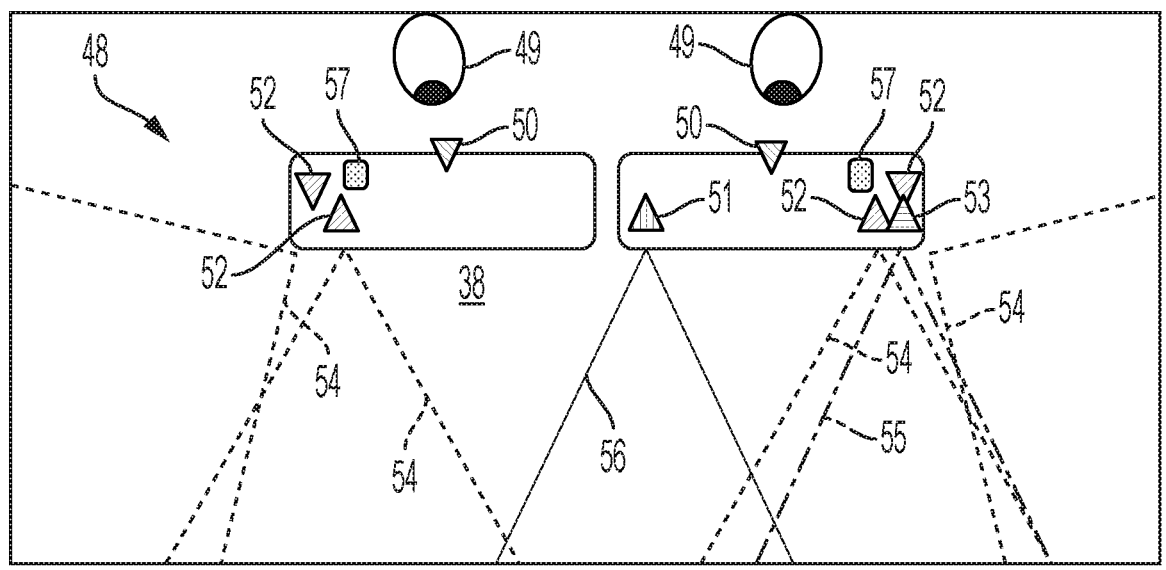
FIG. 3B is a schematic diagram illustrating a viewing optics assembly and attendant components, according to some embodiments.

Techniques as described herein may be used together or separately with many types of devices and for many types of scenes. Figure (FIG. 1 illustrates such a scene. FIGS. 2, 3A and 3B illustrate an exemplary AR system, including one or more processors, memory, sensors and user interfaces that may operate according to the techniques described herein.

Referring to FIG. 1, an AR scene 4 is depicted wherein a user of an AR system sees a physical world park-like setting 6, featuring people, trees, buildings in the background, and a concrete platform 8. In addition to these physical objects, the user of the AR technology also perceives that they "see" virtual objects, here illustrated as a robot statue 10 standing upon the physical world concrete platform 8, and a cartoon-like avatar character 2 flying by which seems to be a personification of a bumble bee, even though these elements (e.g., the avatar character 2, and the robot statue 10) do not exist in the physical world. Due to the extreme complexity of the human visual perception and nervous system, it is challenging to produce an AR system that facilitates a comfortable, natural-feeling, rich presentation of virtual image elements amongst other virtual or physical world imagery elements.

Such a scene may be presented to a user by presenting image information representing the actual environment around the user and overlaying information representing virtual objects that are not in the actual environment. In an AR system, the user may be able to see objects in the physical world, with the AR system providing information that renders virtual objects so that they appear at the appropriate locations and with the appropriate visual characteristics that the virtual objects appear to co-exist with objects in the physical world. In an AR system, for example, a user may look through a transparent screen, such that the user can see objects in the physical world. The AR system may render virtual objects on that screen such that the user sees both the physical world and the virtual objects. In some embodiments, the screen may be worn by a user, like a pair of goggles or glasses.

A scene may be presented to the user via a system that includes multiple components, including a user interface that can stimulate one or more user senses, including sight, sound, and/or touch. In addition, the system may include one or more sensors that may measure parameters of the physical portions of the scene, including position and/or motion of the user within the physical portions of the scene. Further, the system may include one or more computing devices, with associated computer hardware, such as memory. These components may be integrated into a single device or more be distributed across multiple interconnected devices. In some embodiments, some or all of these components may be integrated into a wearable device.

In some embodiments, an AR experience may be provided to a user through a wearable display system. FIG. 2 illustrates an example of wearable display system 80 (hereinafter referred to as "system 80"). The system 80 includes a head mounted display device 62 (hereinafter referred to as "display device 62"), and various mechanical and electronic modules and systems to support the functioning of the display device 62. The display device 62 may be coupled to a frame 64, which is wearable by a display system user or viewer 60 (hereinafter referred to as "user 60") and configured to position the display device 62 in front of the eyes of the user 60. According to various embodiments, the display device 62 may be a sequential display. The display device 62 may be monocular or binocular.

In some embodiments, a speaker 66 is coupled to the frame 64 and positioned proximate an ear canal of the user 60. In some embodiments, another speaker, not shown, is positioned adjacent another ear canal of the user 60 to provide for stereo/shapeable sound control.

System 80 may include local data processing module 70. Local data processing module 70 may be operatively coupled display device 62 through a communication link 68, such as by a wired lead or wireless connectivity. Local data processing module 70 may be mounted in a variety of configurations, such as fixedly attached to the frame 64, fixedly attached to a helmet or hat worn by the user 60, embedded in headphones, or otherwise removably attached to the user 60 (e.g., in a backpack-style configuration, in a belt-coupling style configuration). In some embodiments, local data processing module 70 may not be present, as the components of local data processing module 70 may be integrated in display device 62 or implemented in a remote server or other component to which display device 62 is coupled, such as through wireless communication through a wide area network.

The local data processing module 70 may include a processor, as well as digital memory, such as non-volatile memory (e.g., flash memory), both of which may be utilized to assist in the processing, caching, and storage of data. The data may include data a) captured from sensors (which may be, e.g., operatively coupled to the frame 64) or otherwise attached to the user 60, such as image capture devices (such as cameras), microphones, inertial measurement units, accelerometers, compasses, GPS units, radio devices, and/or gyros; and/or b) acquired and/or processed using remote processing module 72 and/or remote data repository 74, possibly for passage to the display device 62 after such processing or retrieval. The local data processing module 70 may be operatively coupled by communication links 76, 78, such as via a wired or wireless communication links, to the remote processing module 72 and remote data repository 74, respectively, such that these remote modules 72, 74 are operatively coupled to each other and available as resources to the local processing and data module 70.

In some embodiments, the local data processing module 70 may include one or more processors (e.g., a central processing unit and/or one or more graphics processing units (GPU)) configured to analyze and process data and/or image information. In some embodiments, the remote data repository 74 may include a digital data storage facility, which may be available through the Internet or other networking configuration in a "cloud" resource configuration. In some embodiments, all data is stored and all computations are performed in the local data processing module 70, allowing fully autonomous use from a remote module.

In some embodiments, the local data processing module 70 is operatively coupled to a battery 82. In some embodiments, the battery 82 is a removable power source, such as over the counter batteries. In other embodiments, the battery 82 is a lithium-ion battery. In some embodiments, the battery 82 includes both an internal lithium-ion battery chargeable by the user 60 during non-operation times of the system 80 and removable batteries such that the user 60 may operate the system 80 for longer periods of time without having to be tethered to a power source to charge the lithium-ion battery or having to shut the system 80 off to replace batteries.

FIG. 3A illustrates a user 30 wearing an AR display system rendering AR content as the user 30 moves through a physical world environment 32 (hereinafter referred to as "environment 32"). The user 30 positions the AR display system at positions 34, and the AR display system records ambient information of a passable world (e.g., a digital representation of the real objects in the physical world that can be stored and updated with changes to the real objects in the physical world) relative to the positions 34. Each of the positions 34 may further be associated with a "pose" in relation to the environment 32 and/or mapped features or directional audio inputs. A user wearing the AR display system on their head may be looking in a particular direction and tilt their head, creating a head pose of the system with respect to the environment. At each position and/or pose within the same position, sensors on the AR display system may capture different information about the environment 32. Accordingly, information collected at the positions 34 may be aggregated to data inputs 36 and processed at least by a passable world module 38, which may be implemented, for example, by processing on a remote processing module 72 of FIG. 2.

The passable world module 38 determines where and how AR content 40 can be placed in relation to the physical world as determined at least in part from the data inputs 36. The AR content is "placed" in the physical world by presenting the AR content in such a way that the user can see both the AR content and the physical world. Such an interface, for example, may be created with glasses that user can see through, viewing the physical world, and that can be controlled so that virtual objects appear in controlled locations within the user's field of view. The AR content is rendered as if it were interacting with objects in the physical world. The user interface is such that the user's view of objects in the physical world can be obscured to create the appearance that AR content is, when appropriate, obscuring the user's view of those objects. For example, AR content may be placed by appropriately selecting portions of an element 42 in environment 32 (e.g., a table) to display and displaying AR content 40 shaped and positioned as if it were resting on or otherwise interacting with that element 42. AR content may also be placed within structures not yet within a field of view 44 or relative to mapped mesh model 46 of the physical world.

As depicted, element 42 is an example of what could be multiple elements within the physical world that may be treated as if it is fixed and stored in passable world module 38. Once stored in the passable world module 38, information about those fixed elements may be used to present information to the user so that the user 30 can perceive content on the fixed element 42 without the system having to map to the fixed element 42 each time the user 30 sees it. The fixed element 42 may, therefore, be a mapped mesh model from a previous modeling session or determined from a separate user but nonetheless stored on the passable world module 38 for future reference by a plurality of users. Therefore, the passable world module 38 may recognize the environment 32 from a previously mapped environment and display AR content without a device of the user 30 mapping the environment 32 first, saving computation process and cycles and avoiding latency of any rendered AR content.

Similarly, the mapped mesh model 46 of the physical world can be created by the AR display system, and appropriate surfaces and metrics for interacting and displaying the AR content 40 can be mapped and stored in the passable world module 38 for future retrieval by the user 30 or other users without the need to re-map or model. In some embodiments, the data inputs 36 are inputs such as geolocation, user identification, and current activity to indicate to the passable world module 38 which fixed element 42 of one or more fixed elements are available, which AR content 40 has last been placed on the fixed element 42, and whether to display that same content (such AR content being "persistent" content regardless of user viewing a particular passable world model).

Even in embodiments in which objects are considered to be fixed, the passable world module 38 may be updated from time to time to account for the possibility of changes in the physical world. The model of fixed objects may be updated with a very low frequency. Other objects in the physical world may be moving or otherwise not regarded as fixed. To render an AR scene with a realistic feel, the AR system may update the position of these non-fixed objects with a much higher frequency than is used to update fixed objects. To enable accurate tracking of all of the objects in the physical world, an AR system may draw information from multiple sensors, including one or more image sensors.

FIG. 3B is a schematic illustration of a viewing optics assembly 48 and attendant optional components. A specific configuration is described below in FIG. 21. Oriented to user eyes 49, in some embodiments, two eye tracking cameras 50 detect metrics of the user eyes 49 such as eye shape, eyelid occlusion, pupil direction and glint on the user eyes 49. In some embodiments, one of the sensors may be a depth sensor 51, such as a time of flight sensor, emitting signals to the world and detecting reflections of those signals from nearby objects to determine distance to given objects. A depth sensor, for example, may quickly determine whether objects have entered the field of view of the user, either as a result of motion of those objects or a change of pose of the user. However, information about the position of objects in the field of view of the user may alternatively or additionally be collected with other sensors. In some embodiments, world cameras 52 record a greater-than-peripheral view to map the environment 32 and detect inputs that may affect AR content. In some embodiments, the world camera 52 and/or camera 53 may be grayscale and/or color image sensors, which may output grayscale and/or color image frames at fixed time intervals. Camera 53 may further capture physical world images within a field of view of the user at a specific time. Pixels of a frame-based image sensor may be sampled repetitively even if their values are unchanged. Each of the world cameras 52, the camera 53 and the depth sensor 51 have respective fields of view of 54, 55, and 56 to collect data from and record a physical world scene, such as the physical world environment 32 depicted in FIG. 3A.

Inertial measurement units 57 may determine movement and/or orientation of the viewing optics assembly 48. In some embodiments, each component is operatively coupled to at least one other component. For example, the depth sensor 51 may be operatively coupled to the eye tracking cameras 50 to confirm actual distance of a point and/or region in the physical world that the user's eyes 49 are looking at.

It should be appreciated that a viewing optics assembly 48 may include some of the components illustrated in FIG. 3B. For example, a viewing optics assembly 48 may include a different number of components. In some embodiments, for example, a viewing optics assembly 48 may include, in place of the four world cameras depicted, one world camera 52, two world cameras 52, or more world cameras. Alternatively or additionally, cameras 52 and 53 need not capture a visible light image of their full field of view. A viewing optics assembly 48 may include other types of components. In some embodiments, a viewing optics assembly 48 may include one or more dynamic vision sensor, whose pixels may respond asynchronously to relative changes in light intensity exceeding a threshold.

In some embodiments, a viewing optics assembly 48 may not include the depth sensor 51 based on time of flight information. In some embodiments, for example, a viewing optics assembly 48 may include one or more plenoptic camera, whose pixels may capture not only light intensity but also an angle of incoming light. For example, a plenoptic camera may include an image sensor overlaid with a transmissive diffraction mask (TDM). Alternatively or additionally, a plenoptic camera may include an image sensor containing angle-sensitive pixels and/or phase-detection auto-focus pixels (PDAF) and/or micro-lens array (MLA). Such a sensor may serve as a source of depth information instead of or in addition to depth sensor 51.

It also should be appreciated that the configuration of the components in FIG. 3B is illustrated as an example. A viewing optics assembly 48 may include components with any suitable configuration such that a user can have the largest field of view for a particular set of components. For example, if a viewing optics assembly 48 has one world camera 52, the world camera may be placed in a center region of the viewing optics assembly instead of on the sides.

Information from these sensors in viewing optics assembly 48 may be coupled to one or more of the processors in the system. The processors may generate data that may be rendered so as to cause the user to perceive virtual content interacting with objects in the physical world. That rendering may be implemented in any suitable way, including generating image data that depicts both physical and virtual objects. In other embodiments, physical and virtual content may be depicted in one scene by modulating the opacity of a display device that a user looks through at the physical world. The opacity may be controlled so as to create the appearance of the virtual object and also to block the user from seeing objects in the physical world that are occluded by the virtual objects. In some embodiments, the image data may only include virtual content that may be modified to realistically interact with the physical world (e.g. clip content to account for occlusions), which may be viewed through the user interface. Regardless of how content is presented to a user, a model of the physical world may be used so that characteristics of the virtual objects, which can be impacted by physical objects, including the shape, position, motion and visibility of the virtual object, can be correctly computed.

The model of the physical world may be created from data collected from sensors on a wearable device of the user. In some embodiments, the model may be created from data collected by multiple users, which may be aggregated in a computing device remote from all of the users (and which may be "in the cloud").

In some embodiments, at least one of the sensors may be configured to acquire information about physical objects, particularly non-fixed objects, in a scene at a high frequency with low latency using compact and low power components. That sensor may employ patch tracking to limit the amount of data output.

Figure 4:
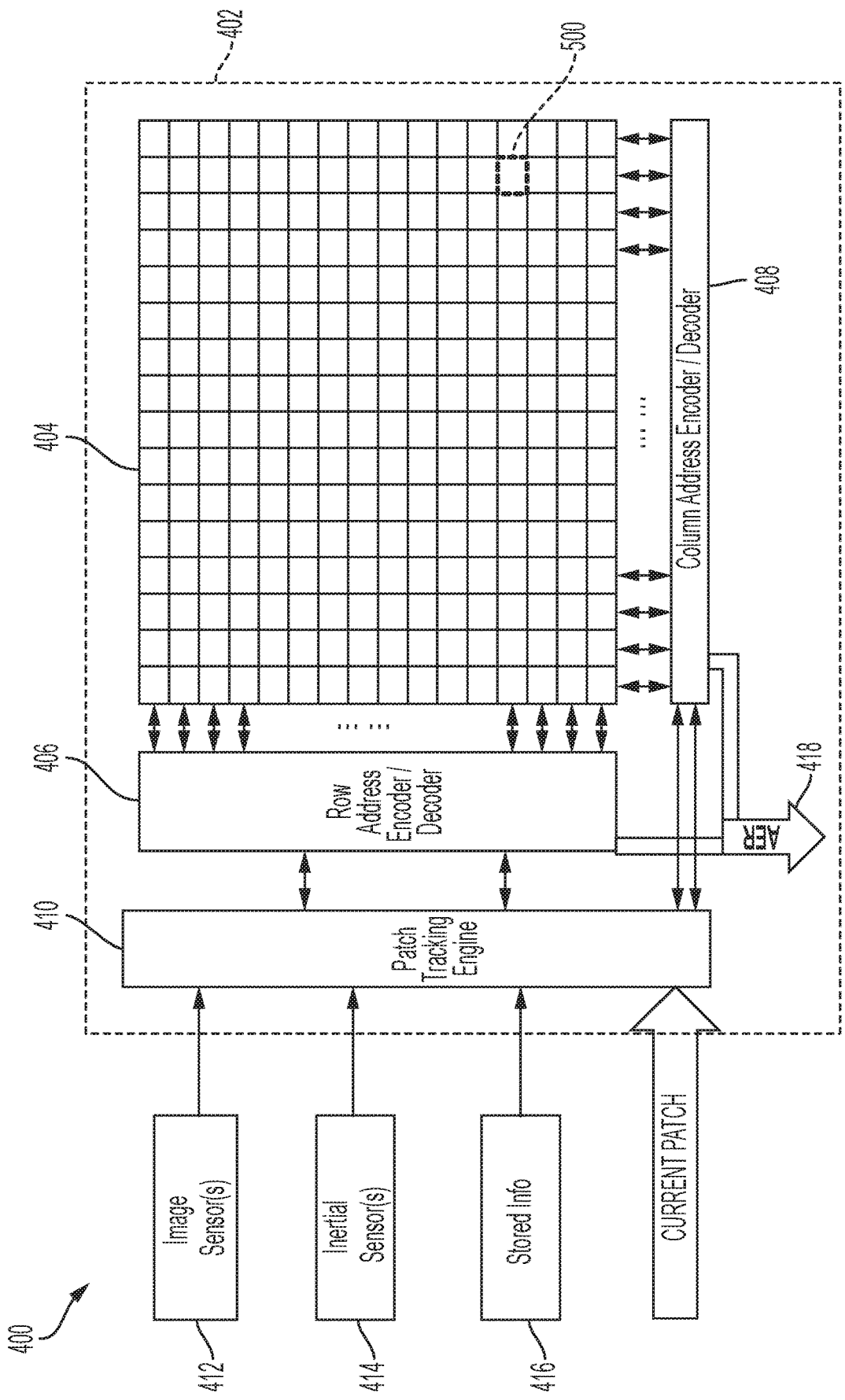
FIG. 4 is a schematic diagram illustrating an image sensing system, according to some embodiments.

FIG. 4 depicts an image sensing system 400, according to some embodiments. The image sensing system 400 may include an image sensor 402, which may include an image array 404, which may contain multiple pixels, each responsive to light, as in a conventional image sensor. Sensor 402 further may include circuitry to access each pixel. Accessing a pixel may entail obtaining information about incident light generated by that pixel. Alternatively or additionally, accessing a pixel may entail controlling that pixel, such as by configuring it to provide an output only upon detection of some event.

In the illustrated embodiment, image array 404 is configured as an array with multiple rows and columns of pixels. In such an embodiment, the access circuitry may be implemented as row address encoder/decoder 406 and column address encoder/decoder 408. Image sensor 402 may further contain circuitry that generates inputs to the access circuitry to control the timing and order in which information is read out of pixels in image array 404. In the illustrated embodiment, that circuitry is patch tracking engine 410. In contrast to a conventional image sensor that may output image information captured by pixels in each row successively, image sensor 402 may be controlled to output image information in specified patches. Further, the locations of those patches with respect to the image array may change over time. In the embodiment illustrated, patch tracking engine 410 may output image array access information to control the output of image information from portions of the image array 404 corresponding to the location of patches, and the access information may change dynamically, based on estimates of the motion of objects in an environment and/or motion of the image sensor relative to those objects.

In some embodiments, the image sensor 402 may have the function of a dynamic vision sensor (DVS) such that the image information is provided by the sensor only when there is a change in an image property (e.g., intensity) for a pixel. For example, the image sensor 402 may apply one or more thresholds that define ON and OFF states of a pixel. The image sensor may detect that a pixel changed state and selectively provide outputs for only those pixels, or only those pixels in a patch, that changed state. These outputs may be made asynchronously as they are detected, rather than as part of a readout of all pixels in the array. The output, for example, may be in the form of address-event representation (AER) 418, which may include pixel addresses (e.g., row and column) and the types of event (ON or OFF). An ON event may indicate a pixel cell at a respective pixel address senses an increase in light intensity; and an OFF event may indicate a pixel cell at a respective pixel address senses a decrease in light intensity. The increase or decrease may be relative to an absolute level or may be a change relative to a level at the last output from the pixel. That change may be expressed as a fixed offset or as a percentage of the value at the last output from the pixel, for example.

Use of DVS techniques in connection with patch tracking may enable an image sensor suitable for use in XR systems. When combined in an image sensor, the amount of generated data may be limited to data from pixel cells that are within a patch and that detect a change that would trigger output of an event.

In some scenarios, high resolution image information is desirable. However, using a large sensor, with over one million pixel cells, to generate high resolution image information might generate large amounts of image information when DVS techniques are used. The inventors have recognized and appreciated that a DVS sensor might produce a large number of events reflecting movement in the background or changes in an image other than as a result of motion of an object being tracked. Currently, resolutions of DVS sensors are limited to below 1 MB, for example, 128×128, 240×180, and 346×260 so as to limit the number of events generated. Such sensors sacrifice resolution for tracking objects, and might not, for example, detect fine finger movements of a hand. Moreover, if the image sensor outputs image information in other formats, limiting the resolution of sensor array to output a manageable number of events may also limit use of the image sensor for generating high-resolution image frames together with the DVS function. Sensors as described herein may have a resolution higher than VGA, including up to 8 megapixels or 12 megapixels, in some embodiments. Nonetheless, patch tracking as described herein may be used to limit the number of events output by the image sensor per second. As a result, image sensors that operate in at least two modes may be enabled. For example an image sensor with megapixel resolution may operate in a first mode in which it outputs events in specific patches being tracked. In a second mode, it may output high resolution image frames or portions of image frames. Such an image sensor may be controlled in an XR system to operate in these different modes based on the function of the system.

Figure 5:
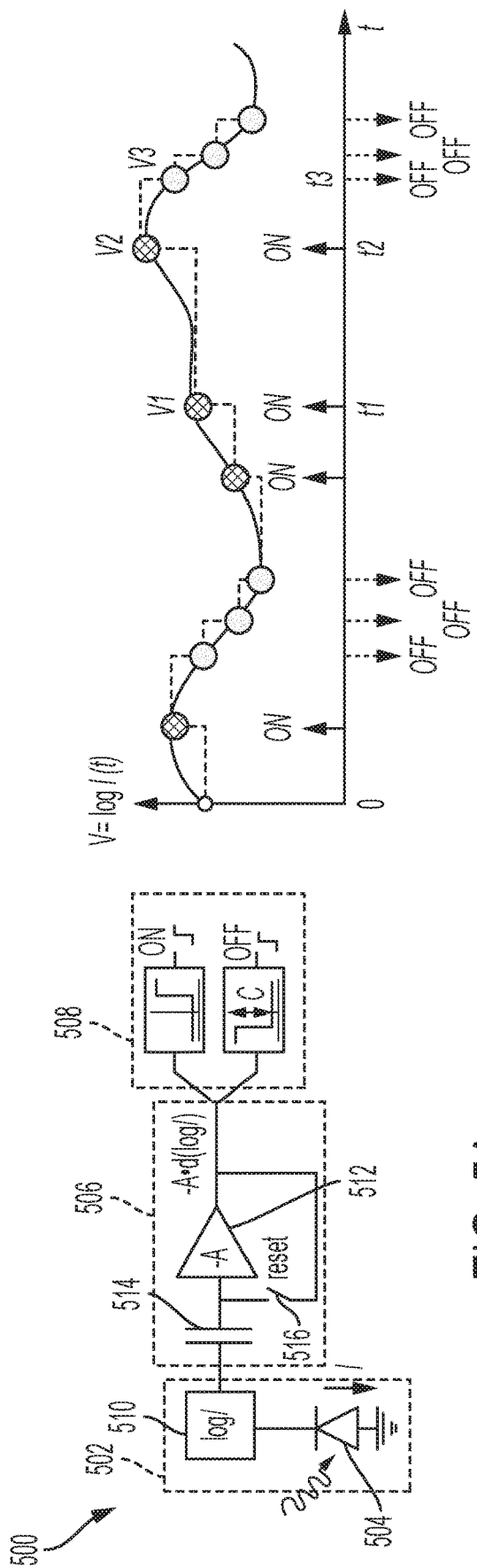
FIG. 5A is a schematic diagram illustrating a pixel cell in FIG. 4, according to some embodiments.
FIG. 5B is a schematic diagram illustrating an output events of the pixel cell of FIG. 5A, according to some embodiments.

The image array 404 may include a plurality of pixel cells 500 arranged in an array. FIG. 5A depicts an example of the pixel cell 500, which in this embodiment is configured for use in an imaging array that implements DVS techniques. Pixel cell 500 may include a photoreceptor circuit 502, a differencing circuit 506, and a comparator 508. The photoreceptor circuit 502 may include a photodiode 504 that converts light striking the photodiode into a measurable electrical signal. In this example, the conversion is to an electrical current I. Transconductance amplifier 510 converts the photo current I into a voltage. That conversion may be linear or non-linear, such as according to a function of log I. Regardless of the specific transfer function, the output of transconductance amplifier 510 indicates the amount of light detected at photodiode 504. Although a photodiode is illustrated as an example, it should be appreciated that other light-sensitive components that produce a measurable output in response to incident light may be implemented in the photoreceptor circuit in place of or in addition of the photodiode.

In the embodiment of FIG. 5A, circuitry to determine whether the output of the pixel has changed sufficiently to trigger an output for that pixel cell is incorporated into the pixel itself. In this example, that function is implemented by differencing circuit 506 and comparator 508. The differencing circuit 506 may be configured to reduce DC mismatch between pixel cells by, for example, balancing the output of the differencing circuit to a reset level after the generation of an event. In this example, differencing circuit 506 is configured to produce an output showing a change in the output of photodiode 504 since the last output. The differencing circuit may include an amplifier 512 having a gain −A, a capacitor 514, which may be implemented as a single circuit element or one or more capacitors connected in a network, and a reset switch 516.

In operation, the pixel cell will be reset by momentarily closing switch 516. Such a reset may occur at the beginning of operation of the circuit as well as at any time thereafter that an event is detected. When the pixel 500 is reset, the voltage across capacitor 514 is such that, when subtracted from the output of transconductance amplifier 510, a zero voltage at the input of amplifier 512 results. When switch 516 opens, the output of transconductance amplifier 510 will be such that, in combination with the voltage drop across capacitor 514, there is a zero voltage at the input of amplifier 512. The output of transconductance amplifier 510 changes as a result of a change in the amount of light striking photodiode 504. When the output of transconductance amplifier 510 increases or decreases, the output of amplifier 512 will swing positive or negative, by the change amount, amplified by the gain of amplifier 512.

The comparator 508 may determine whether an event is generated and the sign of the event by, for example, comparing the output voltage V of the differencing circuit to a predetermined threshold voltage C. In some embodiments, the comparator 508 may include two comparators comprising transistors, one pair may operate when the output of amplifier 512 shows a positive change, and may detect increasing changes (ON events); the other comparator may operate when the output of amplifier 512 shows a negative change, and may detect decreasing changes (OFF events). It should be appreciated, however, that amplifier 512 may have a negative gain. In such an embodiment, an increase in the output of transconductance amplifier 510 may be detected as a negative voltage change at the output of amplifier 512. Similarly, it should be appreciated that positive and negative voltages may be relative to earth ground or any suitable reference level. Regardless, the value of the threshold voltage C may be controlled by characteristics of the transistors (e.g., transistor sizes, transistor threshold voltages) and/or by values of the reference voltages that may be applied to the comparator 508.

FIG. 5B depicts an example of event outputs (ON, OFF) of the pixel cell 500 over time t. In the illustrated example, at time t1, the output of the differencing circuit has a value of V1; at time t2, the output of the differencing circuit has a value of V2; and at time t3, the output of the differencing circuit has a value of V3. Between time t1 and time t2, although the photodiode senses some increases in light intensity, the pixel cell outputs no events because the changes of V does not exceed the value of the threshold voltage C. At time t2, the pixel cell outputs an ON event because V2 is larger than V1 by the value of the threshold voltage C. Between time t2 and time t3, although the photodiode senses some decreases in light intensity, the pixel cell outputs no events because the changes of V does not exceed the value of the threshold voltage C. At time t3, the pixel cell outputs an OFF event because V3 is less than V2 by the value of the threshold voltage C.

Each event may trigger an output at AER 418. The output may include, for example, an indication of whether the event is an ON or OFF event and an identification of the pixel, such as its row and column. Other information may alternatively or additionally be included with the output. For example, a time stamp might be included, which might be useful if events are queued for later transmission or processing. As another example, the current level at the output of amplifier 510 might be included. Such information might be optionally included, for example, if further processing, in addition to detecting motion of objects, is to be performed.

It should be appreciated that the frequency of the event outputs and thus the sensitivity of the pixel cell may be controlled by the value of the threshold voltage C. For example, the frequency of the event outputs may be reduced by increasing the value of the threshold voltage C, or increased by reducing the threshold voltage C. It should also be appreciated that the threshold voltage C may be different for an ON event and an OFF event by, for example, setting different reference voltages for the comparator for detecting an ON event and the comparator for detecting an OFF event. It should also be appreciated that a pixel cell may also output a value indicating the size of light intensity changes in place of or in addition to the sign signals that indicates the detection of events.

The pixel cell 500 of FIGS. 5A and 5B is illustrated as an example according to some embodiments. Other designs may also be suitable for a pixel cell. In some embodiments, a pixel cell may include the photoreceptor circuit and differencing circuit but share a comparator circuit with one or more other pixel cells. In some embodiments, a pixel cell may include circuitry configured to calculate values of changes, for example, an active pixel sensor at the pixel level.

Regardless of the manner in which events are detected for each pixel cell, the ability to configure pixels to output only upon detection of an event may be used to limit the amount of information required to maintain a model of the positions of non-fixed (i.e. movable) objects. For example, pixels within a patch may be set with a threshold voltage C triggered when a relatively small change occurs. Other pixels, outside of a patch, may have a larger threshold, such as three or five times. In some embodiments, the threshold voltage C for pixels outside of any patch may be set so large that the pixel is effectively disabled and does not produce any output, regardless of the amount of change. In other embodiments, pixels outside a patch may be disabled in other ways. In such an embodiment, the threshold voltage may be fixed for all pixels, but pixels may be selectively enabled or disabled based on whether they are within a patch.

In yet other embodiments, the threshold voltage for one or more pixels may be set adaptively as a way to modulate the amount of data output from an image array. For example, an AR system may have processing capacity to process a number of events per second. The threshold for some or all pixels may be increased when the number of events per second being output exceeds an upper limit. Alternatively or additionally, the threshold might be lowered when the number of events per second dropped below a lower limit, enabling more data for more accurate processing. The number of events per second, as a specific example, may be between 200 and 2,000 events. Such a number of events constitutes a substantial reduction in the number of pieces of data to be processed per second compared, for example, to processing all of the pixel values scanned out from an image sensor, which would constitute 30 million or more pixel values per second. That number of events is even a reduction in comparison to processing just the pixels within a patch, which may be lower, but nonetheless may be multiple tens of thousands of pixel values or more per second.

The control signals to enable and/or set threshold voltages for each of multiple pixels may be generated in any suitable way. However, in the illustrated embodiment, those control signals are set by patch tracking engine 410 or based on processing within processing module 72 or other processor.

Referring back to FIG. 4, the image sensing system 400 may receive inputs from any suitable components such that the patch tracking engine 410 may dynamically select at least one region of the image array 404 to be enabled and/or disabled based at least on the received inputs so as to implement the patch. Patch tracking engine 410 may be digital processing circuitry that has memory, storing one or more parameters of a patch. The parameters may be, for example, the boundaries of the patch, and may include other information, such as information about scale factors between motion of the image array and motion within the image array of an image of a movable object associated with the patch. Patch tracking engine 410 may also include circuitry configured to perform calculations on the stored values and other measured values supplied as inputs.

In the illustrated embodiment, patch tracking engine 410 receives as an input a designation of a current patch. The patch may be designated based on its size and position within image array 404, such as by specifying a range of row and column addresses of the patch. Such a specification may be provided as an output of processing module 72 (FIG. 2) or other components processing information about the physical world. Processing module 72, for example, may designate a patch to encompass the current location of each movable object within the physical world or a subset of movable objects that are being tracked in order to render a virtual object with appropriate appearance with respect to the physical world. For example, if an AR scene is to include as a virtual object a toy doll balanced on a physical object such as a moving toy car, a patch may be designated encompassing that toy car. A patch might not be designated for another toy car, moving in the background, as there may be less need to have up-to-date information about that object in order to render a realistic AR scene.

Regardless of how the patch is selected, information about the current position of the patch may be supplied to patch tracking engine 410. In some embodiments, patches may be rectangular, such that the location of the patch may be simply specified as a beginning and ending row and column. In other embodiments, patches may have other shapes, such as circular and the patch may be specified in other ways, such as by a center point and a radius.

In some embodiments, trajectory information may also be supplied about the patch. The trajectory, for example, may specify motion of the patch with respect to coordinates of image array 404. Processing module 72, for example, may construct a model of the motion of the movable object within the physical world and/or the motion of the image array 404 with respect to the physical world. As motion of either or both may affect the location within image array 404 where an image of an object is projected, the trajectory of a patch within the image array 404 may be computed based on either or both. The trajectory may be specified in any suitable way, such as the parameters of a linear, quadratic, cubic or other polynomial equation.

In other embodiments, patch tracking engine 410 may dynamically compute the location of a patch based on inputs from sensors providing information about the physical world. Information from the sensors may be supplied directly from the sensors. Alternatively or additionally, the sensor information may be processed to extract information about the physical world before being supplied to patch tracking engine 410. Extracted information, for example, may include motion of image array 404 with respect to the physical world, distance between image array 404 and an object whose image falls within a patch or other information that may be used to dynamically align a patch in the image array 404 with an image of an object in the physical world as image array 404 and/or the object moves.

Examples of the input components may include image sensors 412 and inertial sensors 414. Examples of the image sensors 412 may include the eye tracking cameras 50, depth sensor 51, world cameras 52 and/or camera 52. Examples of the inertial sensors 414 may include inertial measurement units 57. In some embodiments, input components may be selected to provide data at a relatively high rate. Inertial measurement units 57, for example, may have an output rate between 200 and 2,000 measurements per second, such as between 800 and 1,200 measurements per second. The patch position may be updated at a similarly high rate. By using inertial measurement units 57 as a source of input to patch tracking engine 410, the location of a patch may be updated 800 to 1,200 times per second, as one specific example. In this way, a movable object may be tracked with high accuracy, using a relatively small patch that limits the number of events that need to be processed. Such an approach may lead to very low latency between a change of relative position of the image sensor and a movable object, with similarly low latency of updates to the rendering of virtual objects so as to provide a desirable user experience.

In some scenarios, a movable object being tracked with a patch may be a stationary object within the physical world. The AR system, for example, may identify stationary objects from analyzing multiple images taken of the physical world and select features of one or more of the stationary objects as reference points for determining motion of a wearable device having image sensors on it. Frequent and low latency updates of the locations of these reference points relative to a sensor array may be used to provide frequent and low latency computations of head pose of a user of the wearable device. As head pose may be used to realistically render virtual objects via a user interface on the wearable, frequent and low latency updates of head pose improves the user experience of the AR system. Thus, having inputs to patch tracking engine 410 that control the position of a patch come only from sensors with a high output rate, such as one or more inertial measurement units, may lead to a desirable user experience of the AR system.

However, in some embodiments, other information may be supplied to patch tracking engine 410 to enable it to compute and/or apply a trajectory to a patch. This other information may include stored information 416, such as the passable world module 38 and/or mapped mesh model 46. This information may indicate one or more prior positions of an object relative to the physical world such that consideration of changes of these prior positions and/or changes in the current position relative to the prior positions may indicate a trajectory of an object in the physical world, which might then be mapped to a trajectory of a patch across image array 404. Other information in a model of a physical world may alternatively or additionally be used. For example, the size of a movable object and or distance or other information on position relative to image array 404 may be used to compute either a location or trajectory of a patch across image array 404 associated with that object.

Regardless of the manner in which the trajectory is determined, patch tracking engine 410 may apply that trajectory to compute an updated location of the patch within the image array 404 at a high rate, such as faster than once per second or more than 800 times per second. The rate may be limited by processing capability, so as to be less than 2,000 times per second, in some embodiments.

It should be appreciated that the processing to track changes in a movable object may be less than to reconstruct the full physical world. However, there may be a reconstruction of the physical world at intervals longer than the intervals between updates in the positions of movable objects, such as every 30 seconds or every 5 seconds. The location of objects to track, and the location of a patch that will capture information about those objects may be recalculated when there is a reconstruction of the physical world.

FIG. 4 illustrates an embodiment in which the processing circuitry to both dynamically generate a patch and control the selective outputting of image information from within that patch is configured to control image array 404 directly so that image information output from the array is limited to the selected information. Such circuitry, for example, may be integrated into the same semiconductor chip that houses the image array 404 or may be integrated to a separate controller chip for image array 404. However, it should be appreciated that the circuitry generating the control signals for image array 404 may be distributed throughout an XR system. For example, some or all of the functions may be performed by programming in processing module 72 or other processor within the system.

The image sensing system 400 may output image information, for each of a plurality of pixels. Each pixel of the image information may correspond to one of the pixel cells of the image array 404. The output image information from the image sensing system 400 may be image information for each of one or more patches corresponding to the at least one region of the image array 404, selected by the patch tracking engine 410. In some embodiments, such as when each pixel of the image array 404 has a differential configuration than as illustrated in FIG. 5A, the pixels in the output image information may identify pixels for which a change of light intensity was detected by the image sensor 400 within one or more patches.

In some embodiments, the output image information from the image sensing system 400 may be image information for pixels outside each of one or more patches corresponding to the at least one region of the image array, selected by the patch tracking engine 410. For example, a deer may be running in a physical world with a running river. Details of river waves may not be of interest, but may trigger pixel cells of the image array 402. The patch tracking engine 410 may create a patch enclosing the river, and disable a portion of the image array 402 corresponding to the patch enclosing the river.

Based on the identification of changed pixels, further processing may be performed. For example, portions of a world model corresponding to portions of the physical world being imaged by the changed pixels may be updated. These updates may be performed based on information collected with other sensors. In some embodiments, further processing may be conditioned on or triggered by multiple changed pixels in a patch. For example, updates may be performed once 10%, or some other threshold amount of pixels, in a patch detect a change.

In some embodiments, image information in other formats may be output from an image sensor, and may be used in combination with change information to make updates to a world model. In some embodiments, the format of the image information output from the image sensor may change from time to time during operation of a VR system. In some embodiments, for example, pixel cells 500 may be operated to produce at some times differential outputs, such as are produced in comparators 508. The output of amplifier 510 may be switchable to output at other times the magnitude of light incident on photodiode 504. For example, the output of amplifier 510 may be switchably connected to a sense line that is, in turn connected to an A/D converter that can provide a digital indication of the magnitude of the incident light based on the magnitude of the output of amplifier 510.

An image sensor in this configuration may be operated as part of an AR system to output differentially most of the time, outputting an event only for pixels for which a change above a threshold is detected or outputting an event only for pixels within a patch for which a change above a threshold is detected. Periodically, such as every 5 to 30 seconds, a full image frame, with magnitude information for all pixels in the image array may be output. Low latency and accurate processing may be achieved in this way, with the differential information being used to quickly update selected portions of a world model for which changes most likely to affect user perception occurred whereas the full image may be used to more update larger portions of the world model. Though the full updates to the world model occur only at the slower rate, any delay in updating the model may not meaningfully impact the user's perception of the AR scene.

The output mode of the image sensor may be changed from time to time throughout the operation of the image sensor such that the sensor outputs one or more of intensity information for some or all of the pixels and an indication of a change for some or all of the pixels in the array.

Figure 6:
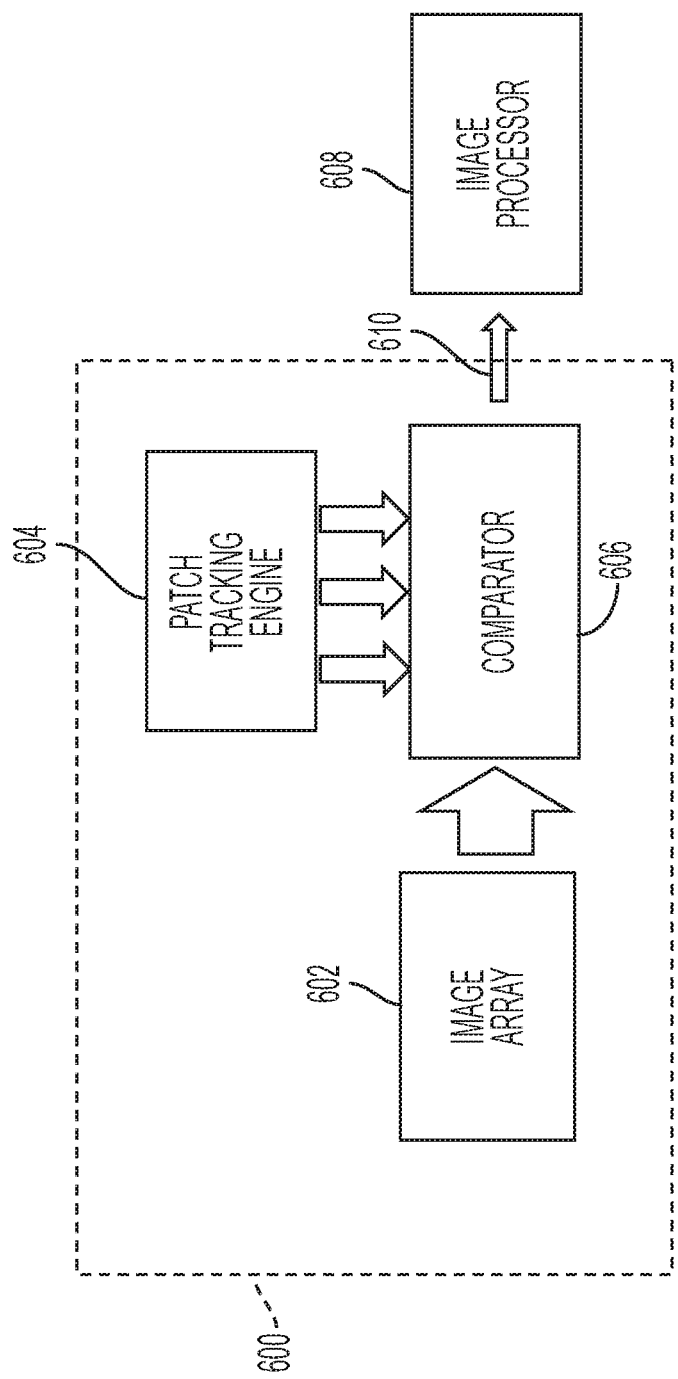
FIG. 6 is a schematic diagram illustrating an image sensor, according to some embodiments.

It is not a requirement that image information from patches be selectively output from an image sensor by limiting the information output from the image array. In some embodiments, image information may be output by all pixels in the image array and only information about specific regions of the array may be output from the image sensor. FIG. 6 depicts an image sensor 600, according to some embodiments. The image sensor 600 may include an image array 602. In this embodiment, image array 602 may be similar to a conventional image array that scans out rows and columns of pixel values. Operation of such an image array may be adapted by other components. The image sensor 600 may further include patch tracking engine 604, and/or comparator 606. Image sensor 600 may provide an output 610 to an image processor 608. Processor 608, for example, may be a portion of processing module 72 (FIG. 2).

Patch tracking engine 604 may have a structure and function similar to patch tracking engine 410. It may be configured to receive signals specifying at least one selected region of the image array 602 and then generate control signals specifying a dynamic location of that region based on a computed trajectory within image array 602 of an image of an object represented by that region. In some embodiments, the patch tracking engine 604 may receive signals specifying at least one selected region of the image array 602, which may include trajectory information for the region or regions. The patch tracking engine 604 may be configured to perform computations that dynamically identify pixel cells within the at least one selected region based on the trajectory information. Variations in the implementation of patch tracking engine 604 are possible. For example, the patch tracking engine may update the location of the patch based on sensors indicating motion of the image array 602 and/or projected motion of an object associated with the patch.

In the embodiment illustrated in FIG. 6, image sensor 600 is configured to output differential information for pixels within identified patches. Comparator 606 may be configured to receive control signals from patch tracking engine 604 that identify pixels within the patch. Comparator 606 may selectively operate on pixels being output from image array 602 that have addresses within the patch as indicated by patch tracking engine 604. Comparator 606 may operate on the pixel cells so as to generate signals indicating a change in sensed light detected by the at least one region of the image array 602. As one example of an implementation, comparator 606 may contain memory elements storing reset values of pixel cells within the array. As current values of those pixels are scanned out of image array 602, circuitry within comparator 606 may compare the stored value to the current value and output an indication when the difference exceeds a threshold. Digital circuitry, for example, may be used to store values and make such a comparison. In this example, the output of image sensor 600 may be processed like the output of image sensor 400.

In some embodiments, the image array 602, patching tracking engine 604, and the comparator 606 may be implemented in a single integrated circuit, such as a CMOS integrated circuit. In some embodiments, the image array 602 may be implemented in a single integrated circuit. The patch tracking engine 604 and comparator 606 may be implemented in a second single integrated circuit, configured as, for example, a driver for the image array 602. Alternatively or additionally, some or all of the functions of patch tracking engine and/or comparator 606 may be distributed to other digital processors within the AR system.

Figure 7:
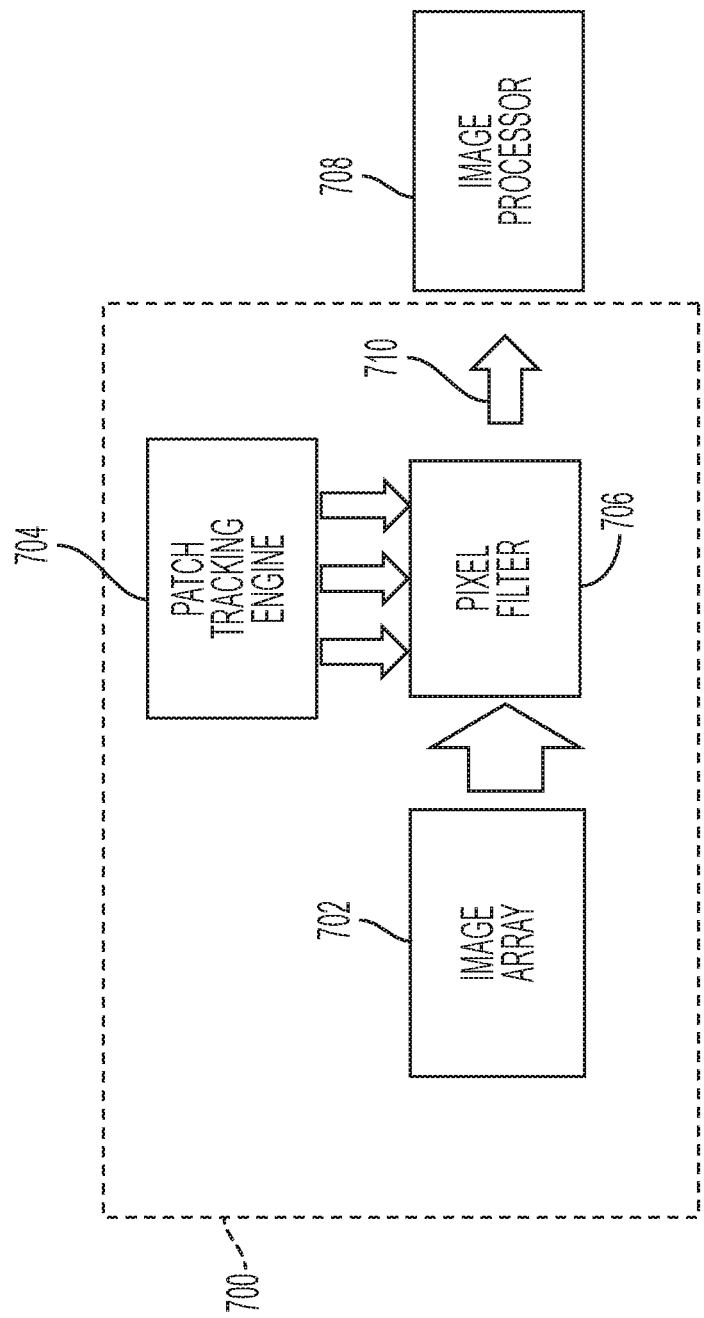
FIG. 7 is a schematic diagram illustrating an image sensor, according to some embodiments.

Other configurations or processing circuitry are also possible. FIG. 7 depicts an image sensor 700, according to some embodiments. The image sensor 700 may include an image array 702. In this embodiment, image array 702 may have pixel cells with a differential configuration, such as is shown for pixel 500 in FIG. 5A. However, the embodiments herein are not limited to differential pixel cells as patch tracking may be implemented with image sensors that output intensity information.

In the illustrated embodiment of FIG. 7, patch tracking engine 704 produces control signals indicating addresses of the pixel cells within one or more patches being tracked. Patch tracking engine 704 may be constructed and operate like patch tracking engine 604. Here, patch tracking engine 704 provides control signals to pixel filter 706, which passes to output 710 image information from only those pixels within a patch. As shown, output 710 is coupled to an image processor 708, which may further process the image information for pixels within a patch using techniques as described herein or in other suitable ways.

Figure 8:
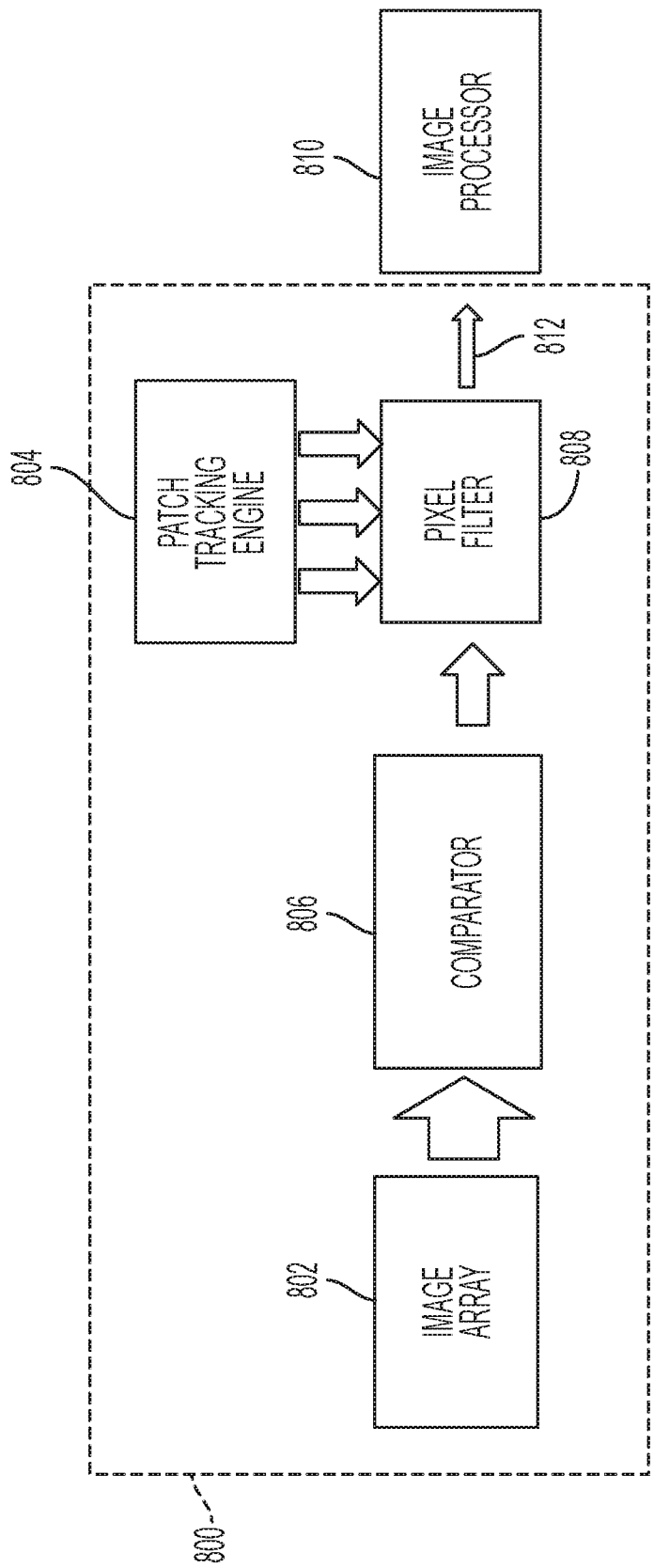
FIG. 8 is a schematic diagram illustrating an image sensor, according to some embodiments.

A further variation is illustrated in FIG. 8, which depicts an image sensor 800, according to some embodiments. Image sensor 800 may include an image array 802, which may be a conventional image array that scans out intensity values for pixels. That image array may be adapted to provide differential image information as described herein through the use of comparator 806. Comparator 806 may, similarly to comparator 606, compute difference information based on stored values for the pixels. Selected ones of those difference values may be passed to output 812 by pixel filter 808. As with pixel filter 706, pixel filter 808 may receive control inputs from a patch tracking engine 804. Patch tracking engine 804 may be similar to patch tracking engine 704). Output 812 may be coupled to an image processor 810. Some or all of the above-mentioned components of the image sensor 800 may be implemented in a single integrated circuit. Alternatively, the components may be distributed across one or more integrated circuits or other components.

Figure 9:
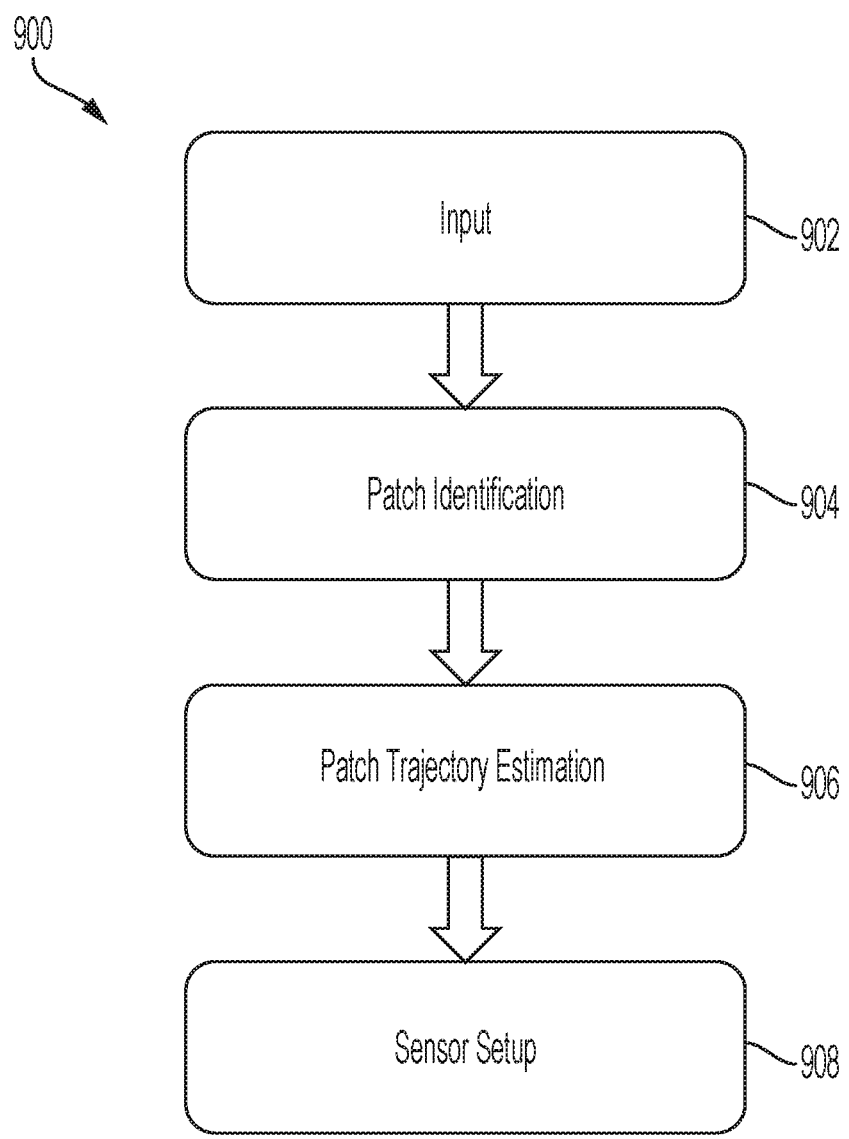
FIG. 9 is a simplified flow chart of a method for image sensing, according to some embodiments.

Image sensors as described herein may be operated as part of an augmented reality system to maintain information about movable objects or other information about a physical world useful in rendering images of virtual objects realistically in combination with information about a physical environment. FIG. 9 depicts a method 900 for image sensing, according to some embodiments.

Figure 10:
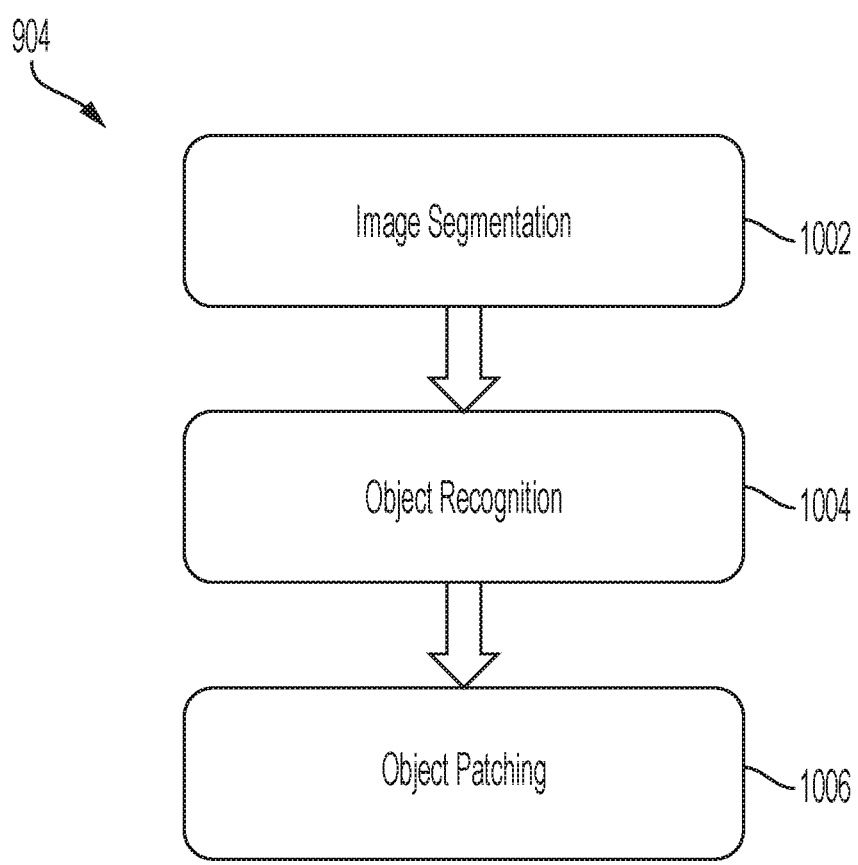
FIG. 10 is a simplified flow chart of the act of patch identification of FIG. 9, according to some embodiments.
Figure 11:
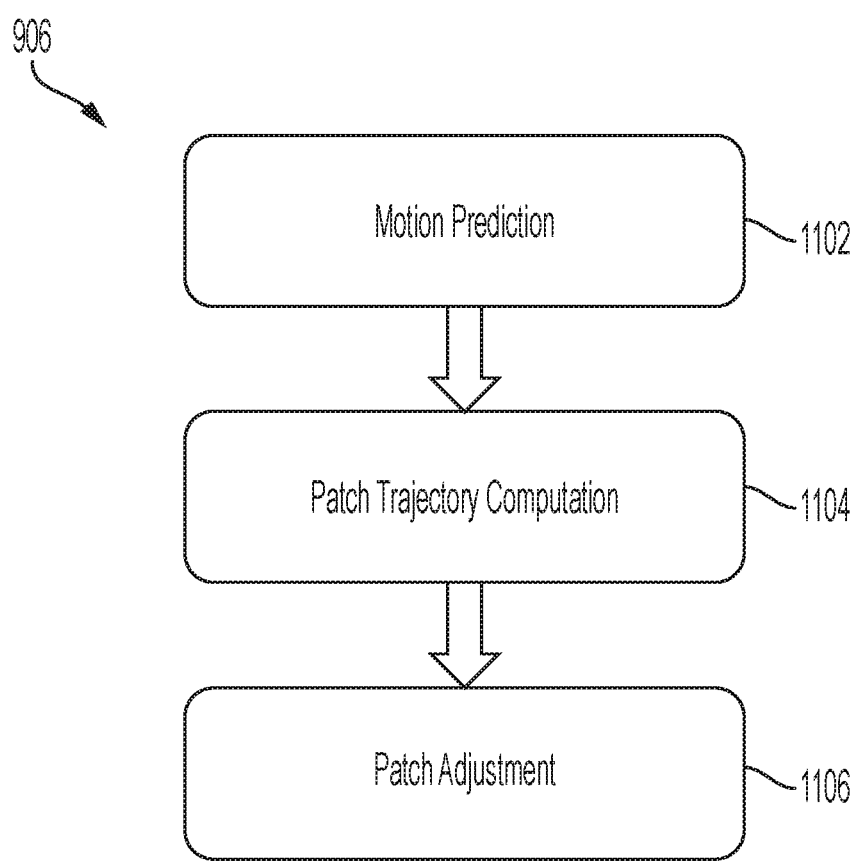
FIG. 11 is a simplified flow chart of the act of patch trajectory estimation of FIG. 9, according to some embodiments.

At least a part of the method 900 may be performed to operate an image sensor including, for example, the image sensors 400, 600, 700 or 800. The method 900 may start from receiving (act 902) imaging information from one or more inputs including, for example, the image sensors 412, inertial sensors 414, and stored information 416. The method 900 may include identifying (act 904) one or more patches on an image output of the image sensing system based at least in part on the received information. An example of act 904 is illustrated in FIG. 10. In some embodiments, the method 900 may include computing (act 906) moving trajectories for the one or more patches. An example of act 906 is illustrated in FIG. 11.

The method 900 may also include setting (act 908) the image sensing system based at least in part on the identified one or more patches and/or their estimated moving trajectories. The setup may be achieved by enabling a portion of pixel cells of the image sensing system based at least in part on the identified one or more patches and/or their estimated moving trajectories through, for example, the comparator 606, pixel filter 706 and so on. In some embodiments, the comparator 606 may receive a first reference voltage value for pixel cells corresponding to a selected patch on the image, and a second reference voltage value for pixel cells not corresponding to any selected patches on the image. The comparator 606 may set the second reference voltage to be much higher than the first reference voltage such that no reasonable light intensity changes sensed by a pixel cell, which has a comparator cell with the second reference voltage, can result in an output by the pixel cell. In some embodiments, the pixel filter 706 may disable outputs from pixel cells with addresses (e.g., row and column), which do not correspond to any selected patches on the image.

FIG. 10 depicts the patch identification 904, according to some embodiments. The patch identification 904 may include segmenting (act 1002) one or more images from the one or more inputs based at least in part on color, light intensity, angle-of arrival, depth, and semantics.

The patch identification 904 may also include recognizing (act 1004) one or more objects in the one or more images. In some embodiments, the object recognition 1004 may be based at least in part on predetermined features of the object including, for example, hand, eye, face features. In some embodiments, the object recognition 1004 may be based on one or more virtual objects. For example, a virtual animal character is walking on a physical pencil. The object recognition 1004 may target the virtual animal character as the object. In some embodiments, the object recognition 1004 may be based at least in part on artificial intelligence (AI) training received by the image sensing system. For example, the image sensing system may be trained by reading images of cats in different types and colors, and thus learned characteristics of a cat and capable of identifying a cat in a physical world.

The patch identification 904 may include generating (act 1006) the patch based on the one or more objects. In some embodiments, the object patching 1006 may generate the patch by computing convex hulls or bounding boxes for the one or more objects.

FIG. 11 depicts the patch trajectory estimation 906, according to some embodiments. The patch trajectory estimation 906 may include predicting (act 1102) movements for the one or more patches over time. The movements for the one or more patches may be caused by multiple reasons including, for example, a moving object and/or a moving user. The motion prediction 1102 may include deriving moving velocities for a moving object and/or a moving user based on received images and/or received AI training.

The patch trajectory estimation 906 may include computing (act 1104) trajectories for the one or more patches over time based at least in part on the predicted movements. In some embodiments, a trajectory may be computed by modeling with a first order linear equation, assuming an object in motion will continue moving with the same velocity in the same direction. In some embodiments, a trajectory may be computed by curve fitting or using heuristics, including pattern detection.

Figure 12:
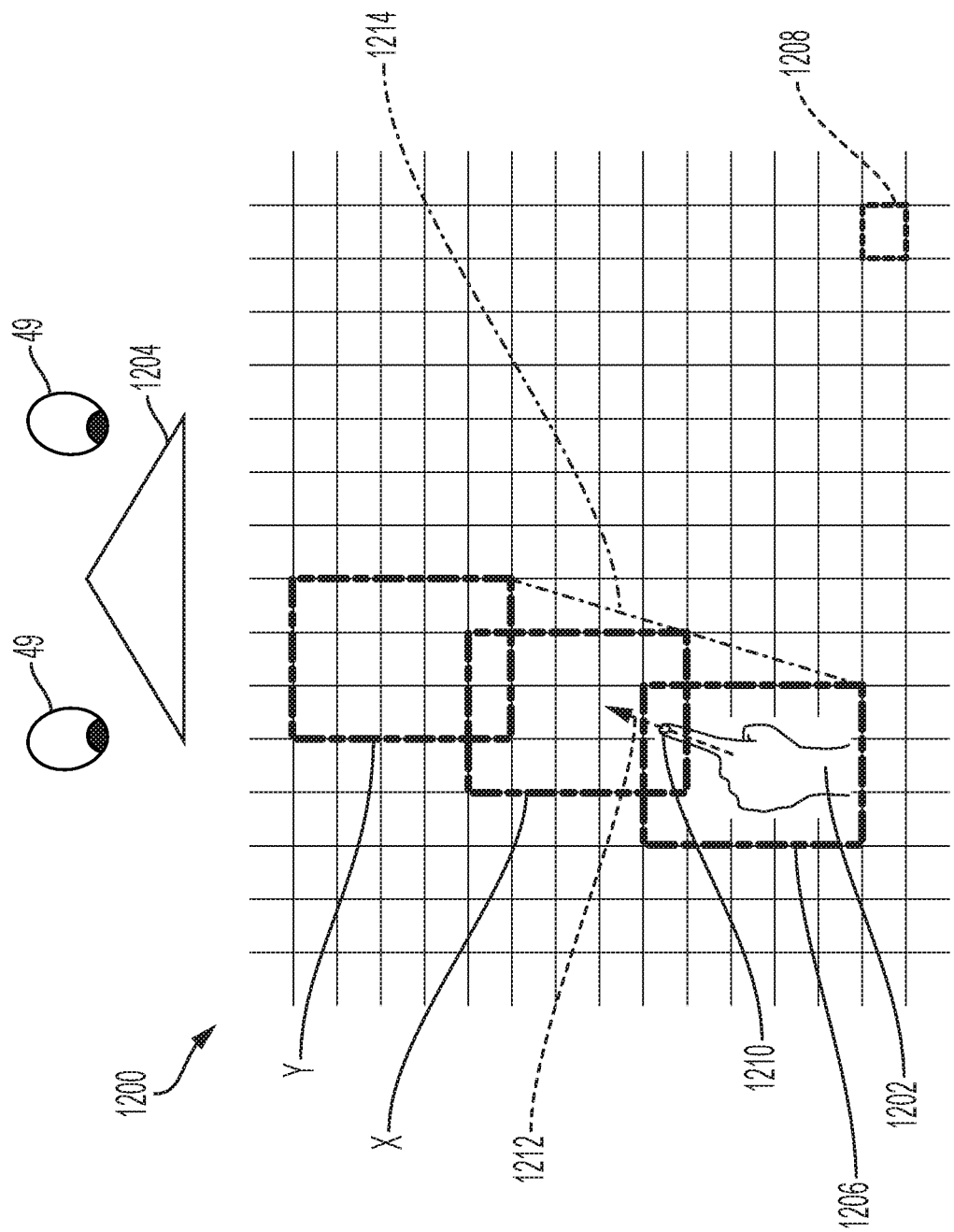
FIG. 12 is a schematic diagram illustrating the patch trajectory estimation of FIG. 11 with respect to one viewpoint, according to some embodiments.
Figure 13:
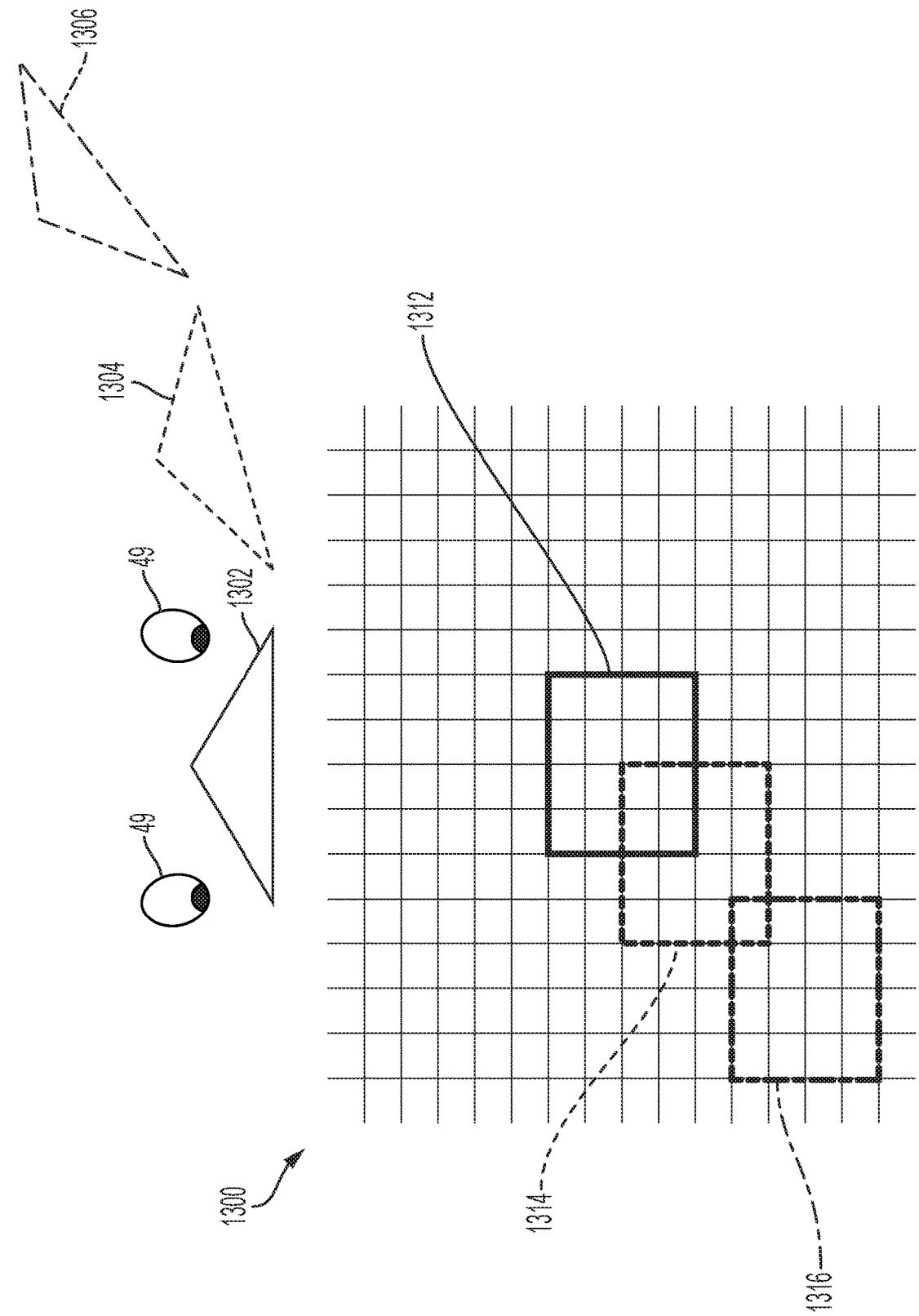
FIG. 13 is a schematic diagram illustrating the patch trajectory estimation of FIG. 11 with respect to viewpoint changes, according to some embodiments.

FIGS. 12 and 13 illustrate factors that may be applied in a calculation of patch trajectory. FIG. 12 depicts an example of a movable object, which in this example is moving object 1202 (e.g., a hand) that is moving relative to the user of an AR system. In this example, a user is wearing an image sensor as part of the head mounted display 62. In this example, the user's eyes 49 are looking straight ahead such that an image array 1200 captures a field of view (FOV) for eyes 49 with respect to one viewpoint 1204. Object 1202 is in the FOV and therefore appears, by creating intensity variations, in corresponding pixels in array 1200.

The array 1200 has a plurality of pixels 1208 arranged in an array. For a system tracking hand 1202, a patch 1206 in that array encompassing object 1202 at a time t0 may include a portion of the plurality of pixels. If object 1202 is moving, the location of a patch capturing that object will change over time. That change may be captured in a patch trajectory, from patch 1206 to patches X and Y used at later times.

The patch trajectory may be estimated, such as in act 906, by identifying a feature 1210 for the object in the patch, for example, a fingertip in the illustrated example. A motion vector 1212 may be computed for the feature. In this example, the trajectory is modeled as a first order linear equation and the prediction is based on an assumption that the object 1202 will continue on that same patch trajectory 1214 over time, leading to patch locations X and Y at each of two successive times.

As the patch location changes, the image of moving object 1202 stays within the patch. Even though image information is limited to information gathered with pixels within the patch, that image information is adequate to represent motion of the moving object 1202. Such will be the case whether the image information is intensity information or differential information as produced by a differencing circuit. In the case of a differencing circuit, for example, an event indicating an increase of intensity might occur as the image of moving object 1202 moves over a pixel. Conversely, when the image of moving object 1202 passes on from a pixel, an event indicating a decrease of intensity might occur. The pattern of pixels with increasing and decreasing events may be used as a reliable indication of motion of moving object 1202, that can be rapidly updated with low latency due to a relatively small amount of data indicating the events. As a specific example, such a system may lead to a realistic XR system that tracks a user's hand and alters the rendering of virtual objects to create the sense for the user that the user is interacting with the virtual objects.

A position of a patch may change for other reasons, and any or all of which may be reflected in the trajectory computation. One such other change is movement of the user when the user is wearing the image sensor. FIG. 13 depicts an example of a moving user, which creates a changing viewpoint for the user as well as the image sensor. In FIG. 13, the user may initially be looking straight ahead at an object with a view point 1302. In this configuration, a pixel array 1300 of an image array will capture objects in front of the user. An object in front of the user may be in patch 1312.

The user may then change the view point, such as by turning their head. The view point may change to view point 1304. Even if the object, previously directly in front of the user, does not move, it will have a different position within the field of view of the user at view point 1304. It will also be at a different point within the field of view of an image sensor worn by the user and therefore a different position within image array 1300. That object, for example, may be contained within a patch at location 1314.

If the user further changes their view point to view point 1306, and the image sensor moves with the user, the location of the object, previously directly in front of the user, will be imaged at a different point within the field of view of an image sensor worn by the user and therefore a different position within image array 1300. That object, for example, may be contained within a patch at location 1316.

As can be seen, as the user changes their viewpoint further, the position of the patch in the image array needed to capture an object moves further. The trajectory of this motion, from location 1312, to location 1314 to location 1316 may be estimated and used for tracking a future position of a patch.

The trajectory may be estimated in other ways. For example, when a user has a view point 1302, a measurement with inertial sensors may indicate the acceleration and velocity of the user's head. This information may be used to predict the trajectory of the patch within the image array based on motion of the user's heard.

The patch trajectory estimation 906 may predict that the user will have a viewpoint 1304 at time t1 and a viewpoint 1306 at time t2 based at least in part on these inertial measurements. Accordingly, the patch trajectory estimation 906 may predict the patch 1308 may move to patch 1310 at time t1 and patch 1312 at time t2.

As an example of such an approach, it may be used to provide accurate and low latency estimations of head pose in an AR system. The patch may be positioned to encompass the image of a stationary object within a user's environment. As a specific example, processing of image information may identify a corner of a picture frame hanging on a wall as a recognizable and stationary object to track. That processing may center a patch on that object. As with the case of moving object 1202, described above in connection with FIG. 12, relative movement between the object and the user's head, will produce events that can be used to compute the relative motion between the user and the tracked object. In this example, because the tracked object is stationary, the relative motion is indicating motion of the imaging array, which is being worn by the user. That motion, therefore, indicates a change in the user's head pose relative to the physical world and can be used to maintain an accurate computation of the user's head pose, which may be used in rendering virtual objects realistically. As an imaging array as described herein can provide rapid updates, with relatively small amounts of data per update, computations to render virtual objects remain accurate (they can be performed quickly and updated frequently).

Referring back to FIG. 11, the patch trajectory estimation 906 may include adjusting (act 1106) a size of at least one of the patches based at least in part on the computed patch trajectories. For example, the size of the patch may be set to be large enough that it includes the pixels where an image of a movable object, or at least a portion of an object for which image information is to be generated, will be projected. The patch may be set to be slightly larger than the projected size of the image of the portion of the object of interest such that if there are any errors in estimating the trajectory of the patch, the patch may nonetheless include the relevant portions of the image. As an object moves relative to an image sensor, the size of the image of that object, in pixels, may change based on distance, incidence angle, orientation of the object or other factors. A processor defining the patch associated with an object may set a size of the patch, such as by measuring, based on other sensor data, or computing based on a world model, a size of a patch relevant for an object. Other parameters of the patch, such as its shape, similarly may be set or updated.

Figure 14:
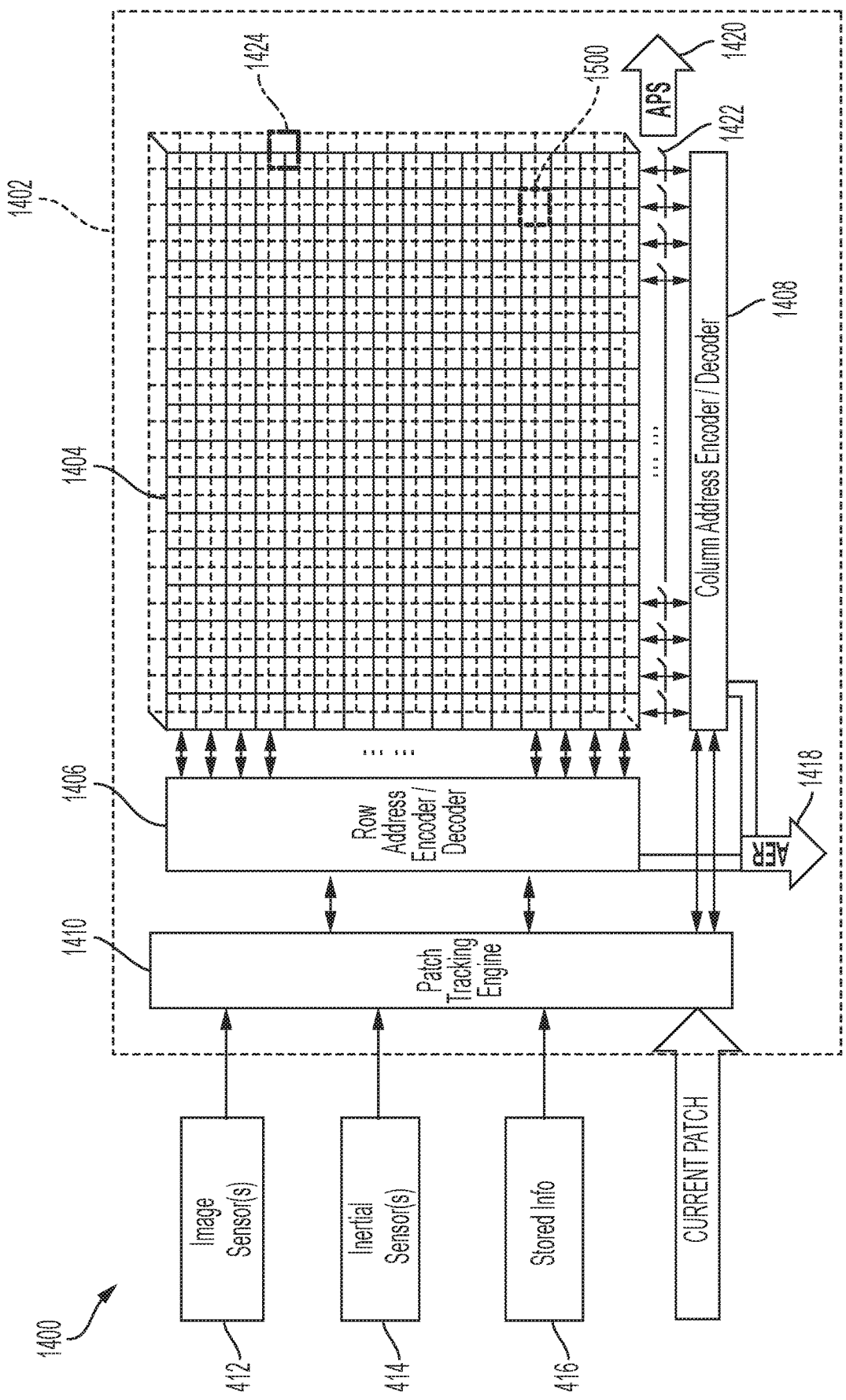
FIG. 14 is a schematic diagram illustrating an image sensing system, according to some embodiments.

FIG. 14 depicts an image sensing system 1400 that is configured for use in an XR system, according to some embodiments. Like image sensing system 400 (FIG. 4), image sensing system 1400 includes circuitry to selectively output values within a patch and may be configured to output events for pixels within a patch, also as described above. Additionally, image sensing system 1400 is configured to selectively output measured intensity values, which may be output for full image frames.

In the embodiment illustrated, separate outputs are shown for events, generated with DVS techniques as described above, and intensity values. Outputs generated with DVS techniques may be output as AER 1418, using representations as described above in connection with AER 418. Outputs representing intensity values may be output through an output, here designated as APS 1420. Those intensity outputs may be for a patch or may be for an entire image frame. The AER and APS outputs may be active at the same time. However, in the illustrated embodiment, image sensor 1400 operates, at any given time, in a mode to output events or a mode in which intensity information is output. A system, in which such an image sensor is used, may selectively use the event output and/or intensity information.

The image sensing system 1400 may include an image sensor 1402, which may include an image array 1404, which may contain multiple pixels 1500, each responsive to light. Sensor 1402 may further include circuitry to access the pixel cells. Sensor 1402 may further include circuitry that generates inputs to the access circuitry to control the mode in which information is read out of pixel cells in image array 1404.

In the illustrated embodiment, image array 1404 is configured as an array with multiple rows and columns of pixel cells, which are accessible in both readout modes. In such an embodiment, the access circuitry may include row address encoder/decoder 1406, column address encoder/decoder 1408 that controls column selection switches 1422, and/or registers 1424 that can temporarily hold information about incident light sensed by one or more corresponding pixel cells. The patch tracking engine 1410 may generate inputs to the access circuitry to control which pixel cells are providing image information at any time.

In some embodiments, the image sensor 1402 may be configured to operate in a rolling shutter mode, a global shutter mode, or both. For example, the patch tracking engine 1410 may generate inputs to the access circuitry to control the readout mode of image array 1402.

When the sensor 1402 operates a rolling shutter readout mode, a single column of pixel cells is selected during each system clock by, for example, closing a single column switch 1422 of the multiple column switches. During that system clock, the selected column of pixel cells is exposed and read out to APS 1420. To generate an image frame by the rolling shutter mode, the columns of pixel cells in the sensor 1402 may be read out one column by one column, and then processed by an image processor to generate the image frame.

When the sensor 1402 operates in a global shutter mode, the columns of pixel cells are exposed at the same time, for example, in a single system clock, and save information in registers 1424 such that the information captured by pixel cells in multiple columns can be read out to APS 1420*b* at the same time. Such readout mode allows direct output of image frames without the need of further data processing. In the illustrated example, the information about incident light sensed by a pixel cell is saved in a respective register 1424. It should be appreciated that multiple pixel cells may share one register 1424.

In some embodiments, the sensor 1402 may be implemented in a single integrated circuit, such as a CMOS integrated circuit. In some embodiments, the image array 1404 may be implemented in a single integrated circuit. The patch tracking engine 1410, row address encoder/decoder 1406, column address encoder/decoder 1408, column selection switches 1422, and/or registers 1424 may be implemented in a second single integrated circuit, configured as, for example, a driver for the image array 1404. Alternatively or additionally, some or all of the functions of the patch tracking engine 1410, row address encoder/decoder 1406, column address encoder/decoder 1408, column selection switches 1422, and/or registers 1424 may be distributed to other digital processors within the AR system.

Figure 15:
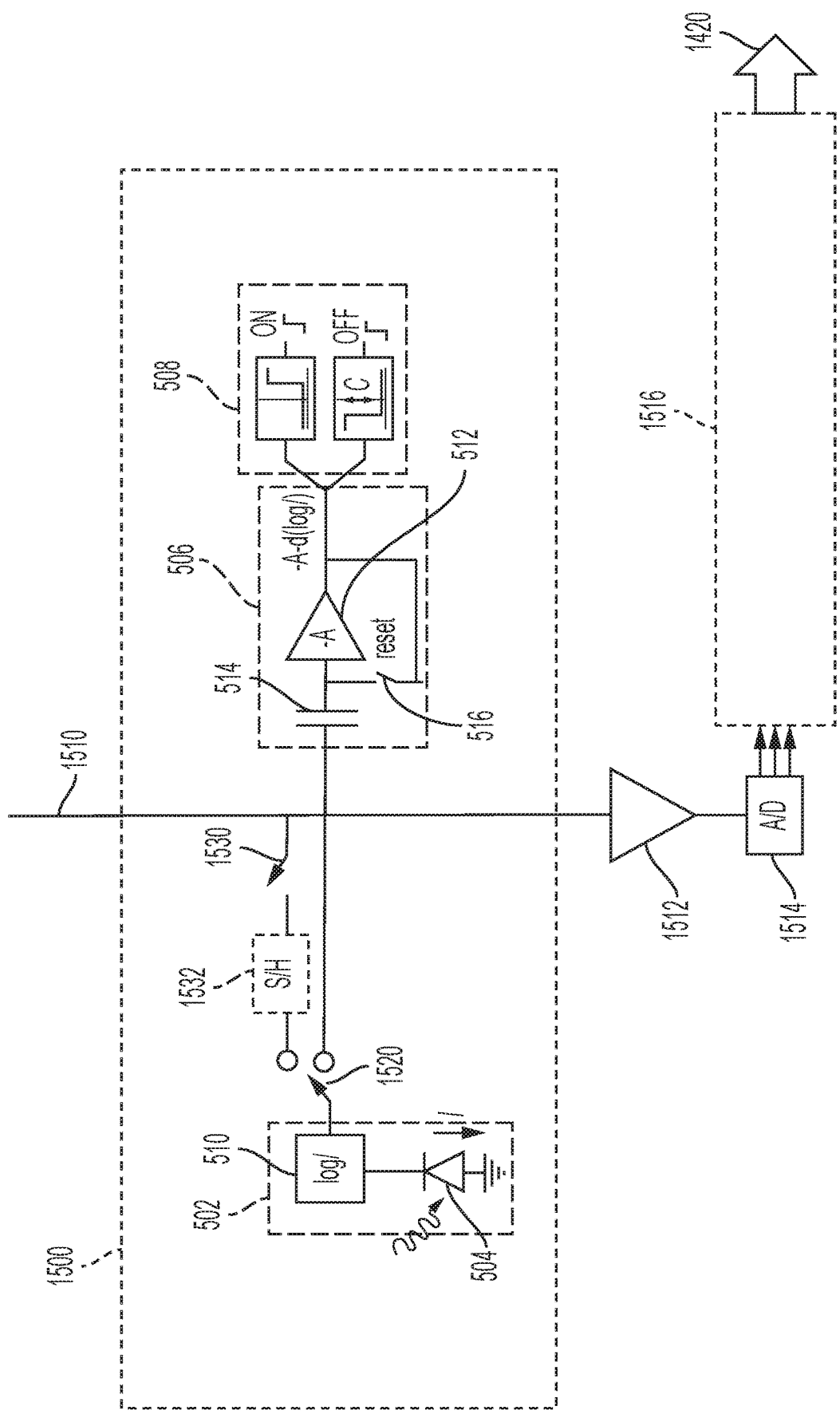
FIG. 15 is a schematic diagram illustrating a pixel cell in FIG. 14, according to some embodiments.

FIG. 15 illustrates an exemplary pixel cell 1500. In the illustrated embodiment, each pixel cell may be set to output either events or intensity information. However, it should be appreciated that, in some embodiments, an image sensor may be configured to output both types of information concurrently.

Both event information and intensity information is based on an output of a photodetector 504, as described above in connection with FIG. 5A. Pixel cell 1500 includes circuitry to generate event information. That circuitry includes a photoreceptor circuit 502, a differencing circuit 506, and a comparator 508, also as described above. Switch 1520 connects photodetector 504 to the event generation circuitry when in a first state. Switch 1520, or other control circuitry, may be controlled by a processor controlling an AR system so that a relatively small amount of image information is provided during substantial periods of time when the AR system is in operation.

Switch 1520, or other control circuitry, may also be controlled to configure pixel cell 1500 to output intensity information. In the illustrated information, intensity information is provided as a full image frame, represented as a stream of pixel intensity values for each pixel in the image array successively. To operate in this mode, switch 1520 in each pixel cell may be set in a second position, which exposes the output of photodetector 504, after passing through amplifier 510, so that it may be connected to an output line.

In the illustrated embodiment, the output line is illustrated as column line 1510. There may be one such column line for each column in an image array. Each pixel cell in a column may be coupled to column line 1510, but the pixel array may be controlled such that one pixel cell is coupled to column line 1510 at a time. Switch 1530, of which there is one such switch in each pixel cell, controls when pixel cell 1500 is connected to its respective column line 1510. Access circuitry, such as row address decoder 410, may close switch 1530 to ensure that only one pixel cell is connected to each column line at a time. Switches 1520 and 1530 may be implemented using one or more transistors that are part of the image array or similar components.

FIG. 15 shows a further component that may be included in each pixel cell in accordance with some embodiments. Sample and hold circuit (S/H) 1532 may be connected between photodetector 504 and column line 1510. When present S/H 1532 may enable image sensor 1402 to operate in a global shutter mode. In a global shutter mode, a trigger signal is concurrently sent to each pixel cell in an array. Within each pixel cell, S/H 1532 captures a value indicating the intensity, at the time of the trigger signal. S/H 1532 stores that value, and generates an output based on that value, until the next value is captured.

As shown in FIG. 15, a signal representing the value stored by S/H 1532 may be coupled to column line 1510 when switch 1530 is closed. The signal coupled to column line may be processed to produce an output of the image array. That signal, for example, may be buffered and/or amplified in amplifier 1512 at the end of column line 1510 and then applied to an analog to digital converter (A/D) 1514. The output of A/D 1514 may be passed through other readout circuit 1516 to output 1420. Readout circuit 1516 may include, for example, column switches 1422. Other components within readout circuit 1516 may perform other functions, such as to serialize a multibit output of A/D 1514.

A person of skill in art would understand how to implement circuits to perform the functions described herein. S/H 1532 may be implemented, for example, as one or more capacitors and one or more switches. However, it should be appreciated that S/H 1532 may be implemented using other components or in other circuit configurations than illustrated in FIG. 15A. It should be appreciated that other components also may be implemented other than as illustrated. For example, FIG. 15 indicates one amplifier and one A/D converter per column. In other embodiments, there may be one A/D converter shared across multiple columns.

In a pixel array configured for global shutter, each S/H 1532 may store an intensity value reflecting image information at the same instant in time. These values may be stored during a readout phase as the values stored in each pixel are successively read out. Successive readout may be achieved, for example, by connecting S/H 1532 of each pixel cell in a row to its respective column line. The values on the column lines may then be passed to APS output 1420 one at a time. Such a flow of information may be controlled by sequencing the opening and closing of column switches 1422. That operation may be controlled by column address decoder 1408, for example. Once the values for each of the pixels of one row are read out, pixel cells in the next row may be connected to the column lines in their place. Those values may be read out, one column at a time. The process of reading out values for one row at a time may be repeated until intensity values for all pixels in the image array are read out. In embodiments in which intensity values are read out for one or more patches, the process will be complete when values for pixel cells within the patch are read out.

The pixel cells may be read out in any suitable order. The rows, for example, may be interleaved, such that every second row is read out in sequence. The AR system may nonetheless process the image data as a frame of image data by de-interleaving the data.

In embodiments in which S/H 1532 is not present, the values may still be read from each pixel cell sequentially, as rows and columns of values are scanned out. The value read from each pixel cell, however, may represent the intensity of light detected at a photodetector of a cell at the time the value in that cell is captured as part of the readout process, such as when that value is applied to A/D 1514, for example. As a result, in a rolling shutter, the pixels of an image frame may represent the image incident on the image array at slightly different times. For an image sensor that outputs a full frame at a 30 Hz rate, the difference in time between when the first pixel value for a frame is captured and the last pixel value for a frame may differ by $\frac{1}{30}^{th}$ of a second, which for many applications is imperceptible.

For some XR functions, such as tracking an object, the XR system may perform computations on image information collected with an image sensor using a rolling shutter. Such computations may interpolate between successive image frames to compute, for each pixel, an interpolated value representing an estimated value of the pixel at a point in time between the successive frames. The same time may be used for all pixels, such that, via computation the interpolated image frame contains pixels representing the same point in time, such as might be produced with an image sensor having a global shutter. Alternatively, a global shutter image array may be used for one or more image sensors in a wearable device forming a portion of an XR system. A global shutter for a full or partial image frame may avoid interpolation of other processing that might be performed to compensate for variations in capture time in image information captured with a rolling shutter. Interpolation computation may therefore be avoided, even if the image information is used to track motion of an object, such as may occur for processing to track a hand or other movable object or to determine head pose of a user of a wearable device in an AR system or even to construct an accurate representation of a physical environment using a camera on a wearable device, which might be moving as image information is collected.

Differentiated Pixel Cells

In some embodiments, each of the pixel cells in a sensor array may be the same. Each pixel cell, for example, may respond to a broad spectrum of visible light. Each photodetector, therefore may provide image information indicating intensity of visible light. In this scenario, the output of the image array may be a "grayscale" output, indicating the amount of visible light incident on the image array.

In other embodiments the pixel cells may be differentiated. For example, different pixel cells in the sensor array may output image information indicating intensity of light in a particular portion of the spectrum. A suitable technique for differentiating pixel cells is to position filter elements in the light path leading to photodetectors in the pixel cells. The filter elements may be bandpass, for example, allowing visible light of a particular color to pass. Applying such a color filter over a pixel cell configures that pixel cell to provide image information indicating the intensity of light of the color corresponding to the filter.

Filters may be applied over pixel cells regardless of the structure of the pixel cell. They may be applied, for example, over pixel cells in a sensor array with a global shutter or a rolling shutter. Likewise, filters may be applied to pixel cells configured to output intensity or changes of intensity using DVS techniques.

In some embodiments, a filter element that selectively passes light of a primary color may be mounted over the photodetector in each pixel cell in a sensor array. For example, filters that selectively pass red, green or blue light may be used. The sensor array may have multiple subarrays, with each subarray having one or more pixels configured to sense light of each of the primary colors. In this way, the pixel cells in each subarray provide both intensity and color information about objects being imaged by the image sensor.

The inventors have recognized and appreciated that in an XR system, some functions require color information, while some functions can be performed with gray scale information. A wearable device equipped with image sensors to provide image information for operation of an XR system may have multiple cameras, some of which may be formed with image sensors that can provide color information. Others of the cameras may be grayscale cameras. The inventors have recognized and appreciated that grayscale cameras may consume less power, be more sensitive in low light conditions, output data faster and/or output less data to represent the same extent of the physical world with the same resolution as a camera formed with a comparable image sensor configured to sense color. Yet, grayscale cameras may output image information sufficient for many functions performed in an XR system. Accordingly, an XR system may be configured with both grayscale and color cameras, using primarily a grayscale camera or cameras and selectively using the color camera.

For example, an XR system may collect and process image information to create a passable world model. That processing may use color information, which may enhance the effectiveness of some functions, such as differentiating objects, identifying surfaces associated with the same object and/or recognizing objects. Such processing may be performed or updated from time to time, for example when a user first turns on the system, moves to a new environment, such as by walking into another room, or a change in the user's environment is otherwise detected.

Other functions are not significantly improved through the use of color information. For example, once a passable world model is created, the XR system may use images from one or more cameras to determine the orientation of the wearable device relative to features in the passable world model. Such a function may be done, for example, as part of head pose tracking. Some or all of the cameras used for such functions may be grayscale. As head pose tracking is performed frequently as the XR system operates, continuously in some embodiments, using one or more grayscale cameras for this function may provide an appreciable power savings, reduced compute, or other benefits.

Similarly, at multiple times during the operation of an XR system, the system may use stereoscopic information from two or more cameras to determine the distance to a movable object. Such a function may require processing image information at a high rate as part of tracking a user's hand or other movable object. Using one or more grayscale cameras for this function may provide lower latency associated with processing high resolution image information, or other benefits.

In some embodiments of an XR system, the XR system may have both a color and at least one gray scale camera and may selectively enable grayscale and/or color cameras based on the function for which image information from those cameras is to be used.

Pixel cells in an image sensor may be differentiated in ways other than based on spectrum of light to which the pixel cells are sensitive. In some embodiments, some or all of the pixel cells may produce an output having an intensity indicative of the angle-of-arrival of light incident on the pixel cell. Angle of arrival information may be processed to compute a distance to an object being imaged.

In such embodiments, an image sensor may passively acquire depth information. Passive depth information may be obtained by placing a component in the light path to a pixel cell in the array, such that the pixel cell outputs information indicative of the angle-of-arrival of light striking that pixel cell. An example of such component is a transmissive diffraction mask (TDM) filter.

The angle-of-arrival information may, through calculation, be converted into distance information, indicating distance to an object from which light is being reflected. In some embodiments, pixel cells configured to provide angle-of-arrival information may be interspersed with pixel cells capturing light intensity of one or more colors. As a result, the angle of arrival information, and therefore distance information, may be combined with other image information about an object.

In some embodiments, one or more of the sensors may be configured to acquire information about physical objects in a scene at a high frequency with low latency using compact and low power components. The image sensor, for example, may draw less than 50 mWatts, enabling the device to be powered with a battery that is small enough to be used as part of a wearable system. That sensor may be an image sensor configured to passively acquire depth information, instead of or in addition to, image information that indicates intensity of information of one or more colors and/or change of intensity information. Such a sensor may also be configured to provide a small amount of data by using patch tracking or by using DVS techniques to provide a differential output.

Passive depth information may be obtained by configuring an image array, such as an image array incorporating any one or more of the techniques described herein, with components that adapt one or more of the pixel cells in the array to output information indicative of a light field emanating from objects being imaged. That information may be based on the angle of arrival of light striking that pixel. In some embodiments, pixel cells, such as those described above, may be configured to output an indication of angle of arrival by placing a plenoptic component in the light path to the pixel cell. An example of a plenoptic component is a transmissive diffraction mask (TDM). The angle of arrival information may, through calculation, be converted into distance information, indicating distance to an object from which light is being reflected to form an image being captured. In some embodiments, pixel cells configured to provide angle of arrival information may be interspersed with pixel cells capturing light intensity on a gray scale or of one or more colors. As a result, the angle of arrival information may also be combined with other image information about an object.

Figure 16:
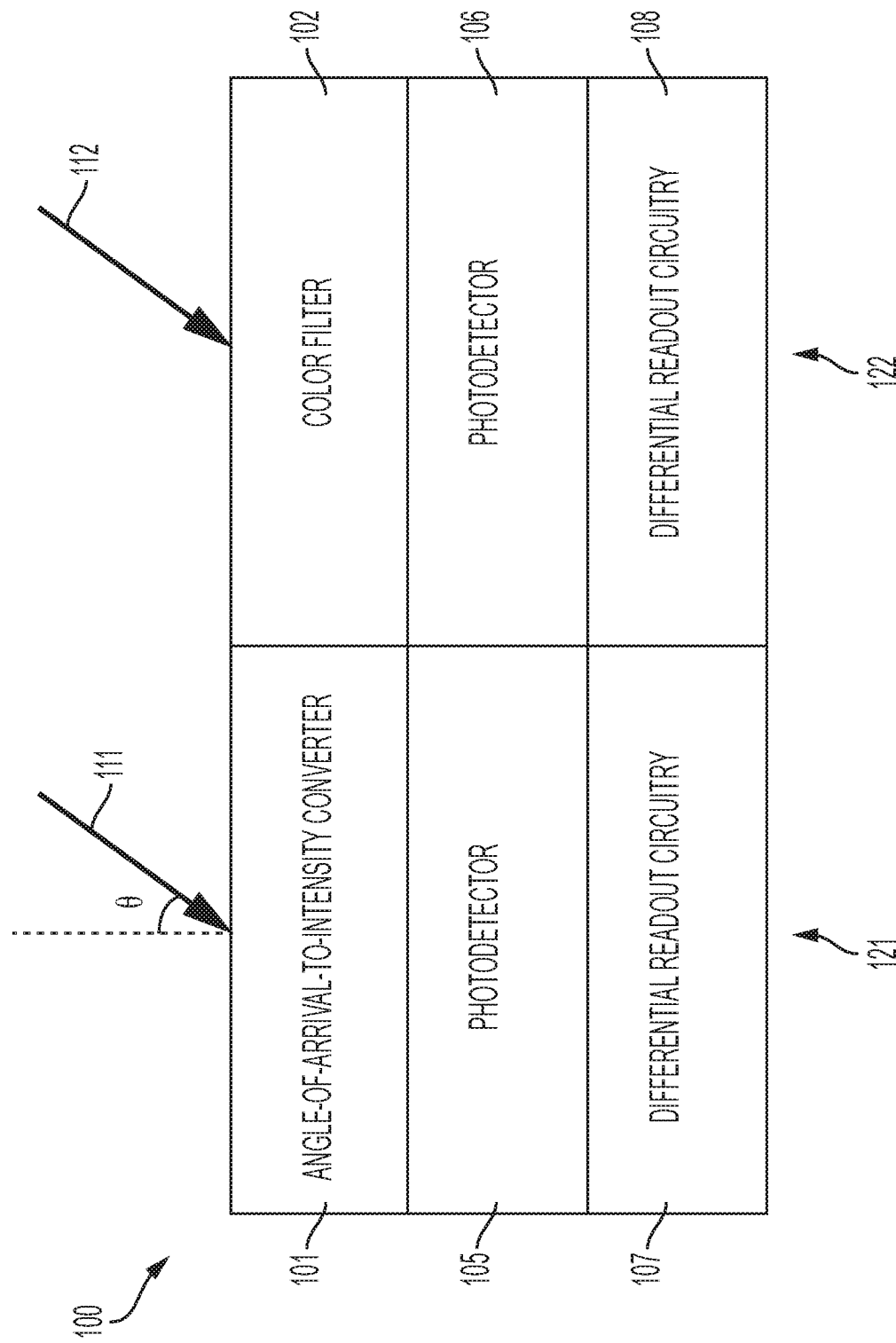
FIG. 16 is a schematic diagram of a pixel subarray, according to some embodiments.

FIG. 16 illustrates a pixel subarray 100 according to some embodiments. In the illustrated embodiment, the subarray has two pixel cells, but the number of pixel cells in a subarray is not a limitation on the invention. Here, a first pixel cell 121 and a second pixel cell 122 are shown, one of which is configured to capture angle of arrival information (first pixel cell 121), but it should be appreciated that the number and locations within an array of pixel cells configured to measure angle of arrival information may be varied. In this example, the other pixel cell (second pixel cell 122) is configured to measure the intensity of one color of light, but other configurations are possible, including pixel cells sensitive to different colors of light or one or more pixel cells sensitive to a broad spectrum of light, such as in a gray scale camera.

The first pixel cell 121 of the pixel subarray 100 of FIG. 16 includes an angle-of-arrival to-intensity converter 101, a photodetector 105, and differential readout circuitry 107. The second pixel cell 122 of the pixel subarray 100 includes a color filter 102, a photodetector 106, and differential readout circuitry 108. It should be appreciated that not all of the components illustrated in FIG. 16 need be included in every embodiment. For example, some embodiments may not include differential readout circuitry 107 and/or 108 and some embodiments may not include the color filter 102. Furthermore, additional components may be included that are not shown in FIG. 16. For example, some embodiments may include a polarizer arranged to allow light of a particular polarization to reach the photodetector. As another example, some embodiments may include scan-out circuitry instead of or in addition differential readout circuitry 107. As another example, the first pixel cell 121 may also include a color filter such that the first pixel 121 measures both angle of arrival and the intensity of a particular color of light incident upon the first pixel 121.

The angle-of-arrival to-intensity converter 101 of the first pixel 121 is an optical component that converts the angle θ of incident light 111 into an intensity that can be measured by a photodetector. In some embodiments, the angle-of-arrival to-intensity converter 101 may include refractive optics. For example, one or more lenses may be used to convert an incident angle of light into a position on an image plane, the amount of that incident light detected by one or more pixel cells. In some embodiments, the angle-of-arrival to-position intensity converter 101 may include diffractive optics. For example, one or more diffraction gratings (e.g., a TDM) may convert an incident angle of light into an intensity that may be measured by a photodetector below the TDM.

The photodetector 105 of the first pixel cell 121 receives incident light 110 that passes through the angle-of-arrival to-intensity converter 101 and generates an electric signal based on the intensity of the light incident upon the photodetector 105. The photodetector 105 is located at the image plane associated with the angle-of-arrival to-intensity converter 101. In some embodiments, the photodetector 105 may be a single pixel of an image sensor, such as a CMOS image sensor.

The differential readout circuitry 107 of the first pixel 121 receives the signal from the photodetector 105 and outputs an event only when an amplitude of the electric signal from the photodetector is different from an amplitude of a previous signal from the photodetector 105, implementing a DVS technique as described above.

The second pixel cell 122 includes color filter 102 for filtering incident light 112 such that only light within a particular range of wavelengths passes through the color filter 102 and is incident upon a photodetector 106. The color filter 102, for example may be a bandpass filter that allows one of red, green, or blue light through and rejects light of other wavelengths and/or may limit IR light reaching photodetector 106 to only a particular portion of the spectrum.

In this example, the second pixel cell 122 also includes the photodetector 106 and the differential readout circuitry 108, which may act similarly as the photodetector 105 and the differential readout circuitry 107 of the first pixel cell 121.

As mentioned above, in some embodiments, an image sensor may include an array of pixels, each pixel associated with a photodetector and a readout circuit. A subset of the pixels may be associated with an angle-of-arrival to-intensity converter that is used for determining the angle of detected light incident on the pixel. Other subsets of the pixels may be associated with color filters used for determining color information about the scene being observed or may selectively pass or block light based on other characteristics.

In some embodiments, the angle of arrival of light may be determined using a single photodetector and diffraction gratings at two different depths. For example, light may be incident upon a first TDM, converting the angle of arrival to a position, and a second TDM may be used to selectively pass light incident at a particular angle. Such arrangements may utilize the Talbot effect, which is a near-field diffraction effect wherein an image of a diffraction grating is created a certain distance from the diffraction grating when a plane wave is incident upon the diffraction grating. If a second diffraction grating is placed at an image plane, where the image of the first diffraction grating is formed, then an angle of arrival may be determined from the intensity of light measured by a single photodetector positioned after the second grating.

Figure 17B:
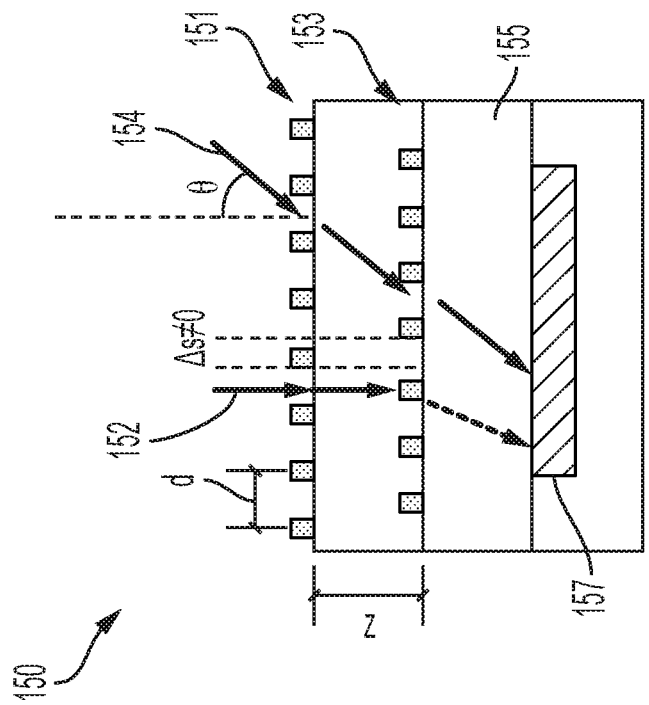
FIG. 17B is a cross-section view of a plenoptic device with an angle-of-arrival to-intensity converter in the form of two stacked TDMs that are not aligned, according to some embodiments.
Figure 17A:
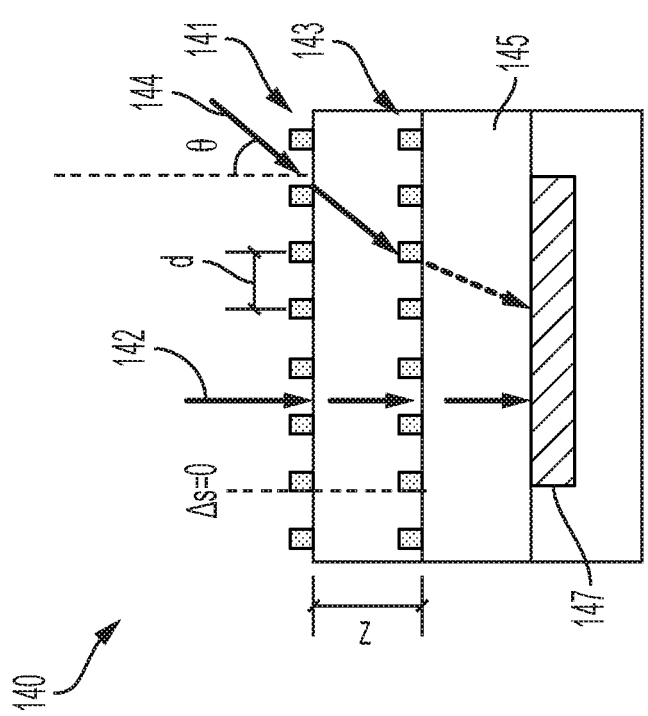
FIG. 17A is a cross-section view of a plenoptic device with an angle-of-arrival to-intensity converter in the form of two stacked transmissive diffraction mask (TDMs) that are aligned, according to some embodiments.

FIG. 17A illustrates a first arrangement of a pixel cell 140 that includes a first TDM 141 and a second TDM 143 that are aligned with one another such that the ridges and/or regions of increased index of refraction for the two gratings are aligned in the horizontal direction (Δs=0), where Δs is the horizontal offset between the first TDM 141 and the second TDM 143. Both the first TDM 141 and the second TDM 143 may have the same grating period d, and the two gratings may be separated by a distance/depth z. The depth z, known as the Talbot length, at which the second TDM 143 is located relative to the first TDM 141 may be determined by the grating period d and the wavelength λ of the light being analyzed and is given by the expression:

$$z = \frac{\lambda}{1 - \sqrt{1 - \lambda^2/a^2}}$$

As illustrated in FIG. 17A, incident light 142 with an angle of arrival of zero degrees is diffracted by the first TDM 141. The second TDM 143 is located at a depth equal to the Talbot length such that an image of the first TDM 141 is created, resulting in most of the incident light 142 passing through the second TDM 143. An optional dielectric layer 145 may separate second TDM 143 from photodetector 147. As light passes through dielectric layer 145, photodetector 147 detects the light and generates an electrical signal with a property (e.g., voltage or current) proportional to the intensity of the light incident upon the photodetector. On the other hand, while incident light 144 with a non-zero angle of arrival θ is also diffracted by the first TDM 141, the second TDM 143 prevents at least a portion of the incident light 144 from reaching the photodetector 147. The amount of incident light reaching photodetector 147 depends on the angle of arrival θ, with less light reaching the photodetector at larger angles. The dashed line resulting from the light 144 illustrates that the amount of light that reaches the photodetector 147 is attenuated. In some cases, the light 144 may be completely blocked by the diffraction grating 143. Thus, information about the angle of arrival of incident light may be obtained using the single photodetector 147 using two TDMs.

In some embodiments, information obtained by adjacent pixel cells with no angle-of-arrival to-intensity converters may provide an indication of the intensity of the incident light and may be used to determine the portion of the incident light passing through the angle-of-arrival to-intensity converter. From this image information, angle of arrival of the light detected by the photodetector 147 may be computed, as described in more detail below.

FIG. 17B illustrates a second arrangement of a pixel cell 150 that includes a first TDM 151 and a second TDM 153 that are misaligned with one another such that the ridges and/or regions of increased index of refraction for the two gratings are not aligned in the horizontal direction (Δs #0), where Δs is the horizontal offset between the first TDM 151 and the second TDM 153. Both the first TDM 151 and the second TDM 153 may have the same grating period d, and the two gratings may be separated by a distance/depth z. Unlike the situation discussed in connection with FIG. 17A, where the two TDMs are aligned, the misalignment results in incident light of an angle different from zero passing through the second TDM 153.

As illustrated in FIG. 17B, incident light 152 with an angle of arrival of zero degrees is diffracted by the first TDM 151. The second TDM 153 is located at a depth equal to the Talbot length, but due to the horizontal offset of the two gratings, at least a portion of the light 152 is blocked by the second TDM 153. The dashed line resulting from the light 152 illustrates that the amount of light that reaches the photodetector 157 is attenuated. In some cases, the light 152 may be completely blocked by the diffraction grating 153. On the other hand, incident light 154 with a non-zero angle of arrival θ is diffracted by the first TDM 151, but passes through the second TDM 153. After traversing an optional dielectric layer 155, a photodetector 157 detects the light incident upon the photodetector 157 and generates an electrical signal with a property (e.g., voltage or current) proportional to the intensity of the light incident upon the photodetector.

Pixel cells 140 and 150 have different output functions, with different intensity of light detected for different incident angles. In each case, however, the relationship is fixed and may be determined based on the design of the pixel cell or by measurements as part of a calibration process. Regardless of the precise transfer function, the measured intensity may be converted to an angle of arrival, which in turn may be used to determine distance to an object being imaged.

In some embodiments, different pixel cells of the image sensor may have different arrangements of TDMs. For example, a first subset of pixel cells may include a first horizontal offset between the gratings of the two TDMs associated with each pixel while a second subset of pixel cells may include a second horizontal offset between the gratings of the two TDMs associated with each pixel cell, where the first offset is different from the second offset. Each subset of pixel cells with a different offset may be used to measure a different angle of arrival or a different range of angles of arrival. For example, a first subset of pixels may include an arrangement of TDMs similar to the pixel cell 140 of FIG. 17A and a second subset of pixels may include an arrangement of TDMs similar to the pixel cell 150 of FIG. 17B.

In some embodiments, not all pixel cells of an image sensor include TDMs. For example, a subset of the pixel cells may include color filters while a different subset of pixel cells may include TDMs for determining angle of arrival information. In other embodiments, no color filters are used such that a first subset of pixel cells simply measures the overall intensity of the incident light and a second subset of pixel cells measures the angle of arrival information. In some embodiments, information regarding the intensity of light from nearby pixel cells with no TDMs may be used to determine the angle of arrival for light incident upon the pixel cells with one or more TDMs. For example, using two TDMs arranged to take advantage of the Talbot effect, the intensity of light incident on a photodetector after the second TDM is a sinusoidal function of the angle of arrival of the light incident upon the first TDM. Accordingly, if the total intensity of the light incident upon the first TDM is known, then the angle of arrival of the light may be determined from the intensity of the light detected by the photodetector.

Figure 18C:
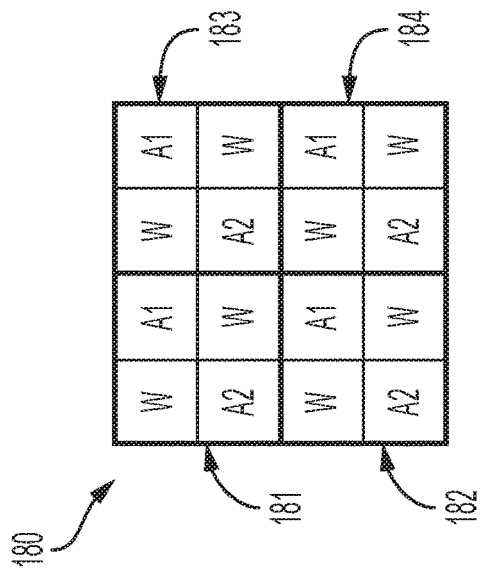
FIG. 18C is a pixel subarray with white pixel cells and angle of arrival pixel cells, according to some embodiments.
Figure 18B:
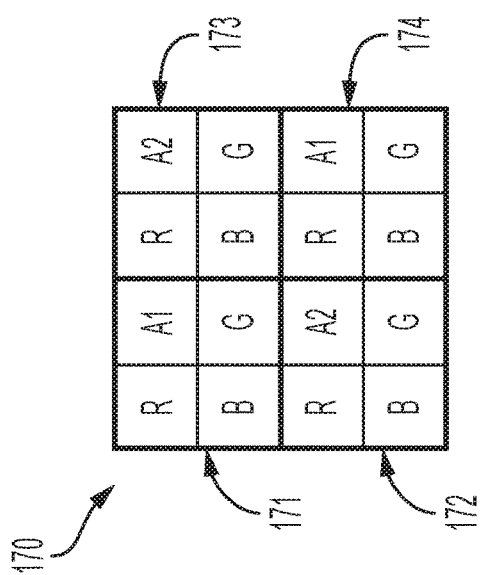
FIG. 18B is a pixel subarray with color pixel cells and angle of arrival pixel cells, according to some embodiments.
Figure 18A:
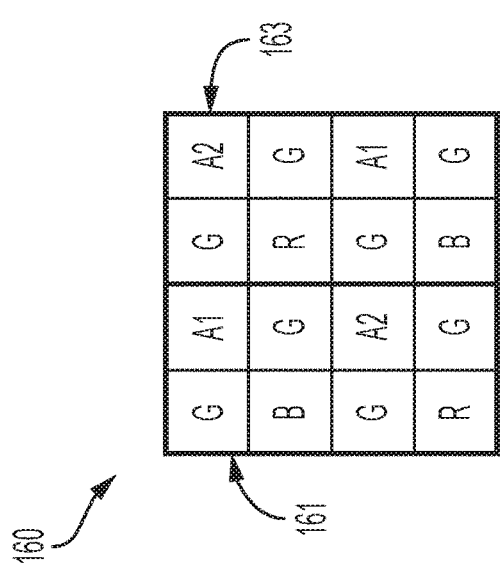
FIG. 18A is a pixel subarray with color pixel cells and angle of arrival pixel cells, according to some embodiments.

In some embodiments, the configuration of pixel cells in a subarray may be selected to provide various types of image information with appropriate resolution. FIGS. 18A-C illustrate example arrangements of pixel cells in a pixel subarray of an image sensor. The illustrated examples are non-limiting, as it should be understood that alternative pixel arrangements are contemplated by the inventors. This arrangement may be repeated across the image array, which may contain millions of pixels. A subarray may include one or more pixel cells that provide angle-of-arrival information about incident light and one or more other pixel cells that provide intensity information about incident light (with or without a color filter).

FIG. 18A is an example of a pixel subarray 160 including a first set of pixel cells 161 and a second set of pixel cells 163 that are different from one another and rectangular, rather than square. Pixel cells labeled "R" are pixel cells with a red filters such that red incident light passes through the filter to the associated photodetector; pixel cells labeled "B" are pixel cells with a blue filters such that blue incident light passes through the filter to the associated photodetector; and pixel cells labeled "G" are pixels with a green filter such that green incident light passes through the filter to the associated photodetector. In the example subarray 160 there are more green pixel cells than red or blue pixel cells, illustrating that the various types of pixel cells need not be present in the same proportion.

Pixel cells labeled A1 and A2 are pixels that provide angle-of arrival information. For example, pixel cells A1 and A2 may include one or more gratings for determining angle of arrival information. The pixel cells that provide angle-of-arrival information may be configured similarly or may be configured differently, such as to be sensitive to different ranges of angles of arrival or to angle of arrival with respect to a different axis. In some embodiments, the pixels labeled A1 and A2 include two TDMs, and the TDMs of pixel cells A1 and A2 may be oriented in different directions, for example, perpendicular to one another. In other embodiments, the TDMs of pixel cells A1 and A2 may be oriented parallel to one another.

In embodiments that use pixel subarray 160, both color image data and angle of arrival information may be obtained. To determine the angle of arrival of light incident upon the set of pixel cells 161, the total light intensity incident on the set 161 is estimated using the electrical signals from the RGB pixel cells. Using the fact that the intensity of light detected by the A1/A2 pixels varies in a predictable way as a function of the angle of arrival, the angle of arrival may be determined by comparing the total intensity (estimated from the RGB pixel cells within the group of pixels) to the intensity measured by the A1 and/or A2 pixel cells. For example, the intensity of the light incident on the A1 and/or A2 pixels may vary sinusoidally with respect to angle of arrival of the incident light. The angle of arrival of light incident upon the set of pixel cells 163 is determined in a similar way using the electrical signals generated by the pixels of set 163.

It should be appreciated that FIG. 18A shows a specific embodiment of a subarray, and other configurations are possible. In some embodiments, for example, the subarray may be only the set of pixel cells 161 or 163.

FIG. 18B is an alternative pixel subarray 170 including a first set of pixel cells 171, a second set of pixel cells 172, a third set of pixel cells 173, and a fourth set of pixel cells 174. Each set of pixel cells 171-174 is square and has the same arrangement of pixel cells within, but for the possibility of having pixel cells for determining angle of arrival information over different ranges of angles or with respect to different planes (e.g., the TDMs of pixels A1 and A2 may be oriented perpendicular to one another). Each set of pixels 171-174 includes one red pixel cell (R), one blue pixel cell (B), one green pixel cell (G), and one angle of arrival pixel cell (A1 or A2). Note that in the example pixel subarray 170 there are an equal number of red/green/blue pixel cells in each set. Further, it should be understood that the pixel subarray may be repeated in one or more directions to form a larger array of pixels.

In embodiments that use pixel subarray 170, both color image data and angle of arrival information may be obtained. To determine the angle of arrival of light incident upon the set of pixel cells 171, the total light intensity incident on the set 171 may be estimated using the signals from the RGB pixel cells. Using the fact that the intensity of light detected by the angle-of-arrival pixel cells has a sinusoidal or other predictable response with respect to angle of arrival, the angle of arrival may be determined by comparing the total intensity (estimated from the RGB pixel cells) to the intensity measured by the A1 pixels. The angle of arrival of light incident upon the sets of pixel cells 172-174 may be determined in a similar way using the electrical signals generated by the pixel cells of each respective set of pixels.

FIG. 18C is an alternative pixel subarray 180 including a first set of pixel cells 181, a second set of pixel cells 182, a third set of pixel cells 183, and a fourth set of pixel cells 184. Each set of pixel cells 181-184 is square and has the same arrangement of pixel cells within where no color filters are used. Each set of pixel cells 181-184 includes two "white" pixels (e.g., no color filter such that red, blue, and green light is detected to form a greyscale image) one angle of arrival pixel cell (A1) with TDMs oriented in a first direction, and one angle of arrival pixel cell (A2) with TDMs oriented with a second spacing or in a second direction (e.g. perpendicular) relative to the first direction. Note that in the example pixel subarray 170 there is no color information. The resulting image is greyscale, illustrating that passive depth information may be acquired using techniques as described herein in color or grayscale image arrays. As with other subarray configurations described herein, the pixel subarray arrangement may be repeated in one or more directions to form a larger array of pixels.

In embodiments that use pixel subarray 180, both greyscale image data and angle of arrival information may be obtained. To determine the angle of arrival of light incident upon the set of pixel cells 181, the total light intensity incident on the set 181 is estimated using the electrical signals from the two white pixels. Using the fact that the intensities of light detected by the A1 and A2 pixels have a sinusoidal or other predictable response with respect to angle of arrival, the angle of arrival may be determined by comparing the total intensity (estimated from the white pixels) to the intensity measured by the A1 and/or A2 pixel cells. The angle of arrival of light incident upon the sets of pixel cells 182-184 may be determined in a similar way using the electrical signals generated by the pixels of each respective set of pixels.

In the above examples, the pixel cells have been illustrated as square and are arranged in square grid. Embodiments are not so limited. For example, in some embodiments, the pixel cells may be rectangular in shape. Moreover, the subarrays may be triangular or arranged on a diagonal or have other geometries.

In some embodiments, the angle of arrival information is obtained using the image processor 708 or a processor associated with the local data processing module 70, which may further determine a distance of an object based on the angle of arrival. For example, the angle of arrival information may be combined with one or more other types of information to obtain a distance of an object. In some embodiments, an object of the mesh model 46 may be associated with the angle of arrival information from the pixel array. The mesh model 46 may include a location of the object, including a distance from the user, which may be updated to a new distance value based on the angle of arrival information.

Using the angle of arrival information to determine distance values may be particularly useful in scenarios where an object is close to the user. This is because changes in a distance from the image sensor result in larger changes in the angle of arrival of light for nearby objects than distance changes of similar magnitude for objects that are positioned far from the user. Accordingly, a processing module making use of passive distance information based on angle of arrival may selectively use that information based on an estimated distance of an object, and may make use of one or more other techniques to determine distance to objects that are beyond a threshold distance, such as up to 1 meter, up to 3 meters or up to five meters, in some embodiments. As a specific example, the processing module of an AR system may be programmed to use passive distance measurements using angle of arrival information for objects within 3 meters of the user of a wearable device, but may use stereoscopic image processing, using images captured by two cameras, for objects outside that range.

Similarly, pixels configured to detect angle of arrival information may be most sensitive to changes in distance within a range of angles from a normal to an image array. A processing module may similarly be configured to use distance information derived from angle of arrival measurements within that range of angles, but use other sensors and/or other techniques for determining distance outside that range.

One example application of determining the distance of an object from the image sensor is hand tracking. Hand tracking may be used in an AR system, for example, to provide a gesture-based user interface for the system 80 and/or for allowing the user to move virtual objects within the environment in an AR experience provided by the system 80. The combination of an image sensor that provides angle of arrival information for accurate depth determination with differential readout circuitry for reducing the amount of data to process for determining the motion of the user's hands provides an efficient interface by which the user can interact with virtual objects and/or provide input to the system 80. A processing module determining the location of a user's hand may use distance information, acquired using different techniques, depending on the location of the user's hand in the field of view of the image sensors of a wearable device. Hand tracking may be implemented as a form of patch tracking during an image sensing process, according to some embodiments.

Another application where the depth information may be useful is in occlusion processing. Occlusion processing uses depth information to determine that certain portions of a model of the physical world need not or cannot be updated based on image information being captured by one or more image sensors collecting image information about a physical environment around a user. For example, if it is determined that there is a first object a first distance from the sensor, then the system 80 may determine not to update the model of the physical world for distances greater than the first distance. Even if, for example, the model includes a second object a second distance from the sensor, the second distance being greater than the first distance, the model information for that object may not be updated if it is behind the first object. In some embodiments, the system 80 may generate an occlusion mask based on the location of the first object and only update portions of the model not masked by the occlusion mask. In some embodiments, the system 80 may generate more than one occlusion mask for more than one object. Each occlusion mask may be associated with respective distance from the sensor. For each occlusion mask, model information associated with objects that are a distance from the sensor greater than the distance associated with a respective occlusion mask will not be updated. By limiting the portions of the model that is updated at any given time, the speed of generating the AR environment and the amount of computational resources needed to generate the AR environment is reduced.

While not shown in FIGS. 18A-C, some embodiments of an image sensor may include pixels with an IR filter in addition to or instead of color filters. For example, the IR filter may allow light of a wavelength, such as approximately equal to 940 nm, to pass and be detected by an associated photodetector. Some embodiments of a wearable may include an IR light source (e.g., an IR LED) that emits light of the same wavelength as is associated with the IR filter (e.g., 940 nm). The IR light source and IR pixels may be used as an alternative way of determining the distance of objects from the sensor. By way of example and not limitation, the IR light source may be pulsed and time of flight measurements may be used to determine the distance of objects from the sensor.

In some embodiments, the system 80 may be capable of operating in one or more modes of operation. A first mode may be a mode where depth determinations are made using passive depth measurements, for example, based on the angle of arrival of light determined using pixels with angle-of-arrival to-intensity converters. A second mode may be a mode where depth determinations are made using active depth measurements, for example, based on the time of flight of IR light measured using IR pixels of the image sensor. A third mode may be using the stereoscopic measurements from two separate image sensors to determine the distance of an object. Such stereoscopic measurements may be more accurate than using the angle of arrival of light determined using pixels with angle-of-arrival to-intensity converters when the object is very far from the sensor. Other suitable methods of determining depth may be used for one or more additional modes of operation for depth determination.

In some embodiments, it may be preferable to use passive depth determination because such techniques utilize less power. However, the system may determine that it should operate in an active mode under certain conditions. For example, if the intensity of visible light being detected by the sensor is below a threshold value, it may be too dark to accurately perform passive depth determination. In some embodiments, IR illumination may be used to offset the effects of low lighting. IR illumination may be selectively enabled in response to a detected low light condition that precludes acquiring images sufficient for a task the device is performing, such as head tracking or hand tracking. As another example, objects may be too far away for passive depth determination to be accurate. Thus, the system may be programmed to select to operate in a third mode where depth is determined based on the stereoscopic measurement of a scene using two spatially separated image sensors. As another example, determining the depth of an object based on an angle of arrival of light determined using pixels with angle-of-arrival to-intensity converters may be inaccurate in the periphery of the image sensor. Accordingly, if the object is being detected by pixels near the periphery of the image sensor, the system may select to operate in the second mode, using active depth determination.

While embodiments of the image sensor described above used individual pixel cells with stacked TDMs to determine the angle of arrival of light incident upon the pixel cell, other embodiments may use groups of multiple pixel cells with a single TDM over all the pixels of the group to determine angle of arrival information. The TDM may project a pattern of light across the sensor array, with that pattern dependent on the angle of arrival of the incident light. Multiple photodetectors associated with one TDM may more accurately detect that pattern, because each photodetector of the multiple photodetectors is located at a different position in the image plane (the image plane comprising photodetectors that sense light). The relative intensity sensed by each photodetector may indicate an angle of arrival of the incident light.

FIG. 19A is a top plan view example of a plurality of photodetectors (in the form of a photodetector array 120 which may be a subarray of pixel cells of an image sensor) associated with a single transmission diffraction mask (TDM), according to some embodiments. FIG. 19B is a cross-section view of the same photodetector array as FIG. 19A, along a line A of FIG. 19A. The photodetector array 120, in the example shown, includes 16 separate photodetectors 121, which may be within pixel cells of an image sensor. The photodetector array 120 includes a TDM 123 disposed above the photodetectors. It should be understood that each group of pixel cells is illustrated with four pixels for the sake of clarity and simplicity (e.g. forming a four pixel by four pixel grid). Some embodiments may include more than four pixel cells. For example, 16 pixel cells, 64 pixel cells or any other number of pixels may be included in each group.

The TDM 123 is located a distance x from the photodetectors 121. In some embodiments, the TDM 123 is formed on a top surface of a dielectric layer 125 as illustrated in FIG. 19B. For example, the TDM 123 may be formed from ridges, as illustrated, or by valleys etched into the surface of the dielectric layer 125. In other embodiments, the TDM 123 may be formed within a dielectric layer. For example, portions of the dielectric layer may be modified to have a higher or lower index of refraction relative to the other portions of the dielectric layer, resulting in a holographic phase grating. Light incident on the photodetector array 120 from above is diffracted by the TDM, resulting in an angle of arrival of incident light to be converted into a position in an image plane a distance x from the TDM 123, where the photodetectors 121 are located. The intensity of the incident light measured at each photodetector 121 of the array of photodetectors may be used to determine the angle of arrival of the incident light.

FIG. 20A illustrates an example of a plurality of photodetectors (in the form of a photodetector array 130) associated with multiple TDMs, according to some embodiments. FIG. 20B is a cross-section view of the same photodetector array as FIG. 20A though a line B of FIG. 20A. FIG. 20C is a cross-section view of the same photodetector array as FIG. 20A through a line C of FIG. 20A. The photodetector array 130, in the example shown, includes 16 separate photodetectors, which may be within pixel cells of an image sensor. There are four groups 131a, 131b, 131c, 131d of four pixel cells illustrated. The photodetector array 130 includes four separate TDMs 133a, 133b, 133c, 133d, each TDM provided above an associated group of pixel cells. It should be understood that each group of pixel cells is illustrated with four pixel cells for the sake of clarity and simplicity. Some embodiments may include more than four pixel cells. For example, 16 pixel cells, 64 pixel cells or any other number of pixel cells may be included in each group.

Each TDM 133a-d is located a distance x from the photodetectors 131a-d. In some embodiments, the TDMs 133a-d are formed on a top surface of a dielectric layer 135 as illustrated in FIG. 20B. For example, the TDMs 123a-d may be formed from ridges, as illustrated, or by valleys etched into the surface of the dielectric layer 135. In other embodiments, the TDMs 133a-d may be formed within a dielectric layer. For example, portions of the dielectric layer may be modified to have a higher or lower index of refraction relative to the other portions of the dielectric layer, resulting in a holographic phase grating. Light incident on the photodetector array 130 from above is diffracted by the TDMs, resulting in an angle of arrival of incident light to be converted into a position in an image plane a distance x from the TDMs 133a-d, where the photodetectors 131a-d are located. The intensity of the incident light measured at each photodetector 131a-d of the array of photodetectors may be used to determine the angle of arrival of the incident light.

The TDMs 133a-d may be oriented in different directions from one another. For example, the TDM 133a is perpendicular to the TDM 133b. Thus the intensity of light detected using the photodetector group 131a may be used to determine the angle of arrival of incident light in a plane perpendicular to the TDM 133a and the intensity of light detected using the photodetector group 131b may be used to determine the angle of arrival of incident light in a plane perpendicular to the TDM 133b. Similarly, the intensity of light detected using the photodetector group 131c may be used to determine the angle of arrival of incident light in a plane perpendicular to the TDM 133c and the intensity of light detected using the photodetector group 131d may be used to determine the angle of arrival of incident light in a plane perpendicular to the TDM 133d.

Pixel cells configured to acquire depth information passively may be integrated in an image array with features as described herein to support operations useful in an X-reality system. In accordance with some embodiments, the pixel cells configured to acquire depth information may be implemented as part of an image sensor used to implement a camera with a global shutter. Such a configuration may provide a full frame output, for example. The full frame may include image information for different pixels indicating depth and intensity at the same time. With an image sensor of this configuration, a processor may acquire depth information for a full scene at once.

In other embodiments, the pixel cells of the image sensor that provide depth information may be configured to operate according to DVS techniques, as described above. In such a scenario, the event may indicate a change in depth of an object as indicated by a pixel cell. The event output by the image array may indicate the pixel cell for which a change of depth was detected. Alternatively or additionally, the event may include the value of the depth information for that pixel cell. With an image sensor of this configuration, a processor may acquire depth information updates at a very high rate, so as to provide high temporal resolution. In some embodiments, high temporal resolution may involve updating depth information more frequently than at 1 Hz or 5 Hz, and may instead involve updating depth information hundreds or thousands of times per second, such as every millisecond.

In yet other embodiments, an image sensor may be configured to operate in either a full frame or a DVS mode. In such an embodiment, a processor processing the image information from the image sensor may programmatically control the operating mode of the image sensor based on the functions being performed by the processor. For example, while performing functions involving tracking an object, the processor may configure the image sensor to output image information as DVS events. On the other hand, while processing to update a world reconstruction, the processor may configure the image sensor to output full frame depth information. In some embodiments, in the full frame and/or the DVS mode, active illumination may be used to illuminate the scene being imaged. For example, IR illumination may be provided in instances where the intensity of light being detected by the sensor is below a threshold value, in which case it may be too dark to accurately perform passive depth determination.

Wearable Configuration

Multiple image sensors may be used in an XR system. The image sensors may be combined with optical components, such as lenses, and control circuitry to create cameras. Those image sensors may use one or more of the techniques described above to acquire imaging information, such as gray scale imaging, color imaging, global shutter, DVS techniques, plenoptic pixel cells, and/or dynamic patches. Regardless of the imaging techniques used, the resulting cameras may be mounted to a support member to form a headset, which may include or be connected to a processor.

Figure 21:
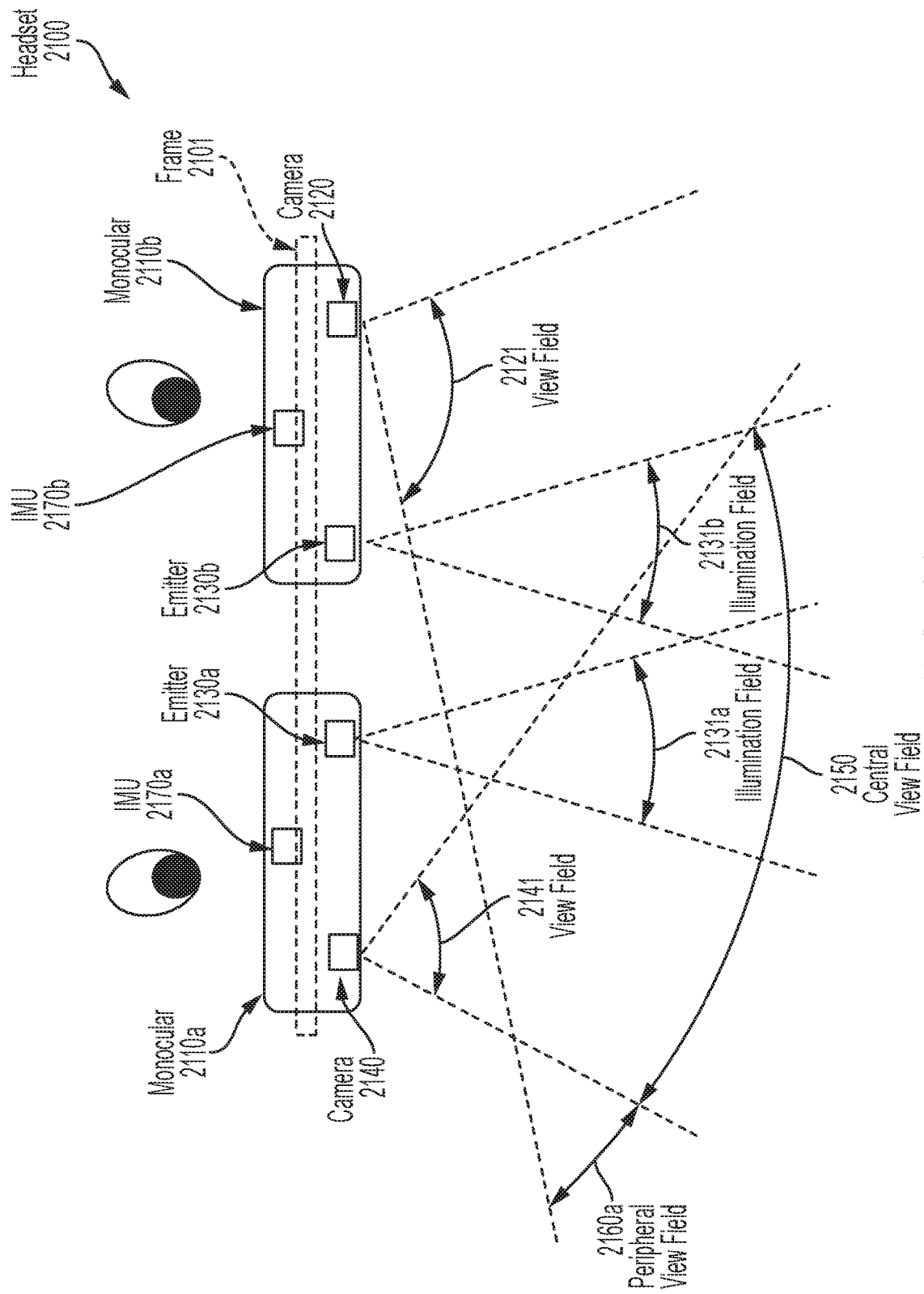
FIG. 21 is a schematic diagram of a headset that includes two cameras and attendant components, according to some embodiments.

FIG. 21 is a schematic diagram illustrating a headset 2100 of a wearable display system, consistent with disclosed embodiments. As shown in FIG. 21, headset 2100 may include a display device comprising monocular 2110*a* and monocular 2110*b*, which may be optical eyepieces or displays configured to transmit and/or display visual information to an eye of the user. Headset 2100 may also include a frame 2101, which may resemble frame 64, described above with regards to FIG. 3B. Headset 2100 may further include two cameras (DVS camera 2120 and camera 2140), and additional components, such as emitter 2130*a*, emitter 2130*b*, inertial measurement unit 2170*a* (IMU 2170*a*), and inertial measurement unit 2170*b* (IMU 2170*b*).

Camera 2120 and camera 2140 are world cameras, as they are oriented to image the physical world as seen by a user wearing headset 2100. In some embodiments, those two cameras may be sufficient to acquire image information about the physical world and those two cameras may be the only world-facing cameras. Headset 2100 may also include additional components, such as eye-tracking cameras, as discussed above with regards to FIG. 3B.

Monocular 2110*a* and monocular 2110*b* may be mechanically coupled to a support member, such as frame 2101, using techniques such as adhesives, fasteners, pressure fittings, etc. Similarly, the two cameras and attendant components (e.g., the emitters, inertial measurement units, eye-tracking cameras, etc.) may be mechanically coupled to frame 2101 using techniques such as adhesives, fasteners, pressure fittings, etc. These mechanical couplings may be direct or indirect. For example, one or more camera and/or one or more of the attendant components may be directly attached to frame 2101. As an additional example, one or more cameras and/or one or more of the attendant components may be directly attached to a monocular, which may then be attached to frame 2101. The mechanism of attachment is not intended to be limiting.

Alternatively, monocular sub-assemblies may be formed and then attached to frame 2101. Each sub-assembly may include, for example, a support member to which the monocular 2110*a* or 2110*b* is attached. An IMU and one or more cameras may similarly be attached to the support member. Attaching both a camera and an IMU to the same support member may enable inertial information about the camera to be obtained based on the output of the IMU. Similarly, attaching the monocular to the same support member as the camera may enable image information about the world to be spatially correlated to information rendered on the monocular.

Headset 2100 may be lightweight. For example, headset 2100 may weigh between 30 and 300 grams. Headset 2100 may be made of materials that flex in use, such as plastic or thin metal. Such materials may enable a lightweight and comfortable headset that can be worn by a user for extended periods of time. An XR system with such a lightweight headset may nonetheless support high accuracy stereoscopic image analysis (which requires separation between cameras to be known) using a calibration routine that may be repeated as the headset is worn to compensate for any inaccuracy that would result from flexing of the headset in use. In some embodiments, the lightweight headset may include a battery pack. The battery pack may include one or more batteries, which may be rechargeable or non-rechargeable. The battery pack may be built into the lightweight frame, or may be removable. The battery pack and the lightweight frame may be formed as a single unit, or the battery pack may be formed as a unit separate from the lightweight frame.

DVS camera 2120 may include an image sensor and a lens. The image sensor may be configured to produce greyscale images. The image sensor may be configured to output images between 1 megapixel and 4 megapixels in size. For example, the image sensor may be configured to output images with horizontal resolution of 1,016 lines and a vertical resolution of 1,016 lines. In some aspects, the image sensor can be a CMOS image sensor.

DVS camera 2120 may support dynamic vision sensing as disclosed above with regards to FIG. 4, FIG. 5A, and FIG. 5B. In a mode of operation, DVS camera 2120 may be configured to output image information in response to detected changes in image properties, such as pixel-level changes in light intensity. In some embodiments, the detected changes may satisfy an intensity change criterion. For example, the image sensor may be configured to have one threshold for incremental increases in light intensity and another threshold for incremental decreases in light intensity. Image information can be provided asynchronously as such changes are detected. In another mode of operation, DVS camera 120 may be configured to output image frames repeatedly or periodically, and not in response to a detected changes in image properties. For example, DVS camera 2120 may be configured to output images at a frequency between 30 Hz and 120 Hz, such as at 60 Hz.

DVS camera 2120 may support patch tracking as disclosed above with regards to FIGS. 6-15. For example, DVS camera 2120 may be configured to provide, in various aspects, image information for a subset of the pixels in the image sensor (e.g., a patch of the pixels in the image sensor). DVS camera 2120 may be configured to combine dynamic vision sensing with patch tracking, providing image information for those pixels in a patch that experience a change in an image property. In various aspects, the image sensor can be configured with a global shutter. As discussed above, with regards to FIG. 14 and FIG. 15, a global shutter may enable each pixel to acquire an intensity measurement at the same time.

DVS camera 2120 may be a plenoptic camera as disclosed above with regards to FIG. 3B and FIGS. 15-20C. For example, a component can be placed in a light path to one or more pixel cells of the image sensor of DVS camera 2120, such that these pixel cells produce an output having an intensity indicative of the angle-of-arrival of light incident on the pixel cell. In such embodiments, the image sensor may passively acquire depth information. An example of a component suitable for placement in the light path is a TDM filter. The processor can be configured to use the angle of arrival information to compute a distance to an object being imaged. For example, the angle-of-arrival information can be converted into distance information, indicating distance to an object from which light is being reflected. In some embodiments, pixel cells configured to provide angle-of-arrival information may be interspersed with pixel cells capturing light intensity of one or more colors. As a result, the angle of arrival information, and therefore distance information, may be combined with other image information about an object.

DVS camera 2120 can be configured so as to have a wide field of view, consistent with disclosed embodiments. For example, DVS camera 2120 may include an equidistant lens (e.g., a fisheye lens). DVS camera 2120 may be angled toward camera 2140 so to create an area directly in front of the user of headset 2100 that is imaged by both cameras. For example, a vertical plane through the center of view field 2121, the field of view associated with DVS camera 2120, may intersect and form an angle with a vertical plane through the midline of headset 2100. In some embodiments, view field 2121 may have a horizontal field of view and a vertical field of view. An extent of the horizontal field of view may be between 90 degrees and 175 degrees, while an extent of the vertical field of view may be between 70 and 125 degrees. In some embodiments, DVS camera 2120 can be configured to possess an angular pixel resolution between 1 and 5 arcminutes per pixel.

Emitter 2130*a* and emitter 2130*b* may enable imaging in low light conditions and/or active depth sensing by headset 2100. Emitter 2130*a* and emitter 2130*b* may be configured to emit light at a particular wavelength. This light can be reflected by physical objects in the physical world around a user. Headset 2100 may be configured with sensors to detect this reflected light, including image sensors as described herein. In some embodiments, these sensors may be incorporated into at least one of camera 2120 or camera 2140. For example, as described above with regards to FIGS. 18A-18C, these cameras may be configured with detectors corresponding to emitter 2130*a* and/or emitter 2130*b*. For example, these cameras may include pixels configured to detect light emitted by emitter 2130*a* and/or emitter 2130*b*.

Emitter 2130*a* and emitter 2130*b* may be configured to emit IR light, consistent with disclosed embodiments. The IR light may have a wavelength between 900 nanometers and 1 micrometer. The IR light may be a 940 nm light source, for example, with the light energy emitted being concentrated around 940 nm. Emitters emitting light of other wavelengths may alternatively or additionally be used. For a system intended for indoor-only use, for example, an emitter emitting light concentrated around 850 nm may be used. At least one of DVS camera 2120 or camera 2140 may include one or more IR filters disposed over at least a subset of pixels in an image sensor of the camera. The filters may pass light at a wavelength emitted by emitter 2130*a* and/or emitter 2130*b*, while attenuating light at some other wavelengths. For example, the IR filter may be a notch filter, passing IR light with wavelengths matching those of the emitter. The notch filter may substantially attenuate other IR light. In some embodiments, the notch filter may be an IR notch filter, blocking IR light, allowing the light from the emitter to pass. The IR notch filter may also allow light outside of the IR band to pass. Such a notch filter may enable an image sensor to receive both visible light and light from the emitter that has been reflected from objects in the field of view of the image sensor. In this manner, the subset of pixels may serve as detectors for IR light emitted by emitter 2130*a* and/or emitter 2130*b*.

In some embodiments, a processor of the XR system may selectively enable the emitters, such as to enable imaging in low light conditions. The processor may process image information generated by one or more image sensors and may detect whether the images output by those image sensors provide adequate information about objects in the physical world without the emitters enabled. The processor may enable the emitters in response to detecting that the images do not provide adequate image information as a result of low ambient light conditions. For example, the emitters may be turned on when stereoscopic information is being used to track an object and the lack of ambient light results in images with insufficient contrast between features of the objects being tracked to accurately determine distance using stereoscopic image techniques.

Alternatively or additionally, emitter 2130*a* and/or emitter 2130*b* may be configured for use in making active depth measurements, such as by emitting light in short pulses. The wearable display system may be configured to perform time-of-flight measurements by detecting the reflection of such pulses from objects in illumination field 2131*a* of emitter 2130*a* and/or illumination field 2131*b* of emitter 2130*b*. These time of flight measurements may provide additional depth information for tracking objects or updating a passable world model. In other embodiments, one or more emitters may be configured to emit patterned light, and the XR system may be configured to process images of objects illuminated by that patterned light. Such processing may detect variations in the pattern which may reveal distance to the objects.

In some embodiments, the extent of the illumination fields associated with the emitters may be sufficient to at least illuminate the view fields of the cameras used to acquire image information about objects. For example, the emitters may collectively illuminate the central view field 2150. In the embodiment illustrated, emitter 2130*a* and emitter 2130*b* may be positioned so as to illuminate illumination field 2131*a* and illumination field 2131*b*, that collectively span the range in which active illumination may be provided. In this example embodiment, two emitters are shown, but it should be appreciated that more or fewer emitters may be used to span the desired range.

In some embodiments, emitters, such as emitter 2130a and 2130b may, by default, be turned off, but may be enabled when additional illumination is desirable for acquiring more information than can be acquired with passive imaging. A wearable display system may be configured to enable emitter 2130a and/or emitter 2130b when additional depth information is required. For example, when the wearable display system detects a failure to acquire adequate depth information for tracking a hand or head pose using stereoscopic image information, the wearable display system may be configured to enable emitter 2130a and/or emitter 2130b. The wearable display system may be configured to disable emitter 2130a and/or emitter 2130b when additional depth information is not required, thereby reducing power consumption and improving battery life.

Moreover, it is not a requirement that IR emitters be mounted on headset 2100 or only on headset 2100, even if the headset is configured with image sensors configured to detect IR light. In some embodiments, an IR emitter may be an external device installed in a space, such as an interior room, in which headset 2100 may be used. Such an emitter may project IR light, such as in an ArUco pattern in 940 nm, which is invisible to the human eye. Light with such a pattern may facilitate an "instrumented/assistive tracking" where headset 2100 does not have to supply the power of providing the IR pattern, but can nonetheless provide IR image information as a result of the pattern being present such that processing performed on that image information may determine the distance to or location of objects within the space. A system with an external source of illumination may also enable more devices to operate in that space. If multiple headsets are operating in the same space, each moving about the space with no fixed positional relationship, there is a risk that light emitted by one headset will be projected on an image sensor of another headset, thus disrupting its operation. The risk of such interference between headsets may limit the number of headsets that can operate in a space to 3 or 4, for example. With one or more IR emitters in the space, which illuminate objects that can be imaged by image sensors on headsets, more headsets, more than 10 in some embodiments, may operate in the same space without interference.

As disclosed above with regards to FIG. 3B, camera 2140 may be configured to capture images of the physical world within view field 2141. Camera 2140 may include an image sensor and a lens. The image sensor may be configured to produce color images. The image sensor may be configured to output images between 4 megapixels and 16 megapixels in size. For example, the image sensor may output 12 megapixel images. The image sensor may be configured to output images repeatedly or periodically. For example, the image sensor may be configured to output images, when enabled, at a frequency between 30 Hz and 120 Hz, such as at 60 Hz. In some embodiments, the image sensor may be configured to selectively output images, based on a task being performed. The image sensor may be configured with a rolling shutter. As discussed above with regards to FIG. 14 and FIG. 15, a rolling shutter may iteratively read subsets of pixels in an image sensor, such that pixels in different subsets reflect light intensity data gathered at different times. For example, the image sensor may be configured to read a first row of pixels in the image sensor at a first time, and a second row of pixels in the image sensor at some later time.

In some embodiments, camera 2140 can be configured as a plenoptic camera. For example, as discussed above with regards to FIG. 3B and FIGS. 15-20C, a component can be placed in a light path to one or more pixel cells of the image sensor, such that these pixel cells produce an output having an intensity indicative of the angle-of-arrival of light incident on the pixel cell. In such embodiments, the image sensor may passively acquire depth information. An example of a component suitable for placement in the light path is a transmissive diffraction mask (TDM) filter. The processor can be configured to use this angle of arrival information to compute a distance to an object being imaged. For example, the angle-of-arrival information can be converted into distance information, indicating distance to an object from which light is being reflected. In some embodiments, pixel cells configured to provide angle-of-arrival information may be interspersed with pixel cells capturing light intensity of one or more colors. As a result, the angle of arrival information, and therefore distance information, may be combined with other image information about an object. In some embodiments, similar to DVS camera 2120, camera 2140 may be configured to provide event detection and patch tracking functionality. A processor of headset 2100 can be configured to provide instructions to camera 2140 to restrict image capture to a subset of pixels. In some embodiments, the sensor may be a CMOS sensor.

Camera 2140 can be positioned on an opposite side of headset 2100 from DVS camera 2120. For example, as shown in FIG. 21, when camera 2140 is on the same side of headset 2100 as monocular 2110a, DVS camera 2120 can be on the same side of the headset as monocular 2110b. Camera 2140 can be angled inwards on headset 2100. For example, a vertical plane through the center of view field 2141, the field of view associated with camera 2140, can intersect and form an angle with a vertical plane through the midline of headset 2100. View field 2141 of camera 2140 may have a horizontal field of view and a vertical field of view. An extent of the horizontal field of view may be between 75 and 125 degrees, while an extent of the vertical field of view may be between 60 and 125 degrees.

Camera 2140 and DVS camera 2120 can be asymmetrically angled inward towards the midline of headset 2100. An angle of camera 2140 can be between 1 and 20 degrees inward towards the midline of headset 2100. An angle of DVS camera 2120 can be between 1 and 40 degrees inward towards the midline of headset 2100, and can differ from the angle of camera 2140. An angular extent of view field 2121 can exceed an angular extent of view field 2141.

DVS camera 2120 and camera 2140 may be configured so as to provide overlapping views of central view field 2150. An angular extent of central view field 2150 may be between 40 and 120 degrees. For example, the angular extent of central view field 2150 may be approximately 70 degrees (e.g., 70±7 degrees). Central view field 2150 may be asymmetric. For example, central view field 2150 may extend further towards a side of headset 2100 that includes camera 2140, as shown in FIG. 21. In addition to central view field 2150, DVS camera 2120 and camera 2140 may be positioned so as to provide at least two peripheral view fields. Peripheral view field 2160a may be associated with DVS camera 2120 and may include that portion of view field 2121 not overlapping with view field 2141. In some embodiments, a horizontal angular extent of peripheral view field 2160a may range between 20 and 80 degrees. For example, the angular extent of peripheral view field 2160a may be approximately 40 degrees (e.g., 40±4 degrees). Peripheral view field 2160b (not depicted in FIG. 21) may be associated with camera 2140 and may include that portion of view field 2141 not overlapping with view field 2121. In some embodiments, a horizontal angular extent of peripheral view field 2160*b* may range between 10 and 40 degrees. For example, the angular extent of peripheral view field 2160*a* may be approximately 20 degrees (e.g., 20±2 degrees). The location of the peripheral view fields may differ. For example, for certain configurations of headset 2100, peripheral view field 2160*b* may not extend within 0.25 meters of headset 2100, as within that distance view field 2141 may fall entirely within view field 2121. In contrast, peripheral view field 2160*a* may extend within 0.25 meters of headset 2100. In such configurations, the wider field of view and greater inward angle of DVS camera 2120 may ensure that, even within 0.25 meters of headset 2100, view field 2121 falls at least partially outside view field 2141, as shown in FIG. 21.

IMU 2170*a* and/or IMU 2170*b* may be configured to provide acceleration and/or velocity and/or inclination information to the wearable display system. For example, as a user wearing headset 2100 moves, IMU 2170*a* and/or IMU 2170*b* may provide information describing the acceleration and/or velocity of the user's head.

The XR system may be coupled to a processor, which may be configured to process the image data output by the cameras and/or render virtual objects on the display device. The processor may be mechanically coupled to frame 2101. Alternatively, the processor may be mechanically coupled to a display device, such as a display device including monocular 2110*a* or a monocular 2110*b*. As a further alternative, the processor may be operatively coupled to headset 2100 and/or the display device through a communication link. For example, the XR system may include a local data processing module. This local data processing module may include the processor and may be connected to the headset 2100 or the display device through a physical connection (e.g., a wire or cable) or a wireless (e.g., a Bluetooth, Wi-Fi, Zigbee, or the like) connection.

The processor may be configured to perform world reconstruction, head pose tracking, and object tracking operations. The processor may be configured to create a passable world model using DVS camera 2120 and camera 2140. In creating the passable world model, the processor may be configured to determine depth information stereoscopically using multiple images of the same physical objects acquired by DVS camera 2120 and camera 2140. The processor may be configurable to update an existing passable world model using DVS camera 2120, but not camera 2140. As noted above, DVS camera 2120 may be a greyscale camera with a relatively lower resolution than color camera 2140. Furthermore, DVS camera 2120 may output image information asynchronously (e.g., in response to detected events), enabling the processor to asynchronously update the passable world model, head pose, and/or object locations only when a change is detected. In some embodiments, the processor may provide instructions to DVS camera 2120 to restrict image data acquisition to one or more patches of pixels in the image sensor of DVS camera 2120. DVS camera 2120 may then restrict image data acquisition to these patches of pixels. Consequently, updating the passable world model using image information output by DVS camera 2120, but not camera 2140, may be performed quickly with reduced power consumption and improved battery life. In some embodiments, the processor may be configured to occasionally or periodically update the passable world model using image information output by DVS camera 2120.

While the processor may preferentially update the passable world model using DVS camera 2120, the processor may, in some embodiments, occasionally or periodically update the passable world model using both DVS camera 2120 and camera 2140. For example, the processor may be configured to determine that a passable world quality criterion is no longer satisfied, that a predetermined time interval has elapsed since the last acquisition and/or use of an image output by camera 2140, and/or that changes have occurred in objects in a portion of the physical world currently in the field of view of DVS camera 2120 and camera 2140.

After creation of the passable world model, the processor may preferentially track head, object, and/or hand position using image information output by DVS camera 2120. As described above, DVS camera 2120 may be configurable for event-based image acquisition. The acquired image information may be specific to one or more patches in the image sensor of DVS camera 2120. Alternatively, the processor may track head, object, and/or hand position using monocular images output by DVS camera 2120 or camera 2140. These monocular images may be full frame images and may be output by DVS camera 2120 repeatedly or periodically. For example, the DVS camera may be configured to output images at a frequency between 30 Hz and 120 Hz, such as at 60 Hz, whereas changes may be output at an effective rate that is much higher, such as hundreds or thousands of times per second. In some embodiments, the processor may track head, object, and/or hand position using stereographic images output by both of DVS camera 2120 and camera 2140. These stereographic images may be output repeatedly or periodically.

The processor may be configured to acquire light field information, such as angle of arrival information for light incident on an image sensor, using a plenoptic camera. In some embodiments, this plenoptic camera can be at least one of DVS camera 2120 or camera 2140. Consistent with disclosed embodiments, when depth information is described herein, or could enhance processing, such depth information may be determined from, or supplemented by, light-field information obtained by a plenoptic camera. For example, when camera 2140 includes a TDM filter, the processor may be configured to create a passable world model using images obtained from DVS camera 2120 and 2140, together with light-field information obtained from camera 2140. Alternatively or additionally, when DVS camera 2120 includes a TDM filter, the processor may use light-field information obtained from DVS camera 2120.

The processor may be configured to detect conditions under which one or more types of image information is unavailable or insufficient to provide resolution for a particular function, such as world reconstruction, object tracking or head pose determination. The processor may be configured to select additional or alternative sources of image information to provide sufficient image information for the function. These sources may be selected in an order that results in suitable image information being available with a low processing burden in each circumstance. For example, DVS camera 2120 may be configured to output image data satisfying an intensity change criterion, but pixel intensities may not change sufficiently to trigger image data acquisition when an object of uniform visual characteristics fills view field 2121. Such may be the case, for example, when a hand of the user fills the field of view even when the hand of the user moves. In some embodiments, even a partial filling of view field 2121 can inhibit or prevent acquisition of suitable image data. For example, when patches tracked by the processor are filled with an image of objects of uniform appearance, image data for those patches may be inadequate for tracking objects. Similarly, if a close object fills the field of view of a camera, or at least the patches used to track points of interest, such as points of interest tracked for tracking head pose, the image information from that camera may be inadequate for a head tacking function.

However, given the geometry of headset 2100 shown in FIG. 21, camera 2140 may be positioned so as to output images of the object filling the relevant portions of the field of view. These images alternatively or additionally may be used to determine a depth of the object. Camera 2140 may also be positioned to image points of interest tracked within the patches for head pose tracking.

Accordingly, the processor can be configured to determine whether an object satisfies a fill criterion for view field 2121. Based on this determination, the processor can be configured to enable camera 2140 or increase a frame rate of camera 2140. The processor can then receive image data from at least camera 2140. In some embodiments, this image data can include light field information. For object tracking, the processor may be configured to determine depth information using the received image data. The processor can track the occluding object using the determined depth information. For head pose tracking, the processor may be configured to determine changes in head pose using that received image data. When DVS camera 2120 is configured for patch tracking of points of interest, the processor can be configured to use camera 2120 to track the points of interest. The processor may be configured to disable or reduce a frame rate of camera 2140 based on determining that the fill criterion is no longer satisfied, reverting to use of data that may be more quickly acquired and or processed with lower latency, yet is adequate for the function being performed, such as object tracking or head pose tracking. This may allow for DVS camera 2120 to track images at ultra-high temporal resolution: for example, DVS camera 2120 may output information indicating current position of a moving object at frequencies higher than 60 Hz, such as frequencies of hundreds or thousands of times per second.

It should be appreciated that processor may enable or disable a camera so as to dynamically provide different sources of image information for one or more functions based on detected operating conditions in any one or more ways. The processor may send control signals to the underlying image sensor hardware so as to alter the operation of the hardware. Alternatively or additionally, the processor may enable a camera by reading image information generated by that camera or disable that camera by not accessing or using image information generated by that camera. These techniques may be used to enable or suppress image information entirely or in part. For example, the processor may be configured to perform a size reduction routine to adjust images output using camera 2140. Camera 2140 may generate larger images than DVS camera 2120. For example, camera 2140 may generate 12 megapixel images while DVS camera 2120 may generate 1 megapixel images. The images generated by camera 2140 may include more information than necessary for performing passable world creation, head tracking, or object tracking operations. Processing this additional information may require additional power, reducing battery life, or increase latency. Thus the processor can be configured to discard or combine pixels in images output by camera 2140. For example, the processor can be configured to output an image with one-sixteenth the number of pixels as the originally generated image. Each pixel in this output image can have a value based on a corresponding 4×4 set of pixels in the originally generated image (e.g. an average of the values of these sixteen pixels).

The XR system may comprise a hardware accelerator, according to some embodiments. The hardware accelerator may be implemented as an application specific integrated circuit (ASIC) or other semiconductor device and may be integrated within the headset 2100 or otherwise coupled to it so that it receives image information from camera 2120 and camera 2140. This hardware accelerator may assist with the stereoscopic determination of depth information using the images output by these two world cameras. The image from camera 2120 may be a greyscale image and the image from camera 2140 may be a color image. Using hardware acceleration may speed the determination of depth information and reduce power consumption, thus increasing battery life.

Exemplary Calibration Process

Figure 22:
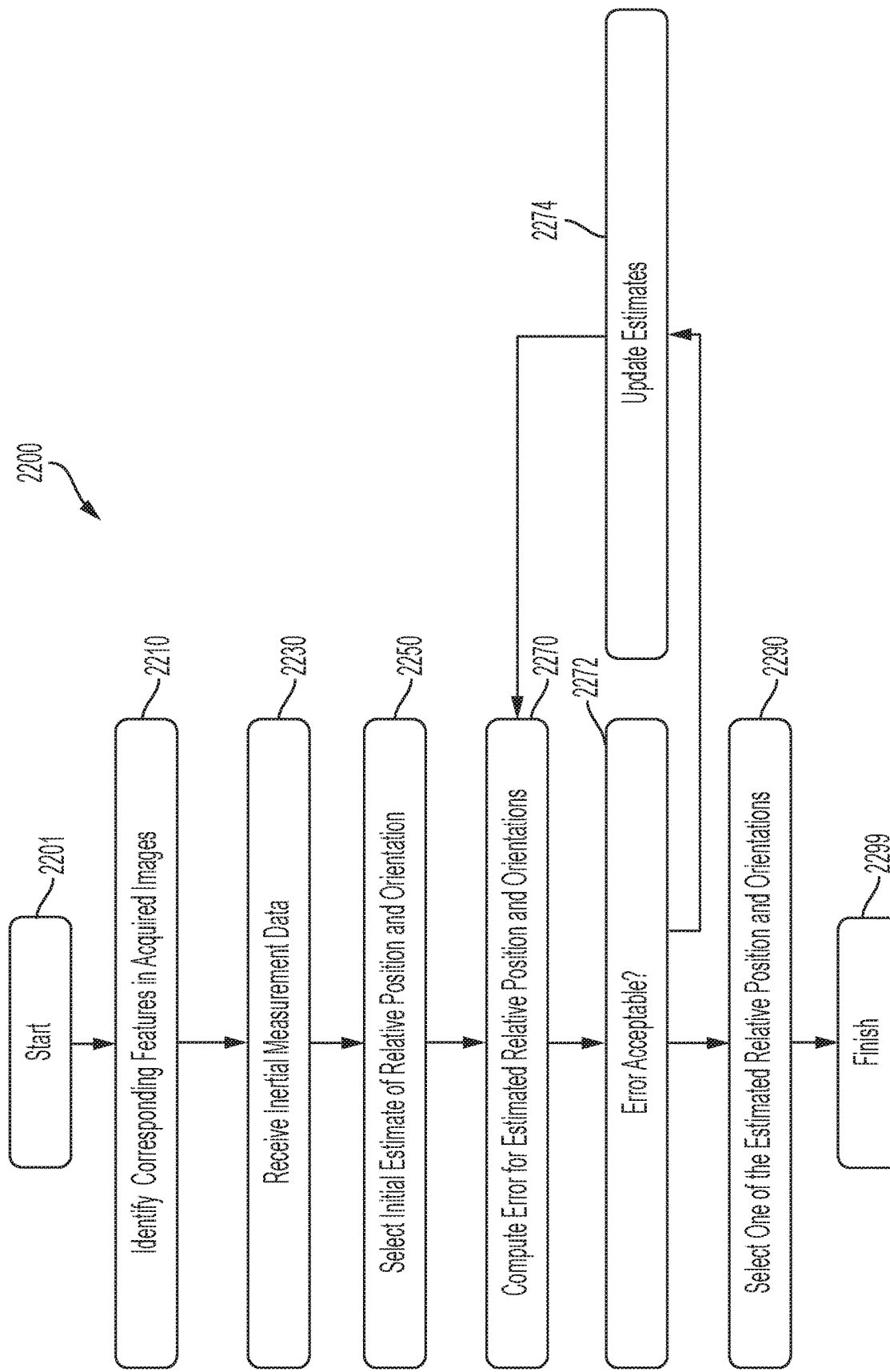
FIG. 22 is a flow chart of a calibration routine, according to some embodiments.

FIG. 22 depicts a simplified flow chart of a calibration routine (method 2200), according to some embodiments. The processor may be configured to perform the calibration routine while the wearable display system is being worn. The calibration routine may address distortions arising from the lightweight construction of headset 2100. For example, the processor may perform the calibration routine repeatedly, such that the calibration routine compensates for distortions in frame 2101 during use of the wearable display system. The compensation routine may be performed automatically or in response to a manual input (e.g., a user request to perform the calibration routine). The calibration routine may include determining the relative position and orientation of camera 2120 and camera 2140. The processor may be configured to perform the calibration routine using images output by DVS camera 2120 and camera 2140. In some embodiments, the processor may be configured to further use outputs of the IMU 2170*a* and IMU 2170*b*.

After starting in block 2201, method 2200 may proceed to block 2210. In block 2210, the processor may identify corresponding features in images output from DVS camera 2120 and camera 2140. The corresponding features may be portions of objects in the physical world. In some embodiments, the objects may be placed by the user within central view field 2150 for calibration purposes and may have features readily identifiable in an image that may have predetermined relative positions. However, a calibration technique as described herein may be performed based on features on objects that are present in the central view field 2150 at the time of calibration, enabling calibration to be repeated during use of the headset 2100. In various embodiments, the processor may be configured to automatically select the features detected within both view field 2121 and view field 2141. In some embodiments, the processor can be configured to determine a correspondence between the features using estimated locations of the features within view field 2121 and view field 2141. Such an estimate may be based on the passable world model constructed for the objects containing these features or other information about the features.

Method 2200 may proceed to block 2230. In block 2230, the processor may receive inertial measurement data. The inertial measurement data may be received from IMU 2170*a* and/or IMU 2170*b*. The inertial measurement data may include inclination and/or acceleration and/or velocity measurements. In some embodiments, IMU 2170*a* and 2170*b* may be directly or indirectly mechanically coupled to camera 2140 and DVS camera 2120, respectively. In such an embodiment, differences in inertial measurements, such as inclination, made by IMU 2170*a* and 2170*b* may indicate a difference in position and/or orientation of the camera 2140 and camera 2120. Accordingly, the outputs of IMU 2170a and 2170b may provide a basis to make an initial estimate of the relative position of camera 2140 and DVS camera 2120.

After block 2230, method 2200 may proceed to block 2250. In block 2250, the processor may compute an initial estimated relative position and orientation of DVS camera 2120 and camera 2140. This initial estimate may be computed using the measurements received from IMU 2170b and/or IMU 2170a. In some embodiments, for example, the headset may be designed with a nominal relative position and orientation of DVS camera 2120 and camera 2140. The processor may be configured to attribute differences in received measurements between IMU 2170a and IMU 2170b to distortions in frame 2101, which may alter the position and/or orientation of DVS camera 2120 and camera 2140. For example, IMU 2170a and IMU 2170b may be directly or indirectly mechanically coupled to frame 2101 such that inclination and/or acceleration and/or velocity measurements by these sensors have a predetermined relationship. When frame 2101 becomes distorted, this relationship may be affected. As a non-limiting example IMU 2170a and IMU 2170b may be mechanically coupled to frame 2101 such that, when no distortion of frame 2101 is present, these sensors measure similar inclination, acceleration or velocity vectors during movement of the headset. In this non-limiting example, a twist or bend that rotates IMU 2170a with respect to IMU 2170b may result in a corresponding rotation of the inclination, acceleration, or velocity vector measurement for IMU 2170a with respect to the corresponding vector measurement for IMU 2170b. The processor may therefore adjust the nominal relative position and orientation for DVS camera 2120 and camera 2140 consistent with the measured relationship between IMU 2170a and IMU 2170b, as IMU 2170a and IMU 2170b are mechanically coupled to DVS camera 2140 and camera 2120, respectively.

Other techniques may alternatively or additionally be used to make an initial estimate. In embodiments in which the calibration method 2200 is performed repeatedly during operation of an XR system, the initial estimate, for example, may be the most recently computed estimate.

After block 2250, a sub-process is initiated in which further estimates of the relative position and orientation of camera 2120 and camera 2140 are made. One of the estimates is selected as the relative position and orientation of camera 2120 and camera 2140 for computing stereoscopic depth information from images output by camera 2120 and camera 2140. That sub-process may be performed iteratively such that a further estimate is made in each iteration until an acceptable estimate is identified. In the example of FIG. 22, that sub-process includes blocks 2270, 2272, 2274, and 2290.

In block 2270, the processor may compute an error for the estimated relative orientations of the cameras and the features being compared. In computing this error, the processor may be configured to estimate how the identified features should appear or where the identified features should be located within corresponding images output by camera 2120 and camera 2140 based on the estimated relative orientation of DVS camera 2120 and camera 2140 and the estimated locations features being used for calibration. In some embodiments, this estimate may be compared to the appearance or apparent location of the corresponding features in the images output by each of the two cameras to generate the error for each of the estimated relative orientations. Such an error may be computed using linear algebraic techniques. For example, the mean square deviation between the computed and actual locations of each of the multiple features within the images may be used as a metric for the error.

After block 2270, method 2200 may proceed to block 2272 where a check may be made as to whether the error meets an acceptance criteria. That criteria, for example, may be the overall magnitude of the error or may be the change in error between iterations. If the error meets the acceptance criteria, method 2200 proceeds to block 2290.

In block 2290, the processor may select one of the estimated relative orientations based on the errors computed in block 2272. The estimated relative position and orientation selected may be the estimated relative position and orientation having the lowest error. In some embodiments, the processor may be configured to select as the current relative position and orientation of DVS camera 2120 and camera 2140 the estimated relative position and orientation associated with this lowest error. After block 2290, method 2200 may proceed to block 2299. Method 2200 may finish in block 2299 with the selected position and orientation of DVS camera 2120 and camera 2140 being used to compute stereoscopic image information based on images formed with those cameras.

If the error does not meet the acceptance criteria at block 2272, method 2200 may proceed to block 2274. At block 2274, the estimates used in computing the error at block 2270 may be updated. Those updates may be to the estimated relative position and/or orientation of camera 2120 and camera 2140. In embodiments in which the relative position of a set of features being used for calibration are estimated, the updated estimate selected at block 2274 may alternatively or additionally include an update to the position of location of the features in the set. Such an update may be made according to linear algebraic techniques used to solve a set of equations with multiple variables. As a specific example, one or more of the estimated positions or orientations may be increased or decreased. If that change, in one iteration of the sub-process, decreases the computed error, in a subsequent iteration, the same estimated positions or orientations may be further changed in the same direction. Conversely, if the change increased the error, in a subsequent iteration, those estimated positions or orientations may be changed in the opposite direction. The estimated position and orientation of the cameras and features being used in the calibration process may be varied in this way sequentially or in combination.

Once an updated estimate is computed, the sub-process returns to block 2270. There, a further iteration of the sub-process is initiated, with a computation of the error for the estimated relative positions. In this way, the estimated positions and orientations are updated until an updated relative position and orientation is selected that provides an acceptable error. It should be appreciated, however, that processing at block 2272 may apply other criteria for ending the iterative sub-process, such as completing a number of iterations without finding an acceptable error.

While method 2200 is described in connection with DVS camera 2120 and camera 2140, a similar calibration may be performed for any pair of cameras used for stereoscopic imaging or for any set of multiple cameras for which the relative position and orientation is desired.

Exemplary Camera Configurations

Figure 23A:
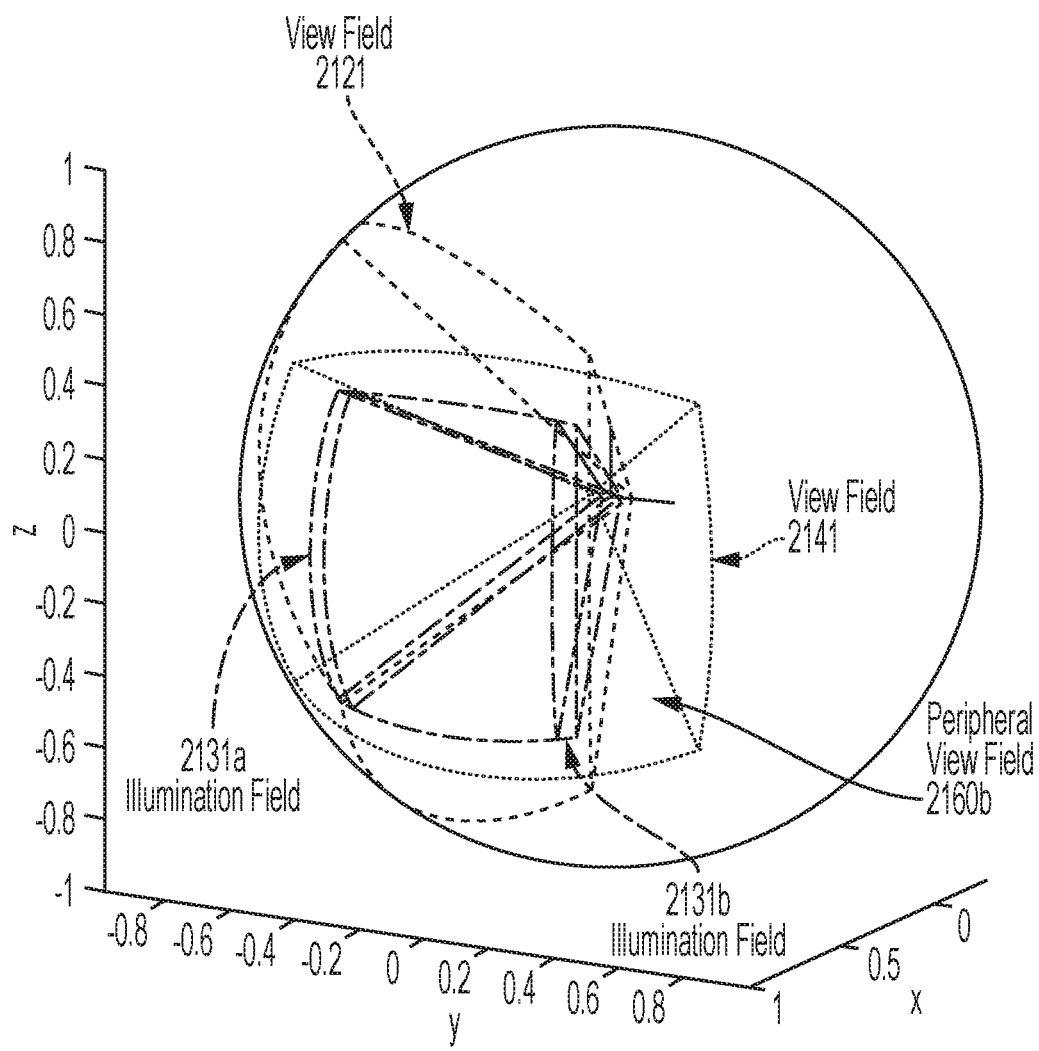
FIGS. 23A-23C depict exemplary fields of view diagrams associated with the headset of FIG. 21, according to some embodiments.
Figure 23B:
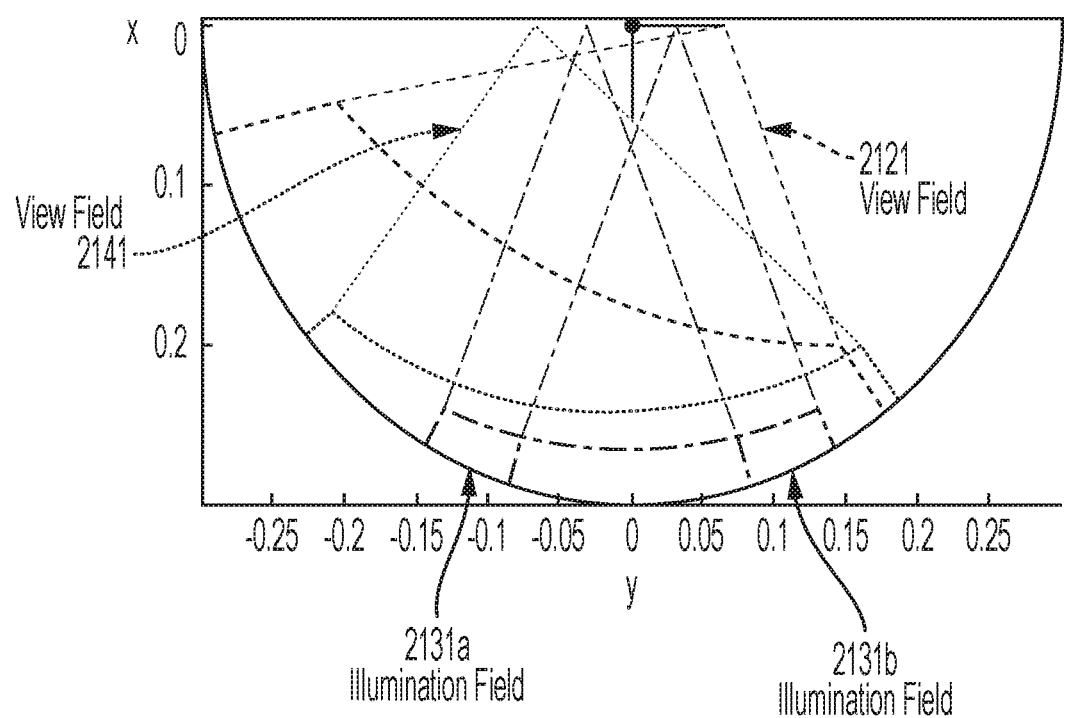
Figure 23C:
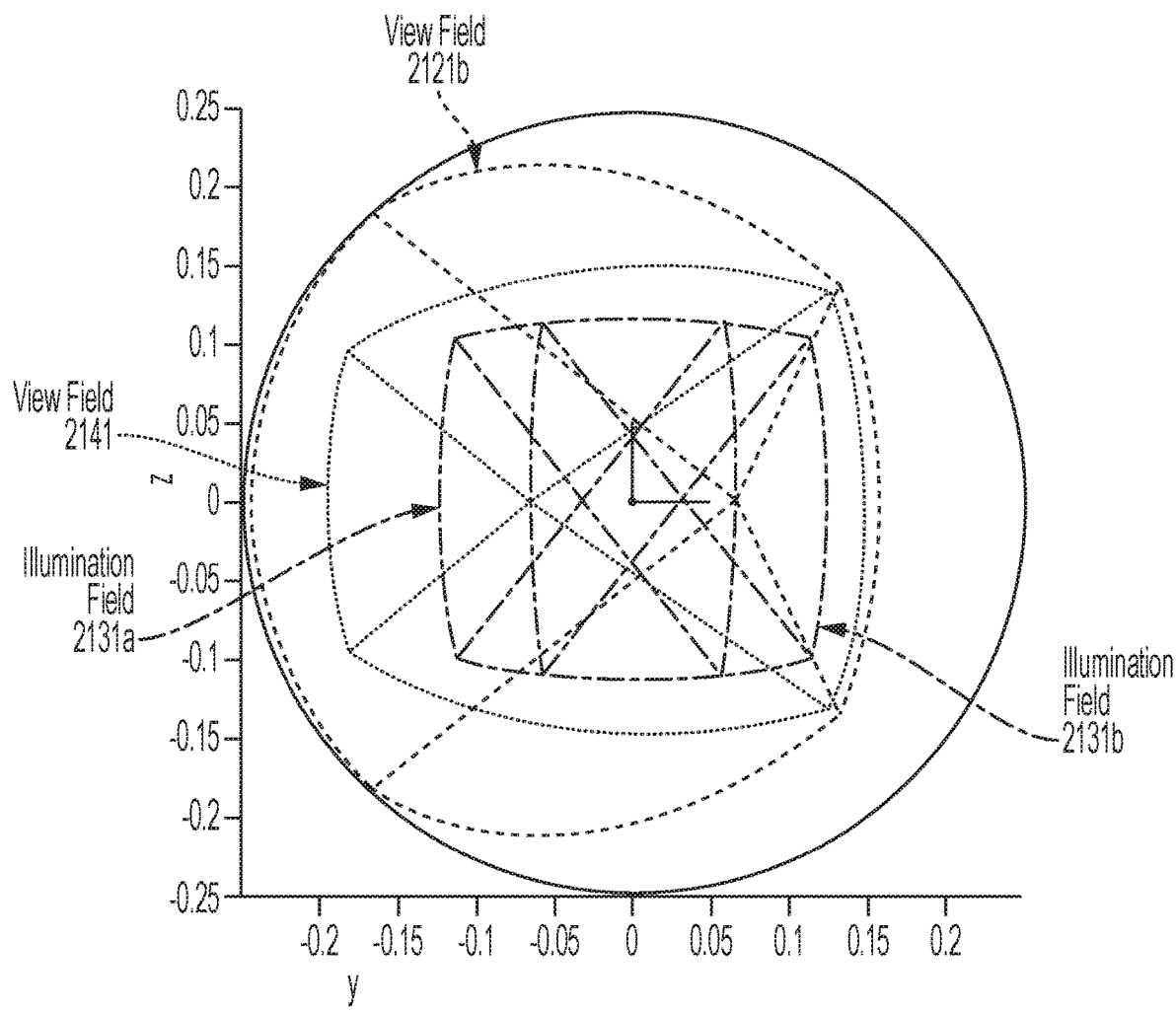

Headset 2100 incorporates components that provide view fields and illumination fields to support multiple functions of an XR system. FIGS. 23A-23C are exemplary diagrams of fields of view or illumination associated with the headset 2100 of FIG. 21, according to some embodiments. Each of the exemplary diagrams depicts the fields of view or illumination from a different orientation and distance from the headset. FIG. 23A depicts the fields of view or illumination at a distance of 1 meter from the headset from an elevated, off-axis perspective. FIG. 23A depicts the overlap between the view fields for DVS camera 2120 and camera 2140, and in particular how DVS camera 2120 and camera 2140 are angled such that the view field 2121 and view field 2141 cross the midline of headset 2100. In the depicted configuration, view field 2141 extends beyond view field 2121 to form peripheral view field 2160b. As depicted, the fields of illumination for emitter 2130a and emitter 2130b largely overlap. In this manner, emitter 2130a and emitter 2130b may be configured to support imaging or depth measurements for objects in central view field 2150 in conditions of low ambient light. FIG. 23B depicts the fields of view or illumination at a distance of 0.3 meters from the headset from a top-down perspective. FIG. 23B depicts that the overlapping of view field 2121 and view field 2141 is present at 0.3 meters from the headset. However, in the depicted configuration, view field 2141 does not extend beyond view field 2121 very far, limiting the extent of peripheral view field 2160b and demonstrating the asymmetry between peripheral view field 2160a and peripheral view field 2160b. FIG. 23C depicts the fields of view or illumination at a distance of 0.25 meters from the headset from a front-view perspective. FIG. 23C depicts that the overlapping of view field 2121 and view field 2141 is present at 0.25 meters from the headset. However, view field 2141 is entirely contained within view field 2121, thus in the depicted configuration peripheral view field 2160b does not exist at this distance from headset 2100.

As can be appreciated from FIGS. 23A-23C, overlapping of view field 2121 and view field 2141 creates a central field of view in which stereoscopic imaging techniques may be employed using images output by camera 2120 and camera 2140, with or without IR illumination from emitter 2130a and emitter 2130b. In this central field of view, color information from camera 2140 may be combined with gray scale image information from camera 2120. Additionally, there are peripheral fields of view where there is no overlap, but monocular gray scale image information or color image information is available from camera 2120 or camera 2140, respectively. Different operations may be performed on image information acquired for the central and peripheral fields of view, as described herein.

World Model Generation

Figure 24:
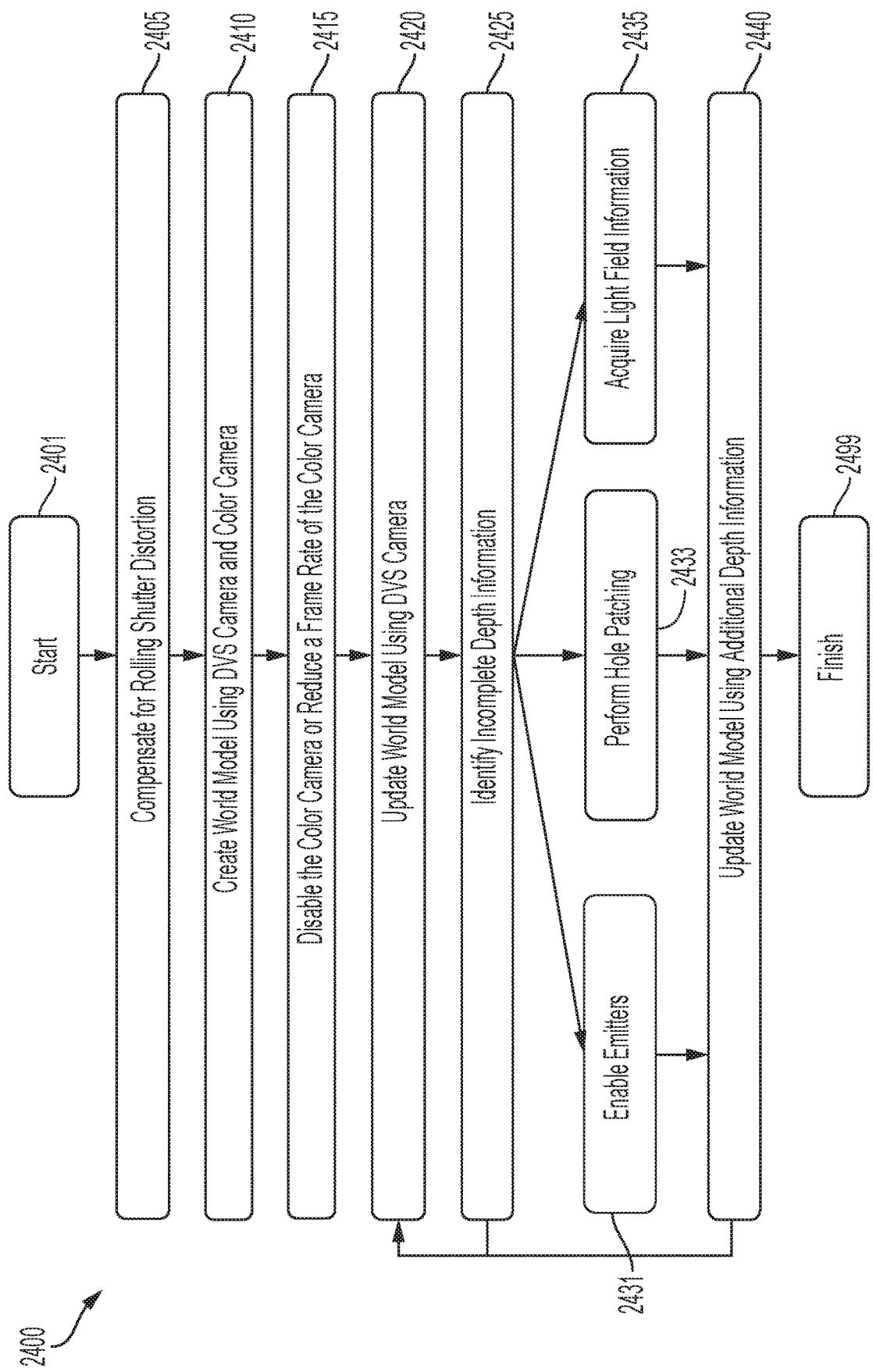
FIG. 24 is a flow chart of a method for creating and updating a passable world model, according to some embodiments.

In some embodiments, image data output by DVS camera 2120 and/or camera 2140 may be used to construct or update a world model. FIG. 24 is a simplified flow chart of a method 2400 for creating or updating a passable world model, according to some embodiments. As disclosed above with regards to FIG. 21, the XR system may use the processor to determine and update a passable world model. In some embodiments, DVS camera 2120 may be configured to operate to output image information representing detected intensity levels at each of multiple pixels or to output image information indicating pixels for which a change in intensity exceeding a threshold has been detected. In some embodiments, the processor may determine and update this passable world model based on outputs of DVS camera 2120 representing detected intensity, which may be used in conjunction with image information output from camera 2140 to stereoscopically determine positions of objects in the passable world. In some embodiments, outputs of DVS camera 2120, representing detected changes of intensity, may be used to identify regions of the world model to update, based on changes in image information from those locations.

In some embodiments, DVS camera 2120 may be configured to output image information reflecting intensity with a global shutter, while camera 2140 may be configured with a rolling shutter. The processor may therefore perform a compensation routine to compensate for rolling shutter distortion in images output by camera 2140. In various embodiments, the processor may determine and update this passable world model without use of emitters 2130a and 2130b. However, in some embodiments, the passable world model may be incomplete. For example, the processor may incompletely determine depths for a wall or other flat surface. As an additional example, the passable world model may incompletely represent objects with many corners, curved surfaces, transparent surfaces or large surfaces, such as windows, doors, balls, tables, and the like. The processor may be configured to identify such incomplete information, acquire additional information, and update the world model using additional depth information. In some embodiments, emitters 2130a and 2130b may be selectively enabled to collect additional image information from which to construct or update a passable world model. In some scenarios, a processor may be configured to perform object recognition in acquired images, select a template for a recognized object, and add information to the passable world model based on the template. In this manner, the wearable display system may improve the passable world model while making little or no use of power-intensive components like emitter 2130a and 2130b, thereby extending battery life.

Method 2400 may be initiated at one or more times during operation of a wearable display system. The processor may be configured to create a passable world model when the user first turns on the system, moves to a new environment, such as by walking into another room, or generally when the processor detects a change in the user's physical environment. Alternatively or additionally, method 2400 may be performed periodically during operation of the wearable display system or when a significant change in the physical world is detected or in response to a user input, such as an input indicating that the world model is out of synchronization with the physical world.

In some embodiments, all or portions of a passable world model may be stored, provided by other users of an XR system, or otherwise obtained. Thus, while creation of a world model is described, it should appreciated that method 2400 may be used for a portion of a world model, with other portions of the world model derived from other sources.

In block 2405, the processor can perform a compensation routine to compensate for rolling shutter distortion in images output by camera 2140. As described above, an image acquired by an image sensor with a global shutter, such as the image sensor in DVS camera 2120, includes pixel values acquired at the same time. In contrast, an image acquired by an image sensor with a rolling shutter includes pixel values acquired at differing times. Relative movement of the headset and the environment during acquisition of an image by camera 2140 can introduce spatial distortions into the image. These spatial distortions can affect the accuracy of methods dependent on comparing the images acquired by camera 2140 with the images acquired by DVS camera 2120.

Performing the compensation routine can include comparing, using the processor, an image output by DVS camera 2120 to an image output by camera 2140. The processor performs this comparison to identify any distortion in the image output by camera 2140. Such a distortion can include a skew in at least a part of this image. For example, if the image sensor in camera 2140 is acquiring pixel values row-by-row from the top of the image sensor to the bottom of the image sensor, while headset 2100 is translating sideways, the appearance of an object or a portion of an object can be offset in successive rows of pixels by an amount dependent on the speed of translation and the difference in time between the acquisition of each row of value. A similar distortion can occur when the headset is rotated. These distortions can result in an overall skew in the location and/or orientation of an object or a portion of an object in the image. The processor can be configured to perform a line-by-line comparison between the image output by camera 2120 and the image output by camera 2140 to determine the amount of the skew. The image output by camera 2140 can then be transformed to remove the distortion (e.g., to remove a detected skew).

In block 2410, a passable world model may be created. In the illustrated embodiment, the processor may create a passable world model using DVS camera 2120 and camera 2140. As described above, in generating the passable world model, the processor may be configured to use images output by DVS camera 2120 and camera 2140 to stereoscopically determine depth information for objects in the physical world when constructing the passable world model. In some embodiments, the processor may receive color information from camera 2140. This color information may be used to differentiate objects or to identify surfaces associated with the same object. Color information may also be used to recognize objects. As disclosed above with regards to FIG. 3A, the processor can create the passable world model by associating information about the physical world with information about the location and orientation of headset 2100. As a non-limiting example, the processor can be configured to determine a distance from headset 2100 to a feature in a view (e.g., view field 2121 and/or view field 2141). The processor can be configured to estimate a current location and orientation of the view. The processor can be configured to accumulate such distances, together with location and orientation information. By triangulating distances to features acquired from multiple locations and orientations, the position and orientation of the feature in an environment can be determined. In various embodiments, the passable world model can be a combination of raster imagery, point and descriptors clouds, and polygonal/geometric definitions that describes the position and orientation of such features in the environment. In some embodiments, the distance from headset 2100 to a feature in central view field 2150 can be determined stereoscopically using image data output by DVS camera 2120 and the compensated image generated using image data output by camera 2140. In various embodiments, light field information can be used to supplement or refine this determination. For example, the angle-of-arrival information may, through calculation, be converted into distance information, indicating distance to an object from which light is being reflected.

In block 2415, the processor may disable camera 2140 or reduce a frame rate of camera 2140. For example, the frame rate of camera 2140 can be reduced from 30 Hz to 1 Hz. As disclosed above, color camera 2140 can consume more power than DVS camera 2120, a greyscale camera. By disabling or reducing a frame rate for camera 2140, the processor can reduce power consumption and extend the battery life of the wearable display system. Accordingly, the processor may disable camera 2140 or reduce a frame rate of camera 2140 to conserve power. This lower power state may be maintained until a condition is detected indicating an update in the world model may be required. Such a condition may be detected based on the passage of time or input, such as from a sensor gathering information about the environment around the user or from a user.

Alternatively or additionally, once the passable world model is sufficiently complete, the position and orientation of features in the physical environment may be sufficiently determinable using images, or image patches, acquired using camera 2120. As a non-limiting example, the passable world model may be identified as sufficiently complete based on the percentage of the space around the location of the user that is represented in the model or based on the amount of new image information that matches the passable world model. For this latter approach, newly acquired images may be associated with locations in the passable world. If features in those images have features matching features identified as landmarks in the passable world model, the world model may be deemed complete. The coverage or matching need not be 100% complete. Rather, for each criteria, a suitable threshold may be applied, such as greater than 95% coverage or greater than 90% of features matching previously identified landmarks. Regardless of how the passable world model is determined to be complete, once it is complete, the processor can use existing passable world information to refine estimates of the location and orientation of features in the physical world. This process may reflect an assumption that features in the physical world are changing position and/or orientation slowly, if at all, compared to the rate at which the processor processes images output by DVS camera 2120.

In block 2420, after creating a passable world model, the processor may identify surfaces and or objects with which to update the passable world model. In some embodiments, the processor may identify such surfaces or objects using greyscale images or image patches output by DVS camera 2120. For example, once a world model indicating a surface at a particular location within the passable world is created at block 2410, greyscale images or image patches output by DVS camera 2120 may be used to detect a surface of approximately the same characteristics and determine that the passable world model should be updated by updating the position of that surface within the passable world model. A surface at approximately the same location with approximately the same shape as a surface in the passable world model, for example, may be equated to that surface in the passable world model and the passable world model may be updated accordingly. As another example, the position of an object, represented in the passable world model, may be updated based on greyscale images or image patches output by DVS camera 2120. As described herein, DVS camera 2120 can detect events associated with the greyscale images or more image patches. Upon detecting such an event, DVS camera 2120 can be configured to update the passable world model using the greyscale image or image patch.

In some embodiments, the processer may use light field information obtained from camera 2120 to determine depth information for objects in the physical world. For example, angle-of arrival-information may be used to determine depth information. This determination may be more accurate for objects in the physical world closer to headset 2100. Accordingly, in some embodiments, the processor may be configured to update only portions of the passable world model satisfying a depth criterion using the light field information. The depth criterion may be based on a maximum distinguishable distance. For example, the processor may be unable to distinguish between objects at differing distances from headset 2100, when those distances exceed a threshold distance. The depth criterion may be based on an maximum error threshold. For example, an error in the estimated distance may increase with increasing distance, with a particular distance corresponding to the maximum error threshold. In some embodiments, the depth criterion may be based on a minimum distance. For example, the processor may be unable to determine accurately determine distance information for objects within a minimum distance from headset 2100, such as 15 cm. Accordingly, portions of the world model more than 16 cm from the headset may satisfy the depth criterion. In some embodiments, the passable world model may be composed of three dimensional "bricks" of voxels. In such embodiments, updating passable world model may include identifying bricks of voxels for updating. In some embodiments, the processor can be configured to determine a viewing frustrum. The viewing frustrum may have a maximum depth, such as 1.5 m. The processor may be configured to identify bricks within the viewing frustrum. The processor may then update the passable world information for the voxels within the identified bricks. In some embodiments, the processor can be configured to use the light field information acquired in step 2450 to update the passable world information for the voxels, as described herein.

The process for updating the world model may differ based on whether the object is in a central field of view or a peripheral field of view. For example, an update may be performed for a detected surface in the central field of view. In the peripheral field of view, an update might be performed, for example, only for an object for which the processor has a model such that the processor can confirm that any updates to the passable world model are consistent with that object. Alternatively or additionally, new objects or surfaces may be recognized based on processing of grayscale images. Even if such processing leads to a less accurate representation of objects or surfaces than the processing at block 2410, the tradeoff of accuracy for faster and lower power processing may lead to a better overall system in some scenarios. Moreover, the lower accuracy information may be periodically replaced by higher accuracy information by periodically repeating method 2400 so as to replace portions of the world model that were generated with just monocular greyscale images with portions generated stereoscopically through the use of color camera 2140 in combination with the DVS camera 2120.

In some embodiments, the processor may be configured to determine whether the updated world model satisfies a quality criterion. When the world model satisfies the quality criterion, the processor may continue updating the world model with camera 2140 disabled or having a reduced frame rate. When the updated world model does not satisfy the quality criterion, method 2400 may enable the camera 2140 or increase a frame rate of camera 2140. Method 2400 may also return to step 2410 and recreate the passable world model.

In block 2425, after updating the passable world model, the processor may identify whether the passable world model includes incomplete depth information. Incomplete depth information may arise in any of multiple ways. For example, some objects do not result in detectable structures in an image. For example, a region in the physical world that is very dark may not be imaged with sufficient resolution to extract depth information from images acquired with ambient lighting. As another example, a window or glass table top may not appear or be recognized by computerized processing in a visible image. As yet another example, a large uniform surface, such as a table top or a wall, may lack sufficient features that can be correlated in two stereoscopic images to enable stereoscopic image processing. As a result, the processor may be unable to determine the location of such objects using stereoscopic processing. In these scenarios, there will be "holes" in the world model, as a process seeking to use the passable world model to determine the distance to a surface, in a particular direction that passes through the "hole," will be unable to acquire any depth information.

When the passable world model does not include incomplete depth information, method 2400 may return to updating the passable world model using greyscale images or image patches obtained from DVS camera 2120.

Following identification of the incomplete depth information, a processor controlling method 2400 may take one or more actions to acquire additional depth information. Method 2400 may proceed to block 2431, block 2433, and/or block 2435. In block 2431, the processor may enable emitter 2130*a* and/or emitter 2130*b*. As disclosed above, one or more of camera 2120 and camera 2140 may be configured to detect light emitted by emitter 2130*a* and/or emitter 2130*b*. The processor may then acquire depth information by causing emitter 2130*a* and/or 2130*b* to emit light that may enhance images acquired of objects in the physical world. When DVS camera 2120 and camera 2140 are sensitive to the emitted light, for example, the images output by DVS camera 2120 and camera 2140 may be processed to extract stereoscopic information. Other analysis techniques may alternatively or additionally be used to obtain depth information when emitter 2130*a* and/or emitter 2130*b* are enabled. Time of flight measurements and or structured light techniques may alternatively or additionally be used, in some embodiments.

In block 2433, the processor may determine the additional depth information from previously acquired depth information. In some embodiments, for example, the processor may be configured to identify objects in images formed with DVS camera 2120 and/or camera 2140 and fill-in any holes in the passable world model based on a model of the object identified. For example, processing may detect a planar surface in the physical world. The planar surface may be detected using existing depth information acquired with DVS camera 2120 and/or camera 2140 or depth information stored in the passable world model. The planar surface may be detected in response to determining that a portion of the world model includes incomplete depth information. The processor may be configured to estimate additional depth information based on the detected planar surface. For example, the processor may be configured to extend the identified planar surface through the region of incomplete depth information. In some embodiments, the processor may be configured to interpolate missing depth information based on surrounding portions of the passable world model when extending the planar surface.

In some embodiments, as an additional example, the processor may be configured to detect an object in the portion of the world model including incomplete depth information. In some embodiments, this detection may involve using neural networks or other machine learning tools to recognize the object. In some embodiments, the processor may be configured to access a database of stored templates and select an object template corresponding to the identified object. For example, when the identified object is a window, the processor may be configured to access the database of stored templates and select a corresponding window template. As a non-limiting example, the template may be a three-dimensional model representative of a class of objects, such as a type of window, door, ball, or the like.

The processor may configure an instance of the object template based on the image of the object in the updated world model. For example, the processor may scale, rotate, and translate the template to match the detected location of the object in the updated world model. The additional depth information may then be estimated based on the boundaries of the configured template, representing surfaces of the recognized object.

In block 2435, the processor can acquire light field information. In some embodiments, this light field information can be acquired together with images, and can include angle-of-arrival information. In some embodiments, camera 2120 can be configured as a plenoptic camera to acquire this light field information.

After block 2431, block 2433 and/or block 2435, method 2400 may proceed to block 2440. In block 2490, the processor may update the passable world model using the additional depth information obtained in block 2431 and/or block 2473. For example, the processor may be configured to blend additional depth information obtained from measurements made with active IR illumination into the existing passable world model. Similarly, additional depth information determined from light field information, for example using triangulation based on angle-of-arrival information, can be blended into the existing passable world model. As an additional example, the processor may be configured to blend interpolated depth information obtained by extending a detected planar surface into the existing passable world model, or blend additional depth information estimated from the boundaries of a configured template into the existing passable world model.

Information may be blended in one or more ways, depending on the nature of the additional depth information and/or information in the passable world model. Blending, for example, may be performed by adding to the passable world model additional depth information collected for locations in which there are holes in the passable world model. Alternatively, the additional depth information may overwrite information in corresponding locations in the passable world model. As yet another alternative, blending may involve selecting between information already in the passable world model and additional depth information. Such a selection may be based on, for example, selecting the depth information, either that already in the passable world model of that in the additional depth information, representing a surface closest to the cameras being used to collect additional depth information.

In some embodiments, the passable world model may be represented by a mesh of connected points. Updating the world model may be done by computing a mesh representation of objects or surfaces to be added to the world model and then combining that mesh representation with the mesh representation of the world model. The inventors have recognized and appreciated that performing processing in this order may require less processing than adding objects or surfaces to the world model and then computing the mesh for the updated model.

FIG. 24 shows that the world model may be updated at both blocks 2420 and 2440. Processing at each block may be performed in the same way, for example by generating a mesh representation of objects or surfaces to be added to the world model and combining the generated mesh with the mesh of the world model, or in different ways. In some embodiments, this merging operation may be performed once for both objects or surfaces identified at block 2420 and at block 2440. Such combined processing may be performed, for example, as described in connection with block 2440.

In some embodiments, method 2400 may loop back to block 2420 to repeat the process of updating the world model based on information acquired using DVS camera 2120. As processing at block 2420 may be performed on fewer images and smaller images than the processing at block 2410, it may be repeated at a higher rate. This processing may be performed at a rate of less than 10 times per second, such as between 3 and 7 times per second.

Method 2400 may repeat in this way until an end condition is detected. For example, method 2400 may repeat for a predetermined period of time, until a user input is received or until a particular type or particular magnitude of change in the portion of the physical world model in the field of view of the cameras of headset 2100 is detected. Method 2400 may then terminate in block 2499. Method 2400 may be initiated again so that the new information of the world model, including that acquired with a higher resolution color camera, is captured at block 2405. Method 2400 may be terminated and re-initiated so as to repeat the processing at block 2405 using a color camera to create a portion of the world model at an average rate that is slower than the rate at which the world model is updated based only on the grayscale image information. Processing using the color camera may be repeated at an average rate of once per second or slower, for example.

Head Pose Tracking

The XR system may track the position and orientation of the head of a user wearing the XR display system. Determining the head pose of a user enables information in a passable world model to be translated into the frame of reference of the user's wearable display device such that the information in the passable world model can be used in rendering objects on the wearable display device. As head pose is updated frequently, performing head pose tracking using only DVS camera 2120 may provide power savings, reduced compute, or other benefits. Such tracking may be event-based and may acquire full images and/or image patch data, as described above with regards to FIGS. 4-16. The XR system may therefore be configured to disable or reduce the frame rate of color camera 2140 as necessary to balance head tracking accuracy against power consumption and computation requirements.

Figure 25:
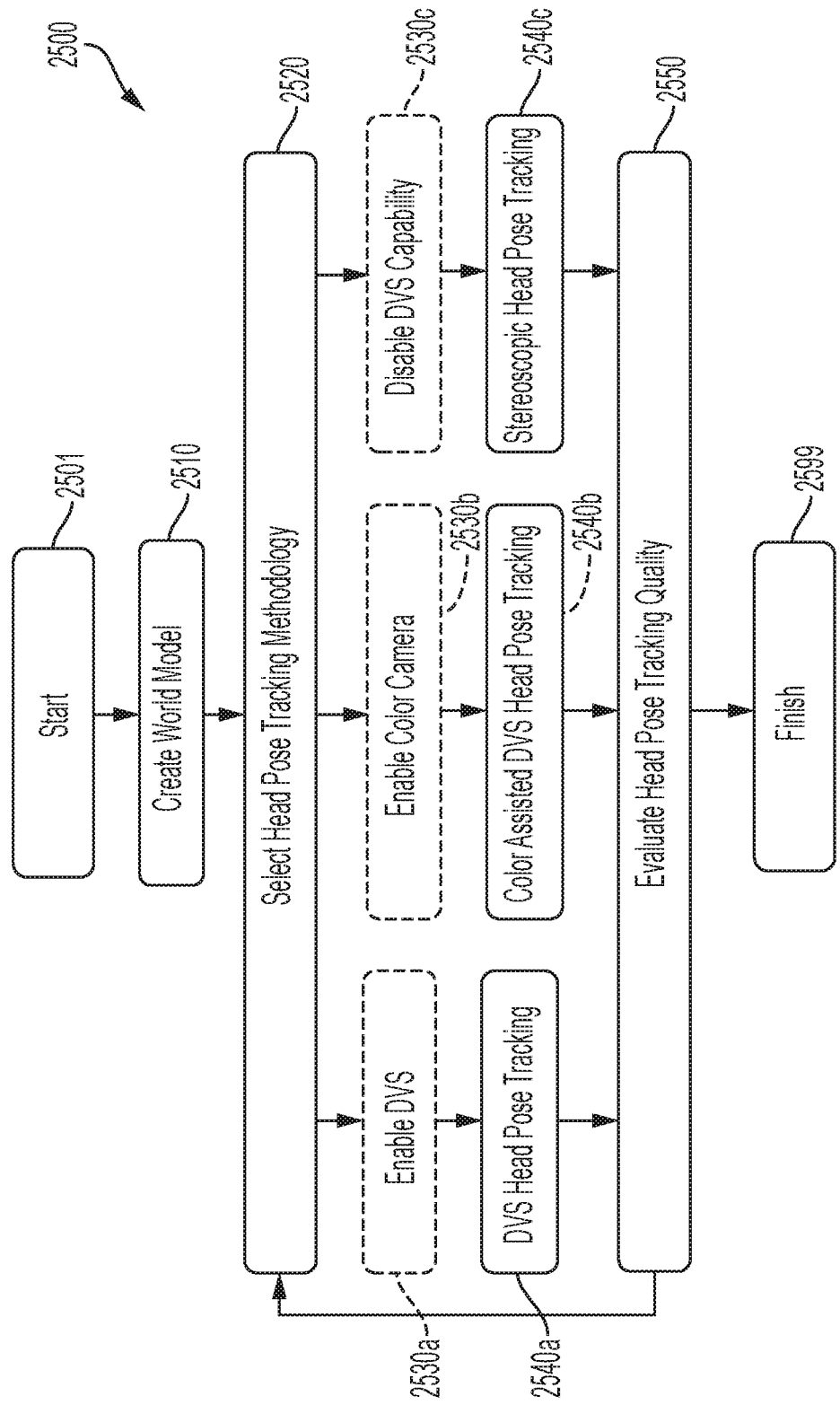
FIG. 25 is a flow chart of a method for head pose tracking, according to some embodiments.

FIG. 25 is a simplified flow chart of a method 2500 for head pose tracking, according to some embodiments. Method 2500 may include creating a world model, selecting a tracking methodology, tracking head pose using the selected methodology, and evaluating tracking quality. According to method 2500, the processor may preferentially track head pose using event-based acquisition of image patch data by DVS camera 2120. Should this preferred approach prove inadequate, the processor may track head pose using full frame images periodically output by DVS camera 2120. Should this secondary approach prove inadequate, the processor may track head pose stereoscopically using images output by DVS camera 2120 and by camera 2140.

In block 2510, the processor may create a passable world model. In some embodiments, the processor may be configured to create the passable world model as described above with regards to blocks 2405-2415 of method 2400. For example, the processor may be configured to acquire images from DVS camera 2120 and camera 2140. In some implementations, the processor may compensate for rolling shutter distortion in camera 2140. The processor may then use images from DVS camera 2120 and compensated images from camera 2140 to stereoscopically determine depths for features in the physical world. Using these depths, the processor may create a passable world model. After creating the passable world model, in some embodiments, the processor may be configured to disable or reduce the frame rate of camera 2140. By disabling or reducing the frame rate of camera 2140 after generating the passable world model, the XR system may reduce power consumption and computing requirements.

The processor, for example, may select from the world model features corresponding to stationary features, as described above in connection with FIG. 13. Image information indicating location of the stationary features relative to cameras mounted on a device worn on a user's head may be used to compute changes in position of the user's head relative to the world model. In accordance with some embodiments, the processor may select a tracking methodology to track the relative position of the stationary features that both satisfies a quality criterion and requires low computation relative to other tracking methods.

In block 2520, the processor may select a tracking methodology. The processor may preferentially select head pose tracking using detected events by DVS camera 2120. The processor may continue using this preferred approach while the head pose tracking satisfies a tracking quality criterion. For example, the difficulty of tracking head pose may depend on the location and orientation of the user's head and the content of the passable world model. Thus in some instances the processor may be, or become, incapable of tracking head pose using only asynchronously acquired image data output by DVS camera 2120.

If the processor determines that head pose tracking provided by the preferred approach does not satisfy the tracking quality criterion, the processor may select a secondary approach to tracking head pose. For example, the processor may select tracking head pose using indications of events output by DVS camera 2120 in combination with color information obtained with camera 2140. If the processor determines that this secondary approach does not satisfy the tracking quality criterion, the processor may select a tertiary approach to tracking head pose. For example, the processor may select tracking head pose stereoscopically using images output by DVS camera 2120 and by camera 2140. A processor may continue using a selected approach while the head pose tracking satisfies the tracking quality criterion. Alternatively, the processor may revert to a more preferred approach after a predetermined duration, time, or number of head pose updates; or in response to satisfaction of a criterion.

In each approach, image information may be acquired for the entire field of view for each camera being used. However, as described above in connection with FIG. 13, the image information may be collected for only patches of the images corresponding to portions containing the features being tracked.

FIG. 25 illustrates a first tracking methodology performed in blocks 2530a and 2540a. In block 2530a, the processor may enable the DVS functionality of DVS camera 2120, when this functionality is not already enabled. That functionality may be enabled for by setting a threshold change in intensity associated with movement of stationary features selected from the world model. In some embodiments, patches may also be set that incorporate those features. In block 2540a, the processor may track head pose using patch data acquired in response to detected events by DVS camera 2120. In some embodiments, the processor may be configured to calculate real or near-real time user head pose from this patch data.

A secondary tracking methodology is illustrated in blocks 2530b and 2540b. In this example, color image information may be used in combination with event information for tracking relative position of features. In block 2530b, the processor may enable camera 2140, when camera 2140 is not already enabled. Camera 2140 may be enabled to provide images at a rate that is the same as or slower than the rate at which head pose updates are provided. For example, the head pose updates may be provided through the use of asynchronous event data at an average rate between 30 to 60 Hz. Camera 2140 may be enabled to provide frames at a rate of less than 30 Hz, such as between 5 and 10 Hz.

Color information may be used to increase the accuracy with which stationary features are tracked. Color information, for example, may be used to compute updated locations of features being tracked, which may be more accurately determined than if grayscale events are used alone. As a result, the locations of patches being tracked may be updated or changed to encompass other features. Alternatively or additionally, information from camera 2140 may be used to identify alternative features to track. As yet a further alternative, color information may allow relative position of the camera to be computed based on analyzing surfaces, edges or larger features than are traced with DVS camera 2120.

A tertiary tracking methodology is illustrated in blocks 2530c and 2540c. In this example, tertiary tracking may be based on stereoscopic information. In block 2530b, the processor may disable the DVS functionality of DVS camera 2120 such that camera 2120 outputs intensity information rather than event information representing changes in intensity. In block 2540b, the processor may track head pose using images output periodically by DVS camera 2120, which may be full frame images or may be images within specific patches being tracked. In block 2540c, the processor may track head pose using stereoscopic image data obtained from images output by DVS camera 2120 and camera 2140. For example, the processor may be configured to determine depth information from the stereoscopic image data. In some embodiments, the processor may be configured to calculate real or near-real time user head pose from these images.

In block 2550, the processor may evaluate tracking quality according to a tracking criterion. The tracking criterion may depend on a stability of the estimated head pose, a noisiness of the estimated head pose, a consistency of the estimated head pose with the world model, or like factors. As a specific example, the computed head pose may be compared to other information that can indicate inaccuracies, such as output of inertial measurement units or a model of range of motion of the human head such that errors in head pose may be identified. The specific tracking criteria may vary based on the tacking methodology used. For example, in methodologies using event-based information, correspondence between locations of features, as indicated by event-based outputs compared to locations of corresponding features in full frame images may be used. Alternatively or additionally, the visual distinctiveness of a feature relative to its surrounding may be used as a tracking criterion. For example when the field of view is filled with one or more objects that make it difficult to identify movement of a specific feature, the tracking criteria for an event-based methodology may show poor tracking. A percentage of the field of view that is occluded is an example of a criteria that may be used. A threshold, such as greater than 40% for example, may be used as an indication to switch from using an image-based methodology for head pose tracking. As a further example, re-projection error may be used as a measure of head pose tracking quality. Such a criterion may be computed by matching features in images being acquired with a previously determined passable world model. The locations of the features in the images may be related to locations in the passable world model using a geometric transformation computation based on a head pose. Deviation, expressed for example as a mean square error, between the computed location and features in the passable world model may therefore indicate an error in the head pose, such that the deviation may be used as a tracking criteria.

In some embodiments, the processor may be configured to compute an error for the estimated head pose based on the world model. In computing this error, the processor may be configured to estimate how the world model (or multiple features in the world model) should appear based on the estimated head pose. In some embodiments, this estimate may be compared to the world model (or features in the world model) to generate an error for the estimated head pose. Such an error may be computed using linear algebraic techniques. For example, the mean square deviation between the computed and actual locations of each of the multiple features within the images may be used as a metric for the error. This metric in turn may be used as a measure of the head pose tracking quality.

After evaluating the head pose tracking quality, method 2500 may return to block 2520, where the processor may use the measured head pose tracking quality to select a tracking methodology. In scenarios in which the tracking quality is low, such as below a threshold, an alternative tracking methodology may be selected.

Method 2500 may repeat in this way until an end condition is detected. For example, method 2500 may repeat for a predetermined period of time, until a user input is received or until a particular type or particular magnitude of change in the portion of the physical world model in the field of view of the cameras of headset 2100 is detected. Method 2500 may then terminate in block 2599.

Method 2500 may be initiated again so that the new information of the world model, including that acquired with a higher resolution color camera, is captured at block 2510. Method 2500 may be terminated and re-initiated so as to repeat the processing at block 2510 using a color camera to create a portion of the world model at an average rate that is slower than the rate at which head pose tracking is performed in blocks 2520-2550. Processing using the color camera may be repeated at an average rate of once per second or slower, for example.

Other tracking methodologies may be used instead of or in addition to the tracking methodologies described as an example above. In some embodiments, the processor may be configured to calculate real or near-real time user head pose from image information, which may include grayscale images and/or light-field information, such as angle-of-arrival information. Alternatively or additionally, in scenarios in which image-based head pose tracking methodologies have unacceptable quality metrics, a "dead reckoning" methodology may be selected in which motion of a user's head, as measured by inertial measurement units, may be used to compute head pose.

Object Tracking

As described above, a processor of an XR system may track objects in the physical world to support rendering of virtual objects realistically with respect to physical objects. Tracking, for example, was described in connection with a movable object, such as a hand of a user of the XR system.

For example, the XR system may track objects in central view field 2150, peripheral view field 2160*a*, and/or peripheral view field 2160*b*. Quickly updating the position of a movable object enables realistically rendering virtual objects, as the rendering can reflect occlusion of the physical object by the virtual object or vice versa, or interactions between the virtual object in the physical object. In some embodiments, for example, updates on the location of a physical object may be computed at an average rate of at least 10 times per second, and, in some embodiments, at least 20 times per second, such as approximately 30 times per second. When the tracked object is a hand of the user, the tracking may enable gesture control by the user. For example, certain gestures may correspond to commands to the XR system.

In some embodiments, the XR system may be configured to track objects that have features that provide high contrast when imaged with an image sensor sensitive to IR light. In some embodiments, an object with high contrast features may be created by adding markers to the object. For example, a physical object may be equipped with one or more markers that appear as high contrast regions when imaged with IR light. The markers may be passive markers that are highly reflective or highly absorptive of IR light. In some embodiments, at least 25% of light over a frequency range of interest may be absorbed or reflected. Alternatively or additionally, the markers may be active markers that emit IR light, such as IR LEDs. By tracking such features, for example with a DVS camera, information accurately representing the position of the physical object may be quickly determined.

As with head pose tracking, tracked object positions are updated frequently, so performing object tracking using only DVS camera 2120 may provide power savings, reduce computational requirements, or provide other benefits. The XR system may therefore be configured to disable or reduce the frame rate of color camera 2140 as necessary to balance object tracking accuracy against power consumption and computation requirements. Furthermore, the XR system may be configured to asynchronously track objects in response to events generated by DVS camera 2120.

Figure 26:
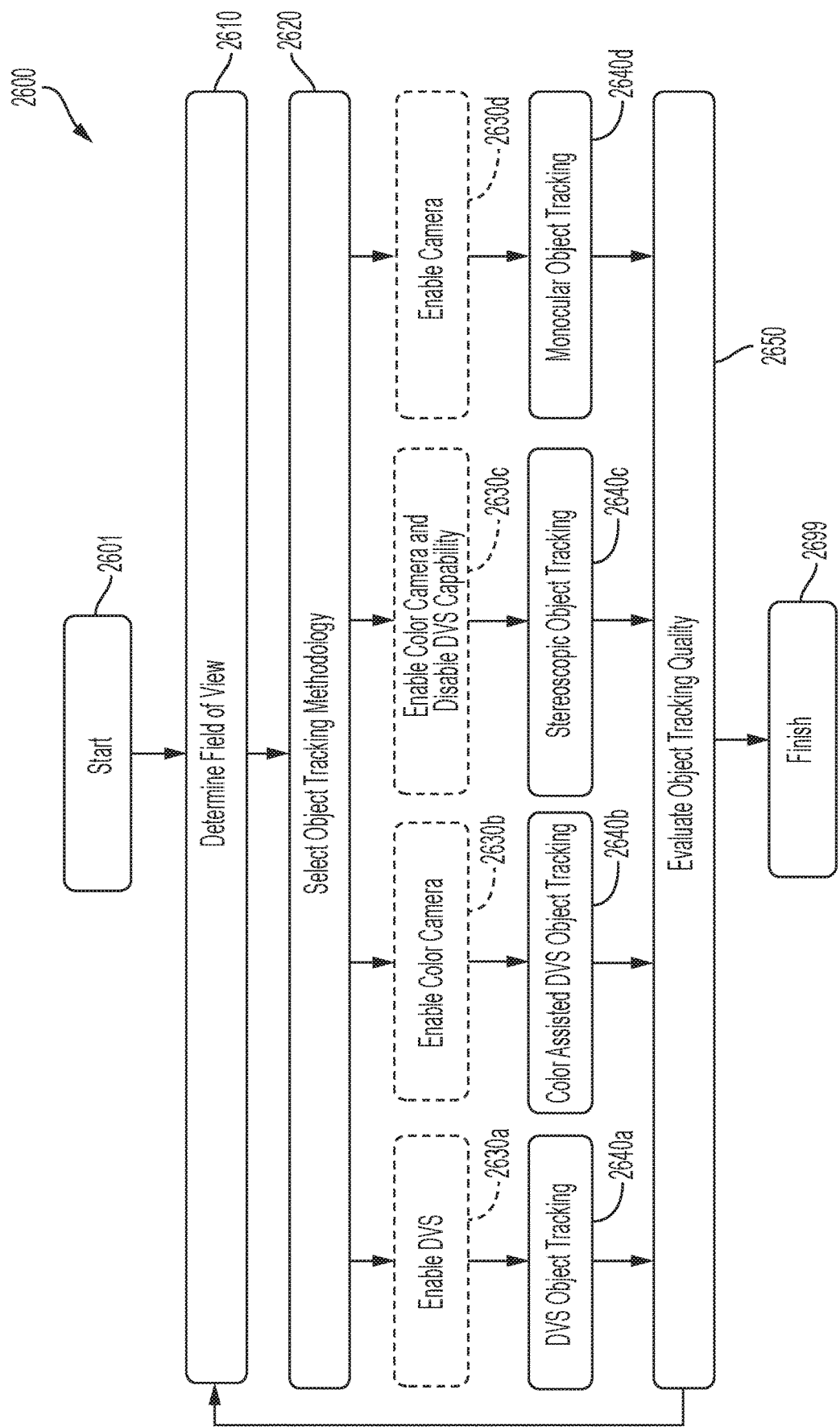
FIG. 26 is a flow chart of a method for object tracking, according to some embodiments.

FIG. 26 is a simplified flow chart of a method 2600 for object tracking, according to some embodiments. According to method 2600, the processor can perform object tracking differently, depending on the view field containing the object and on a value of a tracking quality criterion. Furthermore, the processor may or may not use light-field information, depending on whether the object tracked satisfies a depth criterion. Other criteria may alternatively or additionally be applied by a processor to dynamically select an object tracking methodology, such as available battery power or operations of the XR system being performed and a need for those operations to track object location or track object location with high precision.

Method 2600 can start in block 2601. In some embodiments, camera 2140 may be disabled or have a reduced frame rate. The processor may have disabled camera 2140 or reduced the frame rate of camera 2140 to reduce power consumption and improve battery life. In various embodiments, the processor may be tracking an object in the physical world (e.g., a hand of the user). The processor may be configured to predict the next location of the object, or the trajectory of the object, based on one or more prior locations of the object.

After starting in block 2601, method 2600 can proceed to block 2610. In block 2610, the processor can determine a field of view encompassing the object (e.g., view field 2121, view field 2141, peripheral view field 2160*a*, peripheral view field 2160*b*, or central view field 2150). In some embodiments, the processor can base this determination on a present location of the object (e.g., whether the object is currently in central view field 2150). In various embodiments, the processor can base this determination on an estimate of the location of the object. For example, the processor can determine that the object is leaving central view field 2150 can entering peripheral view field 2160*a* or peripheral view field 2160*b*.

In block 2620, the processor can select an object tracking methodology. According to method 2600, when the object is within view field 2121 (e.g., within peripheral view field 2160*a* or central view field 2150) the processor may preferentially select object tracking using DVS camera 2120. Furthermore, the processor may preferentially select event-based asynchronous object tracking.

In some embodiments, patch tracking as described above may be used, with one or more patches established to encompass features of the object being tracked, as described above. Patch tracking may be used for some or all of the object tracking methodologies and for some or all of the cameras. The patches may be selected to encompass the estimated location of the tracked objects in the field of view.

As described above in connection with FIG. 25 and head pose tracking, a processor may dynamically select an appropriate tracking methodology for object tracking. A methodology may be selected to provide suitable tracking quality that requires low processing overhead in comparison to other methodologies. Accordingly, if event-based asynchronous object tracking does not satisfy the object tracking criterion, the processor may use another methodology. In the example of FIG. 26, four methodologies are illustrated, shown in blocks 2640*a*, 2640*b*, 2640*c* and 2640*d*. The methodologies are ordered and method 2600 will select the first methodology in the order that meets tracking quality criteria. The methodologies may be ordered, for example, to reflect a tradeoff in accuracy, latency and power consumption. The methodology that has the lowest latency, for example, may be ordered first, with methodologies with more latency or more power consumption lower in the ordering.

In block 2630*a*, the processor may enable the DVS functionality of DVS camera 2120, when this functionality is not already enabled. In block 2640*a*, the processor may track the object using events detected by DVS camera 2120. in some embodiments, DVS camera 2120 may be configured to restrict image acquisition to a patch in the image sensor encompassing the location of the object in view field 2121. Changes in the image data within the patch (e.g., caused by movement of the object) may trigger an event. In response to the event, DVS camera 2120 may acquire image data for the patch and update the position and/or orientation of the object based on the acquired patch image data.

In some embodiments, the events may indicate changes in intensity. As described above, for example in conjunction with FIGS. 12 and 13, changes in intensity may be tracked to track motion of an object. In some embodiments, DVS camera 2120 may be or may be configurable to operate as a plenoptic camera. When the object satisfies a depth criterion, the processor may be configured to additionally or alternatively acquire angle-of-arrival information. The depth criterion may be the same or similar to the depth criterion described above with regards to block 2420 of method 2400. For example, the depth criterion may concern a maximum error rate or a maximum distance beyond which the processor cannot distinguish differing distances between objects.

Depth information may therefore be used to determine a location of the object and/or changes in location of the object. Use of such plenoptic image information may be part of the methodologies describe herein or may be a further methodology that may be used in conjunction with other methodologies.

A second methodology is shown in blocks 2630*b* and 2640*b*. In block 2630*b*, the processor may enable camera 2140, when camera 2140 is not already enabled. As described above in connection with block 2530*b*, the color camera may be operated to acquire color images at a relatively low average rate. Color information may be used in block 2640*b* predominately using events output by DVS camera 2120, with information from the color images to better identify features to track or their locations.

A tertiary methodology is shown in blocks 2630*c* and 2640*c*. In block 2630*c*, the processor may enable camera 2140, when camera 2140 is not already enabled. Camera 2140 is described as being capable of outputting color image information. For the tertiary methodology, color image information may be used, but in some embodiments or in some scenarios, only intensity information may be acquired from camera 2140 or only intensity information may be processed. The processor may also increase a frame rate of camera 2140 to a rate sufficient for object tracking (e.g., a frame rate between 40 Hz and 120 Hz). In some embodiments, this rate may match a sampling frequency of DVS camera 2120. The processor may also disable the DVS functionality of DVS camera 2120, when this functionality is not already disabled. In this configuration, outputs of DVS camera 2120 may represent intensity information. In block 2640*c*, the processor may track the object using stereoscopic image data obtained from images output by DVS camera 2120 and camera 2140.

A fourth methodology is shown in blocks 2630*d* and 2640*d*. In block 2630*d*, the processor may enable a camera, when not already enabled. The other camera may be disabled. The enabled camera may be DVS camera 2120 or camera 2140. If DVS camera 2120 is used, it may be configured to output image intensity information. When camera 2140 is enabled, it may be enabled to output color information or just grayscale intensity information. The processor may also increase a frame rate of the enabled camera to a rate sufficient for object tracking (e.g., a frame rate between 40 Hz and 120 Hz). In block 2640*d*, the processor may track the object using images output by the enabled camera.

In block 2650, the processor may evaluate the tracking quality. One or more of the metrics described above in connection with block 2550 may be used in block 2650. However, in block 2650 those metrics would be applied to tracking of features on an object rather than tracking of stationary features in the environment.

After evaluating the object tracking quality, method 2600 may return to blocks 2610 and 2620, in which the processor may again determine the field of view encompassing the object (block 2610) and then select the object tracking methodology using the determined field of view and the measured object tracking quality (block 2620). In the embodiment illustrated, the first methodology in the order providing quality exceeding a threshold associated with suitable performance is selected.

Method 2600 may repeat in this way until an end condition is detected. For example, method 2600 may repeat for a predetermined period of time, until a user input is received, or until the tracked object leaves the field of view of the XR device. Method 2600 may then terminate in block 2699.

Figure 27:
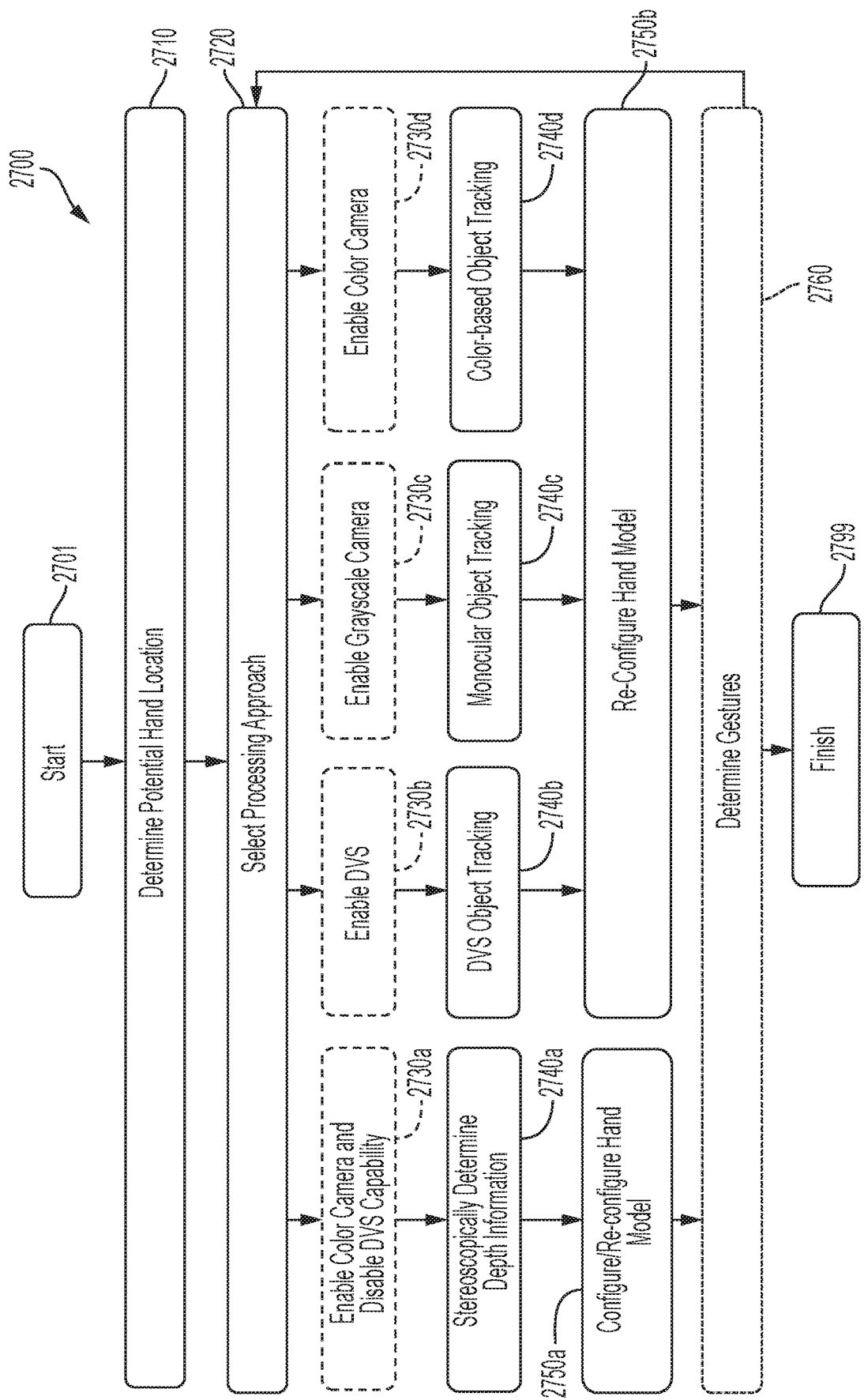
FIG. 27 is a flow chart of a method for hand tracking, according to some embodiments.

Method 2600 may be used for tracking any object, including a user's hand. However, in some embodiments, different or additional acts may be performed in tracking a user's hand. FIG. 27 is a simplified flow chart of a method of hand tracking 2700, according to some embodiments. The object tracked in method 2700 may be a hand of the user. In various embodiments, the XR system can perform hand tracking using image data or images obtained from DVS camera 2120 and/or images obtained from camera 2140. These cameras may be configurable to operate in one of multiple modes. For example, either or both may be configured to acquire image patch data. Alternatively or additionally, DVS camera 2140 may be configured to output events, as described above with regards to FIGS. 4-16.

Alternatively or additionally, camera 2140 may be configured to output color information, or just grayscale intensity information. Further, camera 2140 alternatively or additionally may be configured to output plenoptic information as described above in connection with FIGS. 16-20. DVS camera 2120 may similarly be configured to output plenoptic information in some embodiments. Any combination of these cameras and capabilities may be selected to generate information for hand tracking.

As with object tracking described in connection with FIG. 26, the processor may be configured to select a hand tracking approach based on a determined location of the hand and an assessment of the quality of the hand tracking provided by the selected approach. For example, stereoscopic depth information may be obtained when the hand is within central view field 2150. As another example, plenoptic information may have a sufficient resolution for hand tracking only within a range of angles relative to the center of the field of view of plenoptic camera (e.g. +/−20 degrees). Thus, techniques that rely on stereoscopic image information or plenoptic image information may be used only when the hand is detected to be within the appropriate field of view.

If necessary, the XR system can enable or increase a frame rate of camera 2140 to enable tracking in view field 2160*b*. In this manner, the wearable display system may be configured to use the reduced number of cameras available in this configuration to provide adequate hand tracking, allowing for reduced power consumption and increased battery life.

Method 2700 may be performed under control of a processor of the XR system. The method may be initiated upon detection of an object to be tracked, such as a hand, as a result of analysis of an image acquired with any one of the cameras on headset 2100. This analysis may entail recognizing an object as a hand, based on regions of an image having photometric characteristics that are characteristics of a hand. Alternatively or additionally, depth information acquired based on stereoscopic image analysis may be used to detect a hand. As a specific example, depth information may indicate that an object having a shape matching a 3D model of a hand is present. Detecting the presence of a hand in this way may also entail setting parameters of the model of the hand to match the orientation of hand. In some embodiments, such a model may also be used for fast hand tracking, by using photometric information from one or more grayscale cameras to determine how the hand has moved from the original position.

Other trigger conditions may initiate method 2700, such as the XR system performing an operation that involves tracking an object, such as rendering a virtual button that the user is likely to attempt to press with their hand such that a user's hand is expected to enter the field of view of one or more cameras. The method 2700 may be repeated at a relatively high rate, such as between 30 and 100 times per second, such as between 40 and 60 times per second. As a result, updated position information for the object being tracked may be made available with low latency for processing to render virtual objects interacting with physical objects.

After starting in block 2701, method 2700 may proceed to block 2710. In block 2710, the processor may determine a potential hand location. In some embodiments, the potential hand location may be the location of a detected object in an acquired image. In embodiments in which a hand is detected based on matching depth information to a 3D model of a hand, the same information may be used as the initial position of the hand at block 2710.

In some embodiments, the image information used to configure a hand model may be dynamically selected. After block 2710, method 2700 may proceed to block 2720. In block 2720, the processor may select a processing approach for configuring a hand model. This selection can depend on the potential location of the hand as well as whether a hand model has already been configured. In some embodiments, this selection can further depend on a desired degree of accuracy and/or quality of the hand model and/or processing computer power available given other tasks being executed by the processor(s). As an example, when a hand model is initially configured upon detection of a hand, more extensive, though more accurate, image information may be used, at the cost of additional processing. For example, stereoscopic information may be used for initially configuring the model. Thereafter, the model itself provides information about the hand position as there are limits to the manner in which a human hand can move. Accordingly, as the XR system operates, processing to re-configure the hand model to account for motion of the hand optionally may be performed with image information that is less comprehensive but may be processed more quickly or when the more comprehensive image information is not available. For example, when the object is in the central view field 2150 and robust hand tracking or fine hand detail is required, or should other approaches prove inadequate, the processor may perform hand tracking stereoscopically using images output by DVS camera 2120 and by camera 2140. Alternatively, when the object is not in the central view field 2150, or robust hand tracking or fine hand detail is not required, the processor may be configured to preferentially configure the hand model using other image information, such as a monocular color image or grayscale image. The processor may be configured to configure the hand model using images acquired from DVS camera 2120 when the object is within peripheral field 2160*a*. The processor may be configured to configure the hand model using images acquired from camera 2140 when the object is within peripheral field 2160*b*. In some in some embodiments, the processor may be configured to use the lowest power drain method that still meets a quality criteria, for example.

FIG. 27 illustrates four approaches for gathering information to configure a hand model. Those four approaches are shown as four parallel paths through the flowchart, including paths through blocks 2740*a*, 2740*b*, 2740*c*, and 2740*d*.

In the first path, at block 2730*a*, when the potential hand is in central view field 2150 and hand tracking robustness or fine hand detail is required, the processor may enable camera 2140, when this camera is not already enabled. This path may also be selected at block 2720 for the initial configuration of the hand model. At block 2730*a*, the processor may also increase a frame rate of camera 2140 to a rate sufficient for hand tracking (e.g., a frame rate between 40 Hz and 120

Hz). In some embodiments, this rate may match a sampling frequency of DVS camera 2120. The processor may also disable the DVS functionality of DVS camera 2120, when this functionality is not already disabled. As a result, both cameras may provide image information representing intensity. This image information may be grayscale or, for cameras that support color imaging, may alternatively include color information.

In block 2740a, the processor may obtain depth information for the potential hand. The depth information may be obtained based on stereoscopic image analyses from which distances between the cameras collecting image information and segments or features of the potential hand may be computed. The processor, for example, may select features in the central view field and determine depth information for the selected features.

In some embodiments, the selected features may represent different segments of the human hand as defined by bones and joints. Feature selection may be based on matching image information to a model of the human hand. Such matching, for example, may be done heuristically. The human hand, for example, may be represented by a finite number of segments, such as 16, and points in an image of the hand may be mapped to one of those segments such that features on each segment may be selected. Alternatively or additionally, such matching may use a deep neural net or classification/decision forest to apply a series of yes/no decisions in the analysis to identify the different parts of the hand and select features representing different parts of the hand. The matching, for example, may identify whether a particular point in an image belongs to the palm portion, back of hand, non-thumb finger, thumb, fingertip, and/or finger joint. Any suitable classifier can be used for this analysis stage. For example, a deep learning module or a neural network mechanism can be used instead of or in addition to the classification forest. In addition, a regression forest (e.g., using a Hough transformation, etc.) can be used in addition to the classification forest.

Regardless of the specific number of features selected and the techniques used to select those features, after block 2740a, method 2700 may proceed to block 2750a. In block 2750a, the processor may configure a hand model based on the depth information. In some embodiments, a hand model may reflect structural information about a human hand, representing, for example, each of the bones in a hand as a segment in a hand and each joint as defining a range of likely angles between adjacent segments. By assigning locations to each of the segments in the hand model based on depth information of selected features, information may be provided about the position of the hand for subsequent processing by the XR system.

Regardless of how the 3D hand model is updated, the updated model may be refined based on photometric image information. The model, for example, may be used to generate a projection of the hand, representing how an image of the hand is expected to appear. That expected image may be compared to photometric image information acquired with an image sensor. The 3D model may be adjusted to reduce the error between the expected and acquired photometric information. The adjusted 3D model then provides an indication of the position of the hand. As this updating process is repeated, the 3D model provides an indication of the hand position as the hand moves.

In some embodiments, processing at blocks 2740a and 2750a may be performed iteratively, with the selection of features for which depth information is collected being refined based on the configuration of the hand model. The hand model may include shape constraints and motion constraints, which the processor may be configured to use to refine selection of features that represent components of the hand. For example, when a feature selected to represent a segment of the hand indicates position or motion of that section that violates constraints of the hand model, a different feature to represent that segment may be selected.

In block 2750a, the processor may select features in a patch or image output by DVS camera 2120 or camera 2140 that represent structures of a human hand. Such features may be identified heuristically or using AI techniques. For example, features may be selected heuristically by representing the human hand by a finite number of segments and mapping points in the image to respective ones of the those segments, such that features on each segment may be selected. Alternatively or additionally, such matching may use a deep neural net or classification/decision forest to apply a series of yes/no decisions in the analysis to identify the different parts of the hand and select features representing different parts of the hand. Any suitable classifier can be used for this analysis stage. For example, a deep learning module or a neural network mechanism can be used instead of or in addition to the classification forest. In addition, a regression forest (e.g., using a Hough transformation, etc.) can be used in addition to the classification forest. The processor may attempt to match the selected features, and motion of those selected features from image to image, to a hand model without the benefit of depth information. This matching may result in less robust information than is generated in block 2750a or may be less accurate. Nonetheless, the information identified based on monocular information may provide useful information for operation of an XR system.

In block 2750a, the processor can also evaluate the hand model. This evaluation can depend on a completeness of the matching between the selected features and the hand model, a stability of the matches between the selected features and the hand model, a noisiness of the estimated hand locations, a consistency between the locations and orientations of the detected features and the constraints imposed by the hand model, or like factors. In some embodiments, the processor can determine where the selected features should appear based on the hand model. As a specific example, the processor may parametrized a generic hand model and then check photometric consistency of edges of the model and compare those edges to edges as detected in images acquired of the hand. In some embodiments, this estimate may be compared to the estimated locations and orientations of the selected features to generate an error for the hand model. Such an error may be computed using linear algebraic techniques. For example, the mean square deviation between the computed and actual locations of each of the multiple selected features within the images may be used as a metric for the error. This metric in turn may be used as a measure of the hand model quality.

After matching image portions to the portions of the hand model in block 2750a, the model may be used in one or more operations performed by the XR system. As one example, the model may be used directly as an indication of the location of an object in the physical world for rending virtual objects. In such an embodiment, processing at block 2760 optionally may be omitted. Alternatively or additionally, the model may be used to determine whether the user has made a gesture with their hand, such as a gesture that indicates a command or interaction with a virtual object. Accordingly, the processor may use the determined hand model information to recognize hand gestures in block 2760. This gesture recognition may be performed using the hand tracking methods described in U.S. Patent Publication No. 2016/0026253, which is hereby incorporated by reference for all it teaches in connection with hand tracking and the use of information about a hand acquired from image information in an XR system.

In some embodiments, gestures may be recognized without stereoscopic depth information. The gestures, for example, may be recognized based on a hand model configured based on monocular image information. Accordingly, in some embodiments, gesture recognition may be performed even for a hand in the peripheral view fields 2160a and 2160b, where stereoscopic depth information is not available. Alternatively or additionally, where hand tracking is performed for gesture recognition, rather than other functions that may require a more precise determination of hand location (e.g. rendering a virtual object to appear realistically interacting with the user's hand), monocular image information may be used. In such embodiments, different cameras may be enabled and/or used to collect image information at blocks 2730a and 2740b.

In some embodiments, successive iterations of the hand tracking process may be performed as the system operates. Gestures, for example may be identified by successive determination of hand position. Alternatively or additionally, the successive iterations may be performed so that the configured model of the user's hand matches the actual hand position as that hand position changes. The same or different imaging techniques may be used at each iteration.

In some embodiments, the source of image information may be selected at block 2720 for an iteration based on one or more factors, including the use to be made of the hand model and/or the quality of the tracking performed using a particular tracking methodology. Quality of tracking, for example, may be determined using approaches as described above in connection with block 2650 (FIG. 26) and a selection of a technique may, as also described above, be made to require the smallest amount of processing, power consumption to other computing resource that achieves a desired quality metric.

Accordingly, FIG. 27 shows that once an iteration has been made, method 2700 loops back to block 2720 where a processing approach may be selected for a further iteration. These alternative approaches may use image information instead of or in addition to stereoscopic depth information. At each iteration, the 3D model of the hand may be updated to reflect motion of the hand.

An approach that requires low processing is to track hand position based on event information. Such an approach may be selected at block 2720 in scenarios, for example, where a hand model of suitable accuracy has already been computed, such as through the use of stereoscopic image information in a prior iteration. Such an approach may be implemented by a branch to block 2730b. In block 2730b the processor may enable the DVS functionality of DVS camera 2120, when this functionality is not already enabled. In block 2740b, the processor may acquire image data in response to events detected by DVS camera 2120. In some embodiments, DVS camera 2120 may be configured to acquire information for a patch in the image sensor encompassing the potential hand location in view field 2121. Changes in the image data within the patch (e.g., caused by movement of the potential hand) can trigger an event. In response to the event, DVS camera 2120 may acquire image data. This information on motion of the user's hand may then be used to update the hand model at block 2750b. The updating may be performed using techniques as described above for block 2750a. Such updating may take into account other information, including the previously computed position of the hand as indicated by the model and constraints on motion of a human hand.

The hand model, once updated, may be used by the system in the same ways as the initial hand model computed at block 2750a, including to determine interactions between virtual objects and the user's hand and/or to recognize gestures at block 2760.

In some scenarios, event-based image information may be inadequate even for updating the hand model. Such a scenario, for example, may arise if the user's hand fills the field of view of DVS camera 2120. In such a scenario, rather than event information, the hand model may be updated based on color information, such as using color information from of camera 2140. Such an approach may be implemented by a branch to block 2730d when processing at block 2720 detects that the image within the field of view of DVS camera 2120 has intensity variation below a predetermined threshold or other characteristics that indicate lack of sufficiently distinct features for event-based tracking. At block 2730d, the processor may disable the DVS functionality of DVS camera 2120, when this functionality is not already disabled. Camera 2140 may be enabled to acquire color information.

In block 2740d, the processor may use the color image information to identify motion of the user's hand. As above, this information on motion of the user's hand may then be used to update the hand model at block 2750b.

In some scenarios, color information may be unavailable or unnecessary for tracking hand motion. For example, when the hand is in peripheral view field 2160a, color information may be unavailable, but intensity image information obtained with DVS camera 2120 operating in a mode in which the DVS functionality is disabled may be available and may be suitable. Alternatively, in some scenarios in which event-based tracking produces a quality metric below a threshold, tracking with grayscale image information may produce a quality metric above a threshold of suitability. Such an approach may be implemented by a branch to block 2730c. At block 2730c, when camera 2140 is not already enabled, the processor may enable camera 2140. The processor may also increase a frame rate of camera 2140 to a rate sufficient for hand tracking (e.g., a frame rate between 40 Hz and 120 Hz).

In block 2740d, the processor can acquire image data using camera 2140. In other scenarios, DVS camera 2120 may be configured to collect intensity information and may be used, instead of camera 2140 to collect monocular image information. Regardless of which camera is used, full frame information may be used or patch tacking, as described above, may be used to reduce the amount of image information processed.

FIG. 27 illustrates a method in which processing at block 2720 selects between three alternative approaches for tracking a hand. The approaches may be ordered in accordance with degree of meeting one or more criteria, such as low processing or low power consumption. Processing at block 2720 may select a processing approach by selecting the first approach in the order that is operable in the detected scenario (e.g. hand location) and produces a quality metric that meets a threshold. Different or additional processing techniques may be included. For example, for an XR system with a plenoptic camera that provides image information that indicates depth, an approach may be based on using that depth information alone or in combination with any other data source. As another variation, features of a hand may be tracked using color assisted DVS racking, as described above in connection with block 2640*b* (FIG. 26).

Regardless of the approach selected or the set of approaches from which such a selection is made, the hand model may be updated and used for XR functions, such as to render a virtual object interacting with the user's hand or to detect a gesture at block 2760. After block 2760, method 2700 may finish in block 2799. However, it should be appreciated that hand tracking may occur continuously during operation of an XR system or may occur during intervals in which an hand is in a field of view of one or more cameras. Accordingly, once one iteration of method 2700 is completed, another iteration may be performed, and this process may be performed over the interval that hand tracking is being performed. In some embodiments, the information used at one iteration may be used in a subsequent iteration. In various embodiments, for example, the processor may be configured to estimate an updated location of a hand of the user based on a previously detected hand location. For example, the processor may estimate where the user's hand will be next based on the previous location and velocity of the user's hand. Such information may be used to narrow the amount of image information that is processed to detect the location of the object, as described above in connection with patch tracking techniques.

Having thus described several aspects of some embodiments, it is to be appreciated that various alterations, modifications, and improvements will readily occur to those skilled in the art.

As one example, embodiments are described in connection with an augmented (AR) environment. It should be appreciated that some or all of the techniques described herein may be applied in an MR environment or more generally in other XR environments.

Also, embodiments of an image array are described in which one patch is applied to an image array to control the selective outputting of image information about one movable object. It should be appreciated that there may be more than one movable object in a physical embodiment. Further, in some embodiments, it may be desirable to selectively obtain frequent updates of image information in regions other than where a movable object is located. For example, a patch may be set to selectively obtain image information about a region of the physical world where a virtual object is to be rendered. Accordingly, some image sensors may be able to selectively provide information for two or more patches, with or without circuitry to track the trajectory of those patches.

As yet a further example, an image array is described as outputting information relating to the magnitude of incident light. Magnitude may be a representation of power across a spectrum of light frequencies. That spectrum may be relatively broad capturing energy at frequencies corresponding to any color of visible light, such as in a black and white camera. Alternatively, the spectrum may be narrow, corresponding to a single color of visible light. Filters to limit light incident on an image array to light of a particular color may be used for this purpose. Where pixels are limited to receiving light of specific colors, different pixels may be limited to different colors. In such embodiments, outputs of pixels sensitive to the same color may be processed together.

A process for setting a patch in an image array and then updating the patch for an object of interest was described. This process may be performed, for example, for each movable object as it enters a field of view of an image sensor. The patches may be cleared when the object of interest leaves the field of view, such that the patches are no longer tracked or such that no image information is output for the patch. It should be appreciated that from time to time a patch may be updated, such as by determining the location of the object associated with the patch and setting the position of the patch to correspond to that location. A similar adjustment can be made to a computed trajectory of a patch. The motion vector for an object and/or motion vector of the image sensor may be computed from other sensor information and used to reset the values programmed into the image sensor, or other component, for patch tracking.

For example, locations, motions and other characteristics of objects may be determined by analyzing the output of a wide angle video camera or a pair of video camera with stereoscopic information. Data from these other sensors may be used to update the world model. In connection with an update, the patch position and/or trajectory information may be updated. Such updates may occur at a lower rate than the position of the patch is updated by a patch tracking engine. The patch tracking engine, for example, may compute a new patch position at a rate between about 1 and 30 times per second. Updates to the patch position based on other information may occur at a slower rate, such as once per second up to about once per 30 second interval.

As yet a further example of a variation, FIG. 2 shows a system with a head mounted display separate from a remote processing module. An image sensor as described herein may lead to a compact design of the system. Such a sensor generates less data, which in turn leads to lower processing requirements and less power consumption. Less need for processing and power, enables size reduction such as by reducing the size of batteries. Accordingly, in some embodiments, the entire augmented reality system may be integrated in a head mounted display without a remote processing module. The head mounted display may be configured as a pair of goggles or, as shown in FIG. 2, may resemble in size and shape a pair of glasses.

Further, embodiments are described in which an image sensor responds to visible light. It should be appreciated that the techniques described herein are not limited to operation with visible light. They may alternatively or additionally be response to IR light or "light" in other parts of the spectrum, such as UV. Moreover, the image sensor as described herein is response to naturally occurring light. Alternatively or additionally, the sensor may be used in a system with a source of illumination. In some embodiments, the sensitivity of the image sensor may be tuned to the portion of the spectrum in which the source of illumination emits light.

As another example, it is described that a selected region of an image array for which changes should be output from an image sensor is specified by specifying a "patch" on which image analysis is to be performed. It should be appreciated, however, that the patch and the selected region may be of different sizes. The selected region, for example, may be larger than the patch to account for motion of objects in an image being tracked that deviates from the predicted trajectory and/or to enable processing around the edges of the patch.

Moreover, multiple processes are described, such as passable world model generation, object tracking, head pose tracking, and hand tracking. These, and in some embodiments other processes, may be executed by the same or different processors. The processors may be operated so as to enable concurrent operation of these processes. Each process, however, may be performed at different rates. Where different processes call for data from image sensors, or other sensors, at different rates, the acquisition of sensor data may be managed, such as by another process, to provide each process with data at a rate appropriate for its operation.

Such alterations, modifications, and improvements are intended to be part of this disclosure, and are intended to be within the spirit and scope of the disclosure. For example, in some embodiments, the color filter 102 of a pixel of an image sensor may not be a separate component, but is instead incorporated into a one of the other components of the pixel subarray 100. For example, in embodiments that include a single pixel with both an angle-of arrival-to-position intensity converter and a color filter, the angle-of-arrival to-intensity converter may be a transmissive optical component that is formed from a material that filters particular wavelengths.

According to some embodiments, a wearable display system may be provided comprising: a frame; a first camera mechanically coupled to the frame, wherein the first camera is configurable to output image data satisfying an intensity change criterion in a first field of view for the first camera; and a processor operatively coupled to the first camera, wherein the processor is configured to determine whether an object is within the first field of view and track motion of the object using image data received from the first camera for the one or more portions of the first field of view.

In some embodiments, the object may be a hand, and tracking the motion of the object may comprise updating corresponding portions of a hand model that includes shape constraints and/or motion constraints based on image data from the first camera satisfying an intensity change criterion.

In some embodiments, the processor may be further configured to provide instructions to the first camera to restrict image data acquisition to one or more patches of the first field of view corresponding to the object.

In some embodiments, a second camera may be mechanically coupled to the frame so as to provide a second field of view at least partially overlapping with the first field of view, and the processor may be further configured to: determine whether the object satisfies an occlusion criterion for the first field of view; enable the second camera or increase a frame rate of the second camera; determine depth information for the object using the second camera; and track the object using the determined depth information.

In some embodiments the depth information may be stereoscopically determined using images output by the first camera and the second camera.

In some embodiments, the depth information may be determined using light field information output by the second camera.

In some embodiments, the object may be a hand, and tracking the motion of the hand may comprise using the determined depth information by: selecting points in the first field of view; associating the selected points with depth information; generating a depth map using the selected points; and matching portions of the depth map to corresponding portions of a hand model that includes both shape constraints and motion constraints.

In some embodiments, tracking motion of the object may comprise updating a location of the object in a world model, and intervals between the updates may be between 1 ms and 15 ms in duration.

In some embodiments, a second camera may be mechanically coupled to the frame so as to provide a second field of view at least partially overlapping with the first field of view; and the processor may be operatively coupled to the second camera and further configured to: create a world model using images output by the first camera and the second camera; and update the world model using light field information output by the second camera.

In some embodiments the processor may be mechanically coupled to the frame.

In some embodiments, a display device mechanically coupled to the frame may comprise the processor.

In some embodiments, a local data processing module may comprise the processor, the local data processing module operatively coupled to a display device through a communication link, the display device mechanically coupled to the frame.

According to some embodiments, a wearable display system may be provided, the wearable display system comprising: a frame; two cameras mechanically coupled to the frame, wherein the two cameras comprise one first camera configurable to output image data satisfying an intensity change criterion and one second camera, wherein the first camera and the second camera are positioned so as to provide overlapping views of a central view field; and a processor operatively coupled to the first camera and the second camera.

In some embodiments, the processor may be further configured to determine an object is within the central view field; track the object using image data output by the first camera; determine whether the object tracking satisfies a quality criterion; and enable the second camera or increase a frame rate of the second camera and track the object using the first camera and the second camera when the object tracking does not satisfy the quality criterion.

In some embodiments, the first camera may be configurable to selectively output an image frame or the image data satisfying an intensity change criterion; and the processor may be further configured to provide instructions to the first camera to restrict image data acquisition to one or more portions of the central field of view corresponding to the object; and the image data output by the first camera may be for the one or more portions of the central field of view.

In some embodiments, the first camera may be configurable to selectively output an image frame or the image data satisfying an intensity change criterion; the second camera may comprise a plenoptic camera; the processor may be further configured to: determine whether the object satisfies a depth criterion; and tracking the object using the first camera and the second camera may comprise tracking the object using light field information obtained from the plenoptic camera when the depth criterion is satisfied; and tracking the object using depth information stereographically determined from images output by the first camera and the second camera when the depth criterion is not satisfied.

In some embodiments, the plenoptic camera may include a transmission diffraction mask.

In some embodiments, the plenoptic camera may have a horizontal field of view between 90 and 140 degrees and the central view field extends between 40 and 80 degrees.

In some embodiments, the first camera may provide greyscale images and the second camera may provide color images.

In some embodiments, the first camera may be configurable to selectively output an image frame or the image data satisfying an intensity change criterion; the first camera comprises a global shutter; the second camera comprises a rolling shutter; and the processor may be further configured to: compare a first image acquired using the first camera to a second image acquired using the second camera to detect a skew in at least part of the second image; and adjust the at least part of the second image to compensate for the detected skew.

In some embodiments, comparing the first image acquired using the first camera to the second image acquired using the second camera may comprise performing a line-by-line comparison between the first image and the second image.

In some embodiments, the processor may be mechanically coupled to the frame.

In some embodiments, the frame comprises a display device mechanically coupled to the processor.

In some embodiments, a local data processing module may comprise the processor, the local data processing module operatively coupled to a display device through a communication link, and wherein the frame may comprise the display device.

In some embodiments, the processor may be further configured to determine satisfaction of an occlusion criterion for the first camera; enable or increase a frame rate of the second camera; and track the object using image data output by the second camera.

In some embodiments, the occlusion criterion may be satisfied when an object occupies more than a threshold amount of a field of view for the first camera.

In some embodiments, the object may be a stationary object within the environment.

In some embodiments, the object may be a hand of a user of the wearable display system.

In some embodiments, the wearable display system further comprises an IR emitter mechanically coupled to the frame.

In some embodiments, the IR emitter is configured to be selectively activated so as to provide IR illumination.

Further, though advantages of the present disclosure are indicated, it should be appreciated that not every embodiment of the disclosure will include every described advantage. Some embodiments may not implement any features described as advantageous herein. Accordingly, the foregoing description and drawings are by way of example only.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. In some embodiments, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format. In the embodiment illustrated, the input/output devices are illustrated as physically separate from the computing device. In some embodiments, however, the input and/or output devices may be physically integrated into the same unit as the processor or other elements of the computing device. For example, a keyboard might be implemented as a soft keyboard on a touch screen. In some embodiments, the input/output devices may be entirely disconnected from the computing device, and functionally integrated through a wireless connection.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the disclosure may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the disclosure discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a computer-readable medium that can be considered to be a manufacture (i.e., article of manufacture) or a machine. In some embodiments, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the disclosure may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A wearable display system, the wearable display system comprising:
    a headset including:
        one first camera configurable to output an image frame or image data satisfying an intensity change criterion;
        one second camera; and
        wherein the first camera and the second camera are positioned so as to provide overlapping views of a central view field; and
    a processor operatively coupled to the first camera and the second camera and configured to:
        create a world model using depth information stereoscopically determined from images output by the first camera and the second camera;
        track head pose using the world model and the image data satisfying the intensity change criterion output by the first camera,
        determine whether the head pose tracking satisfies a quality criterion; and
        enable the second camera or modulate a frame rate of the second camera when the head pose tracking does not satisfy the quality criterion.

2. The wearable display system of claim 1, wherein the intensity change criterion comprises an absolute or relative intensity change criterion.

3. The wearable display system of claim 1, wherein:
    the processor is further configured to perform a tracking routine to restrict image data acquisition to points of interest within the world model.

4. The wearable display system of claim 3, wherein:
    the first camera is configurable to restrict image acquisition to one or more portions of a field of view of the first camera; and
    the tracking routine includes:
        identifying a point of interest within the world model;
        determining one or more first portions of the field of view of the first camera corresponding to the point of interest; and
        providing instructions to the first camera to restrict image acquisition to the one or more first portions of the field of view.

5. The wearable display system of claim 4, wherein:
    the tracking routine further includes:
        estimating one or more second portions of the field of view of the first camera corresponding to the point of interest based on a movement of the point of interest relative to the world model or a movement of the headset relative to the point of interest; and
        providing instructions to the first camera to restrict image acquisition to the one or more second portions of the field of view.

6. The wearable display system of claim 3, wherein:
    the headset further includes an inertial measurement unit; and
    performing the tracking routine includes estimating an updated relative position of a point of interest of the point of interests based at least partly upon an output of the inertial measurement unit.

7. The wearable display system of claim 1, wherein the processor is mechanically coupled to the headset.

8. The wearable display system of claim 1, wherein the headset comprises a display device mechanically coupled to the processor.

9. The wearable display system of claim 1, wherein a local data processing module comprises the processor, the local data processing module operatively coupled to a display device through a communication link, and wherein the headset comprises the display device.

10. The wearable display system of claim 1, wherein the headset further includes an IR emitter.

11. The wearable display system of claim 10, wherein the processor is configured to selectively enable the IR emitter so as to enable head pose tracking in a low light condition.

12. A wearable display system, the wearable display system comprising:
a headset including:
one first camera configurable to output an image frame or image data satisfying an intensity change criterion;
one second camera; and
wherein the first camera and the second camera are positioned so as to provide overlapping views of a central view field; and a processor operatively coupled to the first camera and the second camera and configured to:
create a world model using depth information stereoscopically determined from images output by the first camera and the second camera; and
track head pose using the world model and the image data satisfying the intensity change criterion output by the first camera,
wherein the first camera is configured to output the image data asynchronously.

13. The wearable display system of claim 12, wherein the processor is further configured to track head pose asynchronously.

14. The wearable display system of claim 12, wherein:
the processor is further configured to:
determine whether the head pose tracking satisfies a quality criterion; and
enable the second camera or modulate a frame rate of the second camera when the head pose tracking does not satisfy the quality criterion.

15. The wearable display system of claim 12, wherein:
the processor is further configured to perform a tracking routine to restrict image data acquisition to points of interest within the world model;
the tracking routine includes repeatedly calculating a position of the point of interest within the world model; and
repeated calculations are performed at a temporal resolution of more than 60 Hz.

16. The wearable display system of claim 12, wherein:
the processor is further configured to perform a tracking routine to restrict image data acquisition to points of interest within the world model;
the first camera is configurable to restrict image acquisition to one or more portions of a field of view of the first camera; and
the tracking routine includes:
identifying a point of interest within the world model;
determining one or more first portions of the field of view of the first camera corresponding to the point of interest; and
providing instructions to the first camera to restrict image acquisition to the one or more first portions of the field of view.

17. A wearable display system, the wearable display system comprising:
a headset including:
one first camera configurable to output an image frame or image data satisfying an intensity change criterion;
one second camera; and
wherein the first camera and the second camera are positioned so as to provide overlapping views of a central view field; and
a processor operatively coupled to the first camera and the second camera and configured to:
create a world model using depth information stereoscopically determined from images output by the first camera and the second camera; and
track head pose using the world model and the image data satisfying the intensity change criterion output by the first camera,
wherein:
the processor is further configured to perform a tracking routine to restrict image data acquisition to points of interest within the world model;
the tracking routine includes repeatedly calculating a position of the point of interest within the world model; and
repeated calculations are performed at a temporal resolution of more than 60 Hz.

18. The wearable display system of claim 17, wherein intervals between the repeated calculations are between 1 ms and 15 ms in duration.

19. A method of tracking head pose using a wearable display system, the wearable display system comprising:
a headset including:
one first camera configurable to output an image frame or image data satisfying an intensity change criterion;
one second camera; and
wherein the first camera and the second camera are positioned so as to provide overlapping views of a central view field; and
a processor operatively coupled to the first camera and the second camera;
wherein the method comprises using the processor to:
create a world model using depth information stereoscopically determined from images output by the first camera and the second camera;
track the head pose using the world model and the image data satisfying the intensity change criterion output by the first camera; and
perform a tracking routine to restrict image data acquisition to points of interest within the world model, wherein the tracking routine includes:
identifying a point of interest within the world model;
determining one or more first portions of a field of view of the first camera corresponding to the point of interest; and
providing instructions to the first camera to restrict image acquisition to the one or more first portions of the field of view.

20. The method of claim 19, wherein:
the tracking routine further includes:
estimating one or more second portions of the field of view of the first camera corresponding to the point of interest based on a movement of the point of interest relative to the world model or a movement of the headset relative to the point of interest; and
providing instructions to the first camera to restrict image acquisition to the one or more second portions of the field of view.

21. The wearable display system of claim 17, wherein:
the first camera is configurable to restrict image acquisition to one or more portions of a field of view of the first camera; and
the tracking routine includes:
identifying a point of interest within the world model;

determining one or more first portions of the field of view of the first camera corresponding to the point of interest; and providing instructions to the first camera to restrict image acquisition to the one or more first portions of the field of view.

22. The wearable display system of claim 17, wherein:

the tracking routine further includes:
- estimating one or more second portions of the field of view of the first camera corresponding to the point of interest based on a movement of the point of interest relative to the world model or a movement of the headset relative to the point of interest; and
- providing instructions to the first camera to restrict image acquisition to the one or more second portions of the field of view.

23. The wearable display system of claim 17, wherein:

the headset further includes an inertial measurement unit; and performing the tracking routine includes estimating an updated relative position of a point of interest of the point of interests based at least partly upon an output of the inertial measurement unit.

24. The wearable display system of claim 17, wherein:

the first camera is configured to output the image data asynchronously; and the processor is further configured to track head pose asynchronously.

* * * * *